(12) United States Patent
Childe et al.

(10) Patent No.: US 12,021,976 B2
(45) Date of Patent: Jun. 25, 2024

(54) QUANTUM KEY DISTRIBUTION PROTOCOL

(71) Applicant: Arqit Limited, London (GB)

(72) Inventors: Barry Childe, Sussex (GB); David Bestwick, Essex (GB); David Williams, Sussex (GB); Andrew James Victor Yeomans, Hertfordshire (GB); Omar Iqbal, Hampshire (GB)

(73) Assignee: Arqit Limited, London (GB)

( * ) Notice: Subject to any disclaimer, the term of this patent is extended or adjusted under 35 U.S.C. 154(b) by 211 days.

(21) Appl. No.: 17/775,210

(22) PCT Filed: Nov. 6, 2020

(86) PCT No.: PCT/GB2020/052826
§ 371 (c)(1),
(2) Date: May 6, 2022

(87) PCT Pub. No.: WO2021/090025
PCT Pub. Date: May 14, 2021

(65) Prior Publication Data
US 2022/0407688 A1    Dec. 22, 2022

(30) Foreign Application Priority Data

Nov. 8, 2019 (GB) ..................... 1916311

(51) Int. Cl.
*H04L 29/06* (2006.01)
*H04L 9/08* (2006.01)
(52) U.S. Cl.
CPC ............ *H04L 9/0855* (2013.01); *H04L 9/085* (2013.01)
(58) Field of Classification Search
None
See application file for complete search history.

(56) References Cited

U.S. PATENT DOCUMENTS

| 8,650,401 | B2 * | 2/2014 | Wiseman | H04L 63/061 380/256 |
| 8,855,316 | B2 * | 10/2014 | Wiseman | H04L 9/0855 380/278 |

(Continued)

FOREIGN PATENT DOCUMENTS

WO    2019115984    6/2019

OTHER PUBLICATIONS

Hughes, et al., Quantum computing: the final frontier, IEEE Intelligent Systems, IEEE Service Center, New York, NY, US, vol. 15, No. 5, Sep. 1, 2000, pp. 10-18.

(Continued)

*Primary Examiner* — Maung T Lwin
(74) *Attorney, Agent, or Firm* — Dentons US LLP

(57) ABSTRACT

Methods, apparatus, and systems are provided for performing a quantum key distribution (QKD) protocol between a first device, a second device, and an intermediary device. The intermediary device transmitting: a first secret symbol string over a first quantum channel to the first device; a first basis set over a first communication channel to the first device. The intermediary device; a second secret symbol string over a second quantum channel to the second device; a second basis set over a second communication channel to the second device. The intermediary device generating a third symbol string based on combining the first and second secret symbol strings and transmitting to the second device, via the second communication channel, data representative of the third symbol string. The first device and second device perform a quantum key exchange and sifting based on the corresponding received first and second secret symbol strings and first and second basis sets, and a fourth set of symbols generated by the second device generates a fourth (Continued)

set of symbols based on combining the second received secret symbols with the received third symbol string.

20 Claims, 17 Drawing Sheets

(56) References Cited

U.S. PATENT DOCUMENTS

| | | | |
|---|---|---|---|
| 9,887,976 B2* | 2/2018 | Hughes | H04L 9/3226 |
| 2004/0184603 A1* | 9/2004 | Pearson | H04L 9/0855 |
| | | | 380/28 |

OTHER PUBLICATIONS

Examination Report of Canadian Patent Application No. 3,157,137, dated Aug. 31, 2023.

* cited by examiner

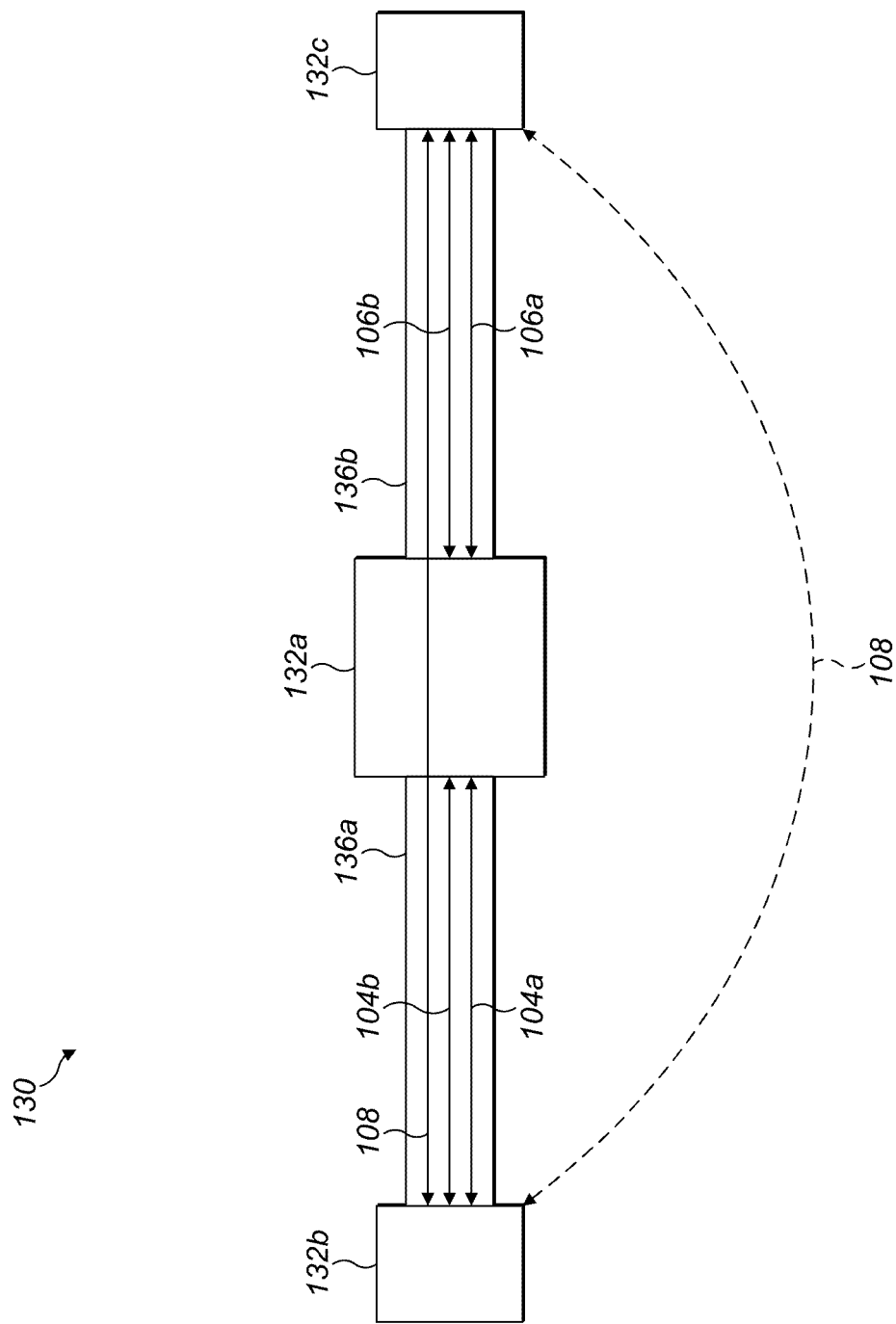

QUANTUM KEY DISTRIBUTION PROTOCOL

This application is the National Stage filing under 35 U.S.C. 371 of International Application No. PCT/GB2020/052826, filed Nov. 6, 2020, claims the benefit of GB Application No. 1916311.2, filed Nov. 8, 2019, the contents of which are all hereby incorporated by reference herein in their entirety.

BACKGROUND

Quantum key distribution (QKD) is a secure communication method which implements a cryptographic QKD protocol involving components of quantum mechanics for distributing cryptographic keys. It enables two parties to produce a shared random secret key or cryptographic key known only to them, which can then be used to encrypt and decrypt messages. The BB84 QKD protocol is a well-known QKD protocol using photon polarisation bases to transmit the information. The BB84 QKD protocol uses a set of bases including least two pairs of conjugate photon polarisation bases (e.g. a set of bases including, without limitation, for example a rectilinear photon basis (e.g. vertical (0°) and horizontal (90°) polarisations) and diagonal photon basis (e.g. 45° and 135° polarisations) or the circular basis of left- and right-handedness etc.) In the BB84 protocol, QKD is performed between a sender device or intermediary device (e.g. referred to as Alice) and a receiver or first device (e.g. referred to as Bob or Carol). The sender device and receiver device are connected by a quantum communication channel which allows quantum information (e.g. quantum states) to be transmitted. The quantum channel may be, without limitation, for example, an optical fibre or optical free space. Furthermore, the sender device and receiver device also communicate over a non-quantum channel or public classical channel, without limitation, for example a fibre optic channel, telecommunications channel, radio channel, broadcast radio or the internet and/or any other wireless or wired communications channel and the like. Sheng-Kai Liao, et. al. "Satellite-to-ground quantum key distribution", Nature volume 549, pages 43-47, 7 Sep. 2017, describes satellite-based QKD system using the BB84 protocol for distributing keys, where a satellite free-space optical quantum channel is produced using a 300-mm aperture Cassegrain telescope, which sends a light beam from a Micius satellite (e.g. Alice) to a ground station (e.g. Bob), which uses a Ritchey Chretien telescope for receiving the QKD photons over the satellite free-space optical quantum channel.

Although the security of the BB84 protocol comes from judicious use of the quantum and classical communication channels and authentication and the like, both the sender or intermediary device distributing the cryptographic key and the receiver device receiving the cryptographic key know the cryptographic key that the receiver device will eventually use. This means that the sender or intermediary device distributing the cryptographic key to the receiver device has to be a trusted device in a secure location in order for the receiver device to be able to trust that they may use the resulting cryptographic key. This may be fine should both the sender and receiver device use the resulting cryptographic key for cryptographic operations therebetween, e.g. for encrypted communications and the like with each other. However, if the sender or intermediary device is only distributing keys to one or more receiver devices in which the receiver devices may use the resulting cryptographic keys with one or more other receiver devices, then it is often not acceptable that the sender or intermediary device has access to the resulting cryptographic keys, this is an insecure system and cannot be trusted.

There is a desire for a more improved QKD protocol that does not rely on the intermediary device being a fully trusted device by a first device and second device requiring a shared key or shared cryptographic key for cryptographic operations therebetween.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) of quantum key distribution between a first device and a second device via an intermediary device using a quantum key distribution protocol. The quantum key distribution protocol enables the intermediary device to send randomly generated first and second secret symbol strings to the first device and second device, respectively, over respective quantum channels. Further processing of the first and second secret symbol strings is performed by the intermediary device via respective classical communication channels with the first and second devices. The intermediary device generates a third symbol string for sending via a classical communication channel to the second device. The third symbol string is based on combining a set of symbols of the first secret symbol string with a set of symbols of the second secret symbol string in such a way that enables the second device to retrieve a fourth set of symbols based on using its received second symbol string. The combining of the set of symbols of the first secret symbol string and the set of symbols of the second secret symbol string may be based on, without limitation, for example one-time-pad encryption/decryption, masking, exclusive OR (XOR) operations on bits when symbols converted to bits, or extended XOR operations on symbols or obfuscated set of the first secret symbols. The second device is configured to perform a reverse set of operations to extract a fourth set of symbols using symbols from the successfully received second secret symbol string. The symbols of the fourth set of symbols correspond to symbols of the first set of symbols. From this, the first and second devices may perform symbol (or bit) sifting using the received first set of symbols at the first device and the fourth set of symbols generated at the second device for determining a common set of sifted symbols from which a cryptographic key may be derived by the first and second devices. The cryptographic key is only known to the first and second devices, thus, they can perform cryptographic operations with each other. The first and second devices can then determine a cryptographic key in a quantum-safe manner even when the intermediary device is not a trusted device.

In a first aspect, the present disclosure provides a computer-implemented method of quantum key distribution between a first device and a second device, the method, performed by an intermediary device, comprising: transmitting a first secret symbol string over a first quantum channel to the first device, each symbol of the first secret symbol string modulated by a basis state randomly selected from a set of bases; transmitting a first basis set over a first communication channel to the first device, the first basis set comprising data representative of the randomly selected bases used to modulate each symbol of the first secret symbol string; transmitting a second secret symbol string over a second quantum channel to the second device, each symbol of the second secret symbol string modulated by a basis state randomly selected from the set of bases; transmitting a second basis set over a second communication channel to the second device, the second basis set comprising data representative of the randomly selected bases used to modulate each symbol of the second secret symbol string; generating a third symbol string based on combining the first and second secret symbol strings; transmitting to the second device, via the second communication channel, data representative of the third symbol string; wherein the first device and second device perform a quantum key exchange based on: the first device using the received first basis set to determine a first received set of secret symbols comprising symbols of the first secret symbol string transmitted over the first quantum channel that were successfully received by the first device; the second device uses the received second basis set to determine a second received set of secret symbols comprising symbols of the second secret symbol string transmitted over the second quantum channel that were successfully received by the second device; the second device generates a fourth set of symbols based on combining the second received set of secret symbols with the received third symbol string, wherein one or more symbols of the fourth set of symbols correspond to one or more symbols of the first symbol string; the first device and second device performing symbol sifting operations over a third communication channel between the based on the first received set of secret symbols at the first device and the fourth set of symbols at the second device for generating a common set of sifted symbols for forming a cryptographic key at the first and second devices.

Preferably, the method further comprising: receiving from the first device, over the first communication channel, data representative of the symbol positions of the symbols in the first secret symbol string transmitted over the first quantum communication channel that were successfully received by the first device; generating a first set of symbols based on those symbols of the first secret symbol string that correspond to the received data representative of the symbol positions of symbols from the first secret symbol string successfully received by the first device; receiving from the second device, over the second communication channel, data representative of the symbol positions of the symbols in the second secret symbol string transmitted over the second quantum communication channel that were successfully received by the second device; generating a second set of symbols based on those symbols of the second secret symbol string that correspond to the received data representative of the symbol positions of symbols from the second secret symbol string successfully received by the second device; and said generating the third symbol string further comprising generating the third symbol string based on combining the first set of symbols and second set of symbols.

Preferably, the method further comprising, prior to transmitting the randomly selected bases to the first device, performing said receiving from the first device, over the first communication channel, data representative of the symbol positions of the symbols in the first secret symbol string transmitted over the first quantum communication channel that were successfully received by the first device.

Preferably, the method further comprising, prior to transmitting the randomly selected bases to the second device, performing said receiving from the second device, over the second communication channel, data representative of the symbol positions of the symbols in the second secret symbol string transmitted over the second quantum communication channel that were successfully received by the second device.

Preferably, the method further comprising the first device and second device performing a quantum key exchange based on: the first device forms the first received set of secret symbols based on the received first basis set and the symbols that were successfully received from the first secret symbol string transmitted over the first quantum communication channel, wherein each symbol of the first received set of secret symbols is a symbol of the first secret symbol string that was successfully received by the first device in which the basis used for receiving said symbol matches the corresponding basis in the received first basis set used to transmit said symbol; the second device forms the second received set of secret symbols based on the received second basis set and the symbols that were successfully received from the second secret symbol string transmitted over the second quantum communication channel, wherein each symbol of the second received set of secret symbols is a symbol of the second secret symbol string that was successfully received by the second device in which the basis used for receiving said symbol matches the corresponding basis in the received second basis set used to transmit said symbol; the second device generates the fourth set of symbols based combining the second received set of secret symbols with the received third symbol string, wherein one or more symbols of the fourth set of symbols correspond to one or more symbols of the first set of symbols; the first device and second device performing symbol sifting operations over the third communication channel therebetween based on the first received set of secret symbols at the first device and the fourth set of symbols at the second device for generating a common set of sifted symbols for forming a cryptographic key at the first and second devices.

Preferably, said generating the third symbol string further comprising: in response to determining the length of the first set of symbols is less than the length of the second set of symbols: truncating the second set of symbols to the length of the first set of symbols; and generating the third symbol string based on combining the first set of symbols with the truncated second set of symbols; and in response to determining the length of the second set of symbols is less than the length of the first set of symbols: truncating the first set of symbols to the length of the second set of symbols; and generating the third symbol string based on combining the truncated first set of symbols with the second set of symbols.

Preferably, said generating the third symbol string further comprising: in response to determining the length of the first set of symbols is less than the length of the second set of symbols: adjusting the second set of symbols by removing an agreed set of symbols from the second set of symbols until the adjusted length of the adjusted second set of symbols is the same as the first set of symbols; and generating the third symbol string based on combining the first set of symbols with the adjusted second set of symbols; and in response to determining the length of the second set of symbols is less than the length of the first set of symbols: adjusting the first set of symbols by removing an agreed set of symbols from the first set of symbols until the adjusted length of the adjusted first set of symbols is the same as the second set of symbols; and generating the third symbol string based on combining the adjusted first set of symbols with the second set of symbols.

Preferably, generating the third symbol string further comprises one or more from the group of: generating the third symbol string based on performing an XOR operation using data representative of a first set of bits and a second set of bits, the first set of bits based on converting each of the symbols in the first set of symbols to a string of bits and the second set of bits based on converting each of the symbols in the second set of symbols to a string of bits; generating the third bit string based on performing one time pad encryption operation(s) using data representative of, at least in part, the first set of symbols and the second set of symbols; and generating the third symbol string based on performing any other type of operation for obfuscating one or more symbols of the first set of symbols using the second set of symbols.

Preferably, the second device generating the fourth symbol string further comprises one or more from the group of: generating the fourth symbol string based on performing an XOR operation using the second received set of secret symbols and the received third symbol string; generating the fourth symbol string based on performing one time pad decryption operation(s) using the received second set of secret symbols and the third secret symbol string; and generating the fourth symbol string based on performing any other type of operation for extracting one or more symbols of the first secret symbol string using the second received set of secret symbols and the third symbol string.

Preferably, generating the third symbol string further comprises one or more from the group of: generating the third symbol string based on performing an XOR operation using data representative of, at least in part, the first secret symbol string and the second secret symbol string; generating the third symbol string based on performing one time pad encryption operation(s) using data representative of, at least in part, the first secret symbol string and the second secret symbol string; and generating the third symbol string based on performing any other type of operation for obfuscating one or more symbols of the first secret symbol string using the second secret symbol string.

Preferably, the second device generating the fourth symbol string further comprises one or more from the group of: generating the fourth symbol string based on performing an XOR operation using data representative of, at least in part, the second secret symbol string and the third symbol string; generating the fourth symbol string based on performing one time pad decryption operation(s) using data representative, of at least in part, the second secret symbol string and the third secret symbol string; and generating the fourth symbol string based on performing any other type of operation for extracting one or more symbols of the first secret symbol string using data representative of, at least in part, the second secret symbol string and the third symbol string.

Preferably, the first device and second device performing symbol sifting operations over the third communication channel therebetween based on: the first device forms a first matching basis set based on the first received set of secret symbols, wherein the first matching basis set includes all the basis states the first device used to receive the symbols of the first received set of secret symbols that match the corresponding basis states of the received first basis set used to transmit said symbol of the first set of symbols; and the first device sends over the third communication channel data representative of the first matching basis set to the second device; the second device forms a second matching basis set based on the second received set of secret symbols, wherein the second matching basis set includes all the basis states the second device used to receive the symbols of the second received set of secret symbols that match the corresponding basis states of the received second basis set used to transmit said symbol of the second set of symbols; the second device sends over the third communication channel data representative of the second matching basis set to the first device; the first device generates a first common set of sifted symbols based on discarding each symbol in the first received set of secret symbols in which the corresponding basis in the first matching basis set is different to the corresponding basis in the received second matching basis set; the second device generates a second common set of sifted symbols based on discarding each symbol in the fourth set of symbols in which the corresponding basis in the received first matching basis set is different to the corresponding basis in the second matching basis set; and the first and second devices forming a cryptographic key based on the first and second common set of sifted symbols, respectively.

Preferably, the first and second device perform error detection and/or correction on the first and second common sets of sifted bits.

In a second aspect, the present disclosure provides a computer-implemented method of quantum key distribution between a first device and a second device, the method, performed by the first device, comprising: receiving, from an intermediary device, over a quantum channel a first secret symbol string, wherein the intermediary device modulated each symbol of the first secret symbol string using a basis state of a basis selected at random from a set of bases for transmission over the quantum channel; demodulating the received first secret symbol string, where each received first secret symbol is demodulated using a basis state of a basis selected at random from the set of bases; receiving, from the intermediary device, data representative of a first basis set over a first communication channel, the first basis set comprising data representative of the randomly selected bases used by the intermediary device to modulate each symbol of the first secret symbol string; determining a first received set of secret symbols from the received first secret symbol string that are successfully received using the received first basis set; performing sifting operation(s) with the second device using the first received set of secret symbols of the first device and another set of secret symbols determined by the second device for generating a common sifted set of symbols for forming a cryptographic key with the second device, wherein the other set of secret symbols are associated with the first received set of secret symbols; and the second device determines the other set of secret symbols based on, at least in part, a second secret symbol string received by the second device over a second quantum channel from the intermediary device and, at least in part, a third secret symbol string received by the second device over a second communication channel from the intermediary device, wherein the third secret symbol string is based on a combination of, at least in part, the second secret symbol string and the first secret symbol string, and the second device generates the other set of secret symbols based on a combination of the received third secret symbol string and, at least in part, the second secret symbol string.

Preferably, the method further comprising transmitting, to the intermediary device, over the first communication channel, data representative of the symbol positions of the symbols in the first secret symbol string that were successfully received by the first device over the quantum communication channel.

Preferably, the method further comprising, prior to receiving the first basis set, performing said transmitting from the first device to the intermediary device over the first communication channel data representative of the symbol positions of the symbols in the first secret symbol string successfully received by the first device over the quantum communication channel.

Preferably, the method further comprising the first device and second device performing a quantum key exchange based on: forming the first received set of secret symbols based on the received first basis set and the symbols that were successfully received from the first secret symbol string transmitted by the intermediary device over the quantum communication channel, wherein each symbol of the first received set of secret symbols is a symbol of the first secret symbol string that was successfully received by the first device in which the basis used for receiving said symbol matches the corresponding basis in the received first basis set used to transmit said symbol; wherein the second device forms a second received set of secret symbols based on a received second basis set and the symbols that were successfully received from the second secret symbol string transmitted by the intermediary device over the second quantum channel, wherein each symbol of the second received set of secret symbols is a symbol of the second secret symbol string that was successfully received by the second device in which the basis used for receiving said symbol matches the corresponding basis in the received second basis set used to transmit said symbol; and the second device generates the other set of symbols based on combining the second received set of secret symbols with the received third symbol string, wherein one or more symbols of the other set of symbols correspond to one or more symbols of the first set of symbols; and performing symbol sifting operations with the second device over the third communication channel based on the first received set of secret symbols at the first device and the other set of symbols at the second device for generating a common set of sifted symbols for forming a cryptographic key at the first and second devices.

Preferably, the combination of the second secret symbol string and the first secret symbol string comprises generating the third symbol string using an XOR operation on data representative of the second secret symbol string and the first secret symbol string.

Preferably, generating the third symbol string further comprises one or more from the group of: generating the third symbol string based on performing an XOR operation using data representative of, at least in part, the first secret symbol string and the second secret symbol string; generating the third symbol string based on performing one time pad encryption operation(s) using data representative of, at least in part, the first secret symbol string and the second secret symbol string; and generating the third symbol string based on performing any other type of operation for obfuscating one or more symbols of the first secret symbol string using the second secret symbol string.

Preferably, the second device generating the other symbol string further comprises one or more from the group of: generating the other symbol string based on performing an XOR operation using data representative of, at least in part, the received second secret symbol string and the received third symbol string; generating the other symbol string based on performing one time pad decryption operation(s) using data representative, of at least in part, the received second secret symbol string and the received third secret symbol string; and generating the other symbol string based on performing any other type of operation for extracting one or more symbols of the first secret symbol string using data representative of, at least in part, the received second secret symbol string and the received third symbol string.

Preferably, performing the symbol sifting operations with the second device over the third communication channel further comprising: forming a first matching basis set based on the first received set of secret symbols, wherein the first matching basis set includes all the basis states the first device used to receive the symbols of the first received set of secret symbols that match the corresponding basis states of the received first basis set used by the intermediary device to transmit said symbol of the first secret symbol string; and transmitting to the second device over the third communication channel data representative of the first matching basis set, wherein: receiving from the second device over the third communication channel data representative of a second matching basis set, wherein the second device forms the second matching basis set based on the second received set of secret symbols, wherein the second matching basis set includes all the basis states the second device used to receive the symbols of the second received set of secret symbols that match the corresponding basis states of the received second basis set used by the intermediary device to transmit said symbol of the second secret symbol string; generating a first common set of sifted symbols based on discarding each symbol in the first received set of secret symbols in which the corresponding basis in the first matching basis set is different to the corresponding basis in the received second matching basis set, wherein the second device generates a second common set of sifted symbols based on discarding each symbol in the other set of secret symbols in which the corresponding basis in the received first matching basis set is different to the corresponding basis in the second matching basis set; and forming a cryptographic key based on the first common set of sifted symbols, wherein the second device forms the cryptographic key based on the second common set of sifted symbols.

Preferably, the method further comprising performing error detection and/or correction with the second device on the first and second common sets of sifted symbols.

In a third aspect, the present disclosure provides a computer-implemented method of quantum key distribution between a first device and a second device, the method, performed by the second device, comprising: receiving, from an intermediary device, over a quantum channel a second secret symbol string, wherein the intermediary device modulated each symbol of the second secret symbol string using a basis state of a basis selected at random from a set of bases; demodulating the received second secret symbol string, where each received second secret symbol is demodulated using a basis state of a basis selected at random from the set of bases; receiving data representative of the randomly selected bases used to modulate each symbol of the second secret symbol string by the intermediary device; determining a second set of secret symbols from the received second secret symbol string that are validly received based on comparing the randomly selected bases used to demodulate the second secret symbol string and the received randomly selected bases used to modulate the second secret symbol string; receiving, from the intermediary device, data representative of a third symbol string, the third symbol string generated by the intermediary device based on a combination of, at least in part, the second secret symbol string and a first secret symbol string, the first secret symbol string sent from the intermediary device to the first device over another quantum channel; determining a fourth set of secret symbols based on combining, at least in part, the received third symbol string with the received second set of secret symbols; and performing sifting with the first device using the fourth set of secret symbols and another set of secret symbols determined by the first device for generating a common sifted set of symbols for forming a cryptographic key, wherein the other set of secret symbols are associated with the first secret symbol string that is determined to be validly received by the first device.

Preferably, the method further comprising transmitting, to the intermediary device, over the second communication channel, data representative of the symbol positions of the symbols in the second secret symbol string that were successfully received over the quantum channel.

Preferably, the method further comprising, prior to receiving the second basis set, performing said transmitting from the second device to the intermediary device over the second communication channel data representative of the symbol positions of the symbols in the second secret symbol string successfully received by the second device over the quantum communication channel.

Preferably, the method further comprising the first device and second device performing a quantum key exchange based on: forming a second received set of secret symbols based on the received second basis set and the symbols that were successfully received from the second secret symbol string transmitted by the intermediary device over the second quantum channel, wherein each symbol of the second received set of secret symbols is a symbol of the second secret symbol string that was successfully received by the second device in which the basis used for receiving said symbol matches the corresponding basis in the received second basis set used to transmit said symbol; and the second device generates the fourth set of symbols based on combining the second received set of secret symbols with the received third symbol string, wherein one or more symbols of the fourth set of symbols correspond to one or more symbols of the first set of symbols; and wherein the first device forms the first received set of secret symbols based on a received first basis set and the symbols that were successfully received from the first secret symbol string transmitted by the intermediary device over the other quantum communication channel to the first device, wherein each symbol of the first received set of secret symbols is a symbol of the first secret symbol string that was successfully received by the first device in which the basis used for receiving said symbol matches the corresponding basis in the received first basis set used to transmit said symbol; performing symbol sifting operations with the first device over the third communication channel based on the first received set of secret symbols at the first device and the fourth set of symbols at the second device for generating a common set of sifted symbols for forming a cryptographic key at the first and second devices.

Preferably, the combination of the second secret symbol string and the first secret symbol string comprises generating the third symbol string using an XOR operation on data representative of the second secret symbol string and the first secret symbol string.

Preferably, generating the third symbol string by the intermediary device further comprises one or more from the group of: generating the third symbol string based on performing an XOR operation using data representative of, at least in part, the first secret symbol string and the second secret symbol string; generating the third symbol string based on performing one time pad encryption operation(s) using data representative of, at least in part, the first secret symbol string and the second secret symbol string; and generating the third symbol string based on performing any other type of operation for obfuscating one or more symbols of the first secret symbol string using the second secret symbol string.

Preferably, generating the fourth symbol string further comprises one or more from the group of: generating the fourth symbol string based on performing an XOR operation using data representative of, at least in part, the received second secret symbol string and the received third symbol string; generating the fourth symbol string based on performing one time pad decryption operation(s) using data representative, of at least in part, the received second secret symbol string and the received third secret symbol string; and generating the fourth symbol string based on performing any other type of operation for extracting one or more symbols of the first secret symbol string using data representative of, at least in part, the received second secret symbol string and the received third symbol string.

Preferably, performing the symbol sifting operations with the first device over the third communication channel further comprising: the first device forming a first matching basis set based on a first received set of secret symbols, wherein the first matching basis set includes all the basis states the first device used to receive the symbols of the first received set of secret symbols that match the corresponding basis states of the received first basis set used by the intermediary device to transmit said symbol of the first secret symbol string; and receiving at the second device over the third communication channel data representative of the first matching basis set; transmitting to the first device over the third communication channel data representative of a second matching basis set, wherein the second device forms the second matching basis set based on the second received set of secret symbols, wherein the second matching basis set includes all the basis states the second device used to receive the symbols of the second received set of secret symbols that match the corresponding basis states of the received second basis set used by the intermediary device to transmit said symbol of the second secret symbol string; generating a second common set of sifted symbols based on discarding each symbol in the fourth set of secret symbols in which the corresponding basis in the received first matching basis set is different to the corresponding basis in the second matching basis set, wherein the first device generates a first common set of sifted symbols based on discarding each symbol in the first received set of secret symbols in which the corresponding basis in the first matching basis set is different to the corresponding basis in the received second matching basis set; and forming a cryptographic key based on the first common set of sifted symbols, wherein the second device forms the cryptographic key based on the second common set of sifted symbols.

Preferably, performing error detection and/or correction with the second device on the first and second common sets of sifted symbols.

In a fourth aspect, the present disclosure provides a computer-implemented method of quantum key distribution between a first device and a second device, the method comprising: transmitting, by an intermediary device, a first secret symbol string over a first quantum channel to the first device, each symbol of the first secret symbol string modulated by a basis state randomly selected from a set of bases; transmitting, by the intermediary device, a first basis set over a first communication channel to the first device, the first basis set comprising data representative of the randomly selected bases used to modulate each symbol of the first secret symbol string; transmitting, by the intermediary device, a second secret symbol string over a second quantum channel to the second device, each symbol of the second secret symbol string modulated by a basis state randomly selected from the set of bases; transmitting, by the intermediary device, a second basis set over a second communication channel to the second device, the second basis set comprising data representative of the randomly selected bases used to modulate each symbol of the second secret symbol string; generating, by the intermediary device, a third symbol string based on combining the first and second secret symbol strings; transmitting, by the intermediary device, to the second device, via the second communication channel, data representative of the third symbol string; determining, by the first device, a first received set of secret symbols using the received first basis set, the first received set of secret symbols comprising symbols of the first secret symbol string transmitted over the first quantum channel that were successfully received by the first device; determining, by the second device, a second received set of secret symbols using the received second basis set, the second received set of secret symbols comprising symbols of the second secret symbol string transmitted over the second quantum channel that were successfully received by the second device; generating, by the second device, a fourth set of symbols based on combining the second received set of secret symbols with the received third symbol string, wherein one or more symbols of the fourth set of symbols correspond to one or more symbols of the first symbol string; performing, by the first device and second device, symbol sifting operations over a third communication channel the based on the first received set of secret symbols at the first device and the fourth set of symbols at the second device for generating a common set of sifted symbols for forming a cryptographic key at the first and second devices.

Preferably, the method further comprising: transmitting, by the first device, over the first communication channel to the intermediary device data representative of the symbol positions of the symbols in the first secret symbol string transmitted by the intermediary device over the first quantum communication channel that were successfully received by the first device; generating, at the intermediary device, a first set of symbols based on those symbols of the first secret symbol string that correspond to the data representative of the symbol positions of symbols from the first secret symbol string successfully received by the first device; transmitting, by the second device, over the second communication channel to the intermediary device data representative of the symbol positions of the symbols in the second secret symbol string transmitted by the intermediary device over the second quantum communication channel that were successfully received by the second device; generating, at the intermediary device, a second set of symbols based on those symbols of the second secret symbol string that correspond to the received data representative of the symbol positions of symbols from the second secret symbol string successfully received by the second device; and said generating, by the intermediary device, the third symbol string further comprising generating, by the intermediary device, the third symbol string based on combining the first set of symbols and second set of symbols.

Preferably, the method further comprising: prior to transmitting the randomly selected bases to the first device, performing said receiving from the first device, over the first communication channel, data representative of the symbol positions of the symbols in the first secret symbol string transmitted over the first quantum communication channel that were successfully received by the first device; and prior to transmitting the randomly selected bases to the second device, performing said receiving from the second device, over the second communication channel, data representative of the symbol positions of the symbols in the second secret symbol string transmitted over the second quantum communication channel that were successfully received by the second device.

Preferably, the method further comprising the first device and second device performing a quantum key exchange by: determining, by the first device, a first received set of secret symbols based on the received first basis set and the symbols that were successfully received from the first secret symbol string transmitted over the first quantum communication channel, wherein each symbol of the first received set of secret symbols is a symbol of the first secret symbol string that was successfully received by the first device in which the basis used for receiving said symbol matches the corresponding basis in the received first basis set used to transmit said symbol; determining, by the second device, a second received set of secret symbols based on the received second basis set and the symbols that were successfully received from the second secret symbol string transmitted over the second quantum communication channel, wherein each symbol of the second received set of secret symbols is a symbol of the second secret symbol string that was successfully received by the second device in which the basis used for receiving said symbol matches the corresponding basis in the received second basis set used to transmit said symbol; generating, by the second device, the fourth set of symbols based combining the second received set of secret symbols with the received third symbol string, wherein one or more symbols of the fourth set of symbols correspond to one or more symbols of the first set of symbols; performing sifting operations between the first device and second device over the third communication channel based on the first received set of secret symbols at the first device and the fourth set of symbols at the second device for generating a common set of sifted symbols for forming a cryptographic key at the first and second devices.

Preferably, said generating the third symbol string further comprising: in response to determining the length of the first set of symbols is less than the length of the second set of symbols: truncating the second set of symbols to the length of the first set of symbols; and generating the third symbol string based on combining the first set of symbols with the truncated second set of symbols; and in response to determining the length of the second set of symbols is less than the length of the first set of symbols: truncating the first set of symbols to the length of the second set of symbols; and generating the third symbol string based on combining the truncated first set of symbols with the second set of symbols.

Preferably, said generating the third symbol string further comprising: in response to determining the length of the first set of symbols is less than the length of the second set of symbols: adjusting the second set of symbols by removing an agreed set of symbols from the second set of symbols until the adjusted length of the adjusted second set of symbols is the same as the first set of symbols; and generating the third symbol string based on combining the first set of symbols with the adjusted second set of symbols; and in response to determining the length of the second set of symbols is less than the length of the first set of symbols: adjusting the first set of symbols by removing an agreed set of symbols from the first set of symbols until the adjusted length of the adjusted first set of symbols is the same as the second set of symbols; and generating the third symbol string based on combining the adjusted first set of symbols with the second set of symbols.

Preferably, generating the third symbol string further comprises one or more from the group of: generating the third symbol string based on performing an XOR operation using data representative of a first set of symbols and a second set of symbols, the first set of symbols based on converting each of the symbols in the first set of symbols to a string of symbols and the second set of symbols based on converting each of the symbols in the second set of symbols to a string of symbols; generating the third symbol string based on performing one time pad encryption operation(s) using data representative of, at least in part, the first set of symbols and the second set of symbols; and generating the third symbol string based on performing any other type of operation for obfuscating one or more symbols of the first set of symbols using the second set of symbols.

Preferably, the second device generating the fourth symbol string further comprises one or more from the group of: generating the fourth symbol string based on performing an XOR operation using the second received set of secret symbols and the received third symbol string; generating the fourth symbol string based on performing one time pad decryption operation(s) using the received second set of secret symbols and the third secret symbol string; and generating the fourth symbol string based on performing any other type of operation for extracting one or more symbols of the first secret symbol string using the second received set of secret symbols and the third symbol string.

Preferably, generating the third symbol string further comprises one or more from the group of: generating the third symbol string based on performing an XOR operation using data representative of, at least in part, the first secret symbol string and the second secret symbol string; generating the third symbol string based on performing one time pad encryption operation(s) using data representative of, at least in part, the first secret symbol string and the second secret symbol string; and generating the third symbol string based on performing any other type of operation for obfuscating one or more symbols of the first secret symbol string using the second secret symbol string.

Preferably, the second device generating the fourth symbol string further comprises one or more from the group of: generating the fourth symbol string based on performing an XOR operation using data representative of, at least in part, the second secret symbol string and the third symbol string; generating the fourth symbol string based on performing one time pad decryption operation(s) using data representative, of at least in part, the second secret symbol string and the third secret symbol string; and generating the fourth symbol string based on performing any other type of operation for extracting one or more symbols of the first secret symbol string using data representative of, at least in part, the second secret symbol string and the third symbol string.

Preferably, the first device and second device performing symbol sifting operations over the third communication channel therebetween based on: the first device forms a first matching basis set based on the first received set of secret symbols, wherein the first matching basis set includes all the basis states the first device used to receive the symbols of the first received set of secret symbols that match the corresponding basis states of the received first basis set used to transmit said symbol of the first set of symbols; and the first device sends over the third communication channel data representative of the first matching basis set to the second device; the second device forms a second matching basis set based on the second received set of secret symbols, wherein the second matching basis set includes all the basis states the second device used to receive the symbols of the second received set of secret symbols that match the corresponding basis states of the received second basis set used to transmit said symbol of the second set of symbols; the second device sends over the third communication channel data representative of the second matching basis set to the first device; the first device generates a first common set of sifted symbols based on discarding each symbol in the first received set of secret symbols in which the corresponding basis in the first matching basis set is different to the corresponding basis in the received second matching basis set; the second device generates a second common set of sifted symbols based on discarding each symbol in the fourth set of secret symbols in which the corresponding basis in the received first matching basis set is different to the corresponding basis in the second matching basis set; and the first and second devices forming a cryptographic key based on the first and second common set of sifted symbols, respectively.

Preferably, the first device and second device performing symbol sifting operations over the third communication channel therebetween based on: generating, by the first device, a first basis flag set based on the first received set of secret symbols and the received first basis set, wherein the first basis flag set includes an indication of each valid and invalid symbol of the first received set of secret symbols based on comparing the received first basis set with the basis set used by the first device to demodulate the symbols associated with the first received set of secret symbols; and sending, from the first device over the third communication channel, data representative of the first basis flag set to the second device; generating, by the second device, a second basis flag set based on the second received set of secret symbols and the received second basis set, wherein the second basis flag set includes an indication of each valid and invalid symbol of the second received set of secret symbols based on comparing the received second basis set with the basis set used by the second device to demodulate the symbols associated with the second received set of secret symbols; sending, from the second device over the third communication channel, data representative of the second basis flag set to the first device; generating, by the first device, a first common set of sifted symbols based on discarding each symbol in the first received set of secret symbols in which the corresponding indication in the first basis flag set is different to the corresponding indication in the received second basis flag set; generating, by the second device, a second common set of sifted symbols based on discarding each symbol in the fourth set of secret symbols in which the corresponding indication in the second basis flag set is different to the corresponding indication in the received first basis flag set; performing error detection and correction between the first and second common sets of sifted symbols to generate a common set of sifted symbols; and generating a cryptographic key at the first and second devices based on the common set of sifted symbols.

Preferably, each symbol represents $2^n$ binary bits, for n>1.

Preferably, each symbol represents a binary bit for n=1.

Preferably, the method of the first, second, third or fourth aspects further comprising generating a first secret symbol string by randomly selecting a symbols using a random number generator.

Preferably, the method of the first, second, third or fourth aspects further comprising generating a second secret symbol string by randomly selecting symbols using a random number generator.

Preferably, the random number generator is based on one or more from the group of: a cryptographic random number generator; a quantum qubit random number generator; or any suitable random number generator.

Preferably, the set of bases comprises at least two bases, each basis comprising at least two basis states, wherein the at least two basis states of each basis are orthogonal and the at least two basis states of said each basis are non-orthogonal to the at least two basis states of another basis of the set of bases.

Preferably, the set of bases comprises two bases and each basis of the set of bases comprises two basis states.

Preferably, the set of bases for modulating symbols for transmission over the first or second quantum channel comprises at least two bases from the group of: a rectilinear basis; a diagonal basis; a spherical basis; a circular basis; and/or any other type of basis comprising at least two basis states.

Preferably, the first and second quantum channels are optical quantum channels and the set of bases comprises at least two bases from the group of: a rectilinear photon polarisation basis; a diagonal photon polarisation basis; a spherical photon polarisation basis; a circular photon polarisation basis; and any other type of photon basis comprising two basis states.

Preferably, the first communication channel is based on a classical communication channel formed between the intermediary device and the first device.

Preferably, the method of the first, second, third or fourth aspects, the second communication channel is based on a classical communication channel formed between the intermediary device and the second device.

Preferably, the classical communication channel is based on one or more types of communication channels from the group of: optical communication channel; free-space optical communication channel; wireless communication channel; wired communication channel; radio communication channel; microwave communication channel; satellite communication channel; terrestrial communication channel; optical fibre communication channel; optical laser communication channel; any other type of one or more optical, wireless and/or wired communication channel(s) for transmitting data between devices; and two or more optical, wireless and/or wired communication channel(s) that form a composite communication channel for transmitting data between devices.

Preferably, the method of the first, second, third or fourth aspects, a quantum communication channel is based on one or more types of quantum communication channels from the group of: optical quantum communications; free-space optical quantum communications; optical fibre quantum communications; optical laser quantum communications; any other type of quantum communications for transmitting data over a quantum communication channel between devices.

Preferably, the method of the first, second, third or fourth aspects, where the intermediary device is a satellite apparatus, the first device and second device are satellite ground stations or devices, wherein the first quantum communication channel is a free-space optical quantum communication channel, the second quantum communication channel is a free-space optical quantum communication channel, and the first and second communication channels are non-quantum satellite communications channels.

Preferably, the method of the first, second, third or fourth aspects, wherein the intermediary device is a ground station or device, the first device and second device are satellites, wherein the first quantum communication channel is a free-space optical quantum communication channel, the second quantum communication channel is a free-space optical quantum communication channel, and the first and second communication channels are non-quantum satellite communications channels.

Preferably, the method of the first, second, third or fourth aspects, wherein the intermediary device is a terrestrial communication apparatus, the first device and second device are terrestrial devices, wherein the first quantum communication channel is a fibre optic quantum communication channel, the second quantum communication channel is a fibre optic quantum communication channel, and the first and second communication channels are classical terrestrial communications channels.

Preferably, the method of the first, second, third or fourth aspects, wherein the intermediary device is a terrestrial communication apparatus, the first device and second device are terrestrial devices, wherein the first quantum communication channel is a free-space optic quantum communication channel, the second quantum communication channel is a free-space optic quantum communication channel, and the first and second communication channels are classical terrestrial communications channels.

Preferably, the method of the first, second, third or fourth aspects, wherein the intermediary device is a terrestrial communication apparatus, the first device and second device are terrestrial devices, wherein the first quantum communication channel is a free-space optic quantum communication channel, the second quantum communication channel is a fibre optic quantum communication channel, and the first and second communication channels are classical terrestrial communications channels.

Preferably, the method of the first, second, third or fourth aspects the first and second communications channels are encrypted communication channels.

Preferably, the method of the first, second, third or fourth aspects further comprising encrypting transmission data or messages prior to transmitting said data or messages to: the first device over the first classical communication channel; or the second device over the second classical communication channel.

Preferably, the method of the first, second, third or fourth aspects, wherein one or more authentication protocols are used by the intermediary device and the first or second device for authenticating the intermediary, first or second devices prior to communicating over the first or second communications channels.

Preferably, the method of the first, second third or fourth aspects, further comprising authenticating the first and second device prior to transmitting data to the first and second device over the first and second communication channels, respectively.

Preferably, the method of the first, second, third or fourth aspects further comprising selecting a decoy state protocol from a set of decoy state protocols for use in transmitting data over the first or second quantum channels.

In a fifth aspect, the present disclosure provides an intermediary apparatus comprising a processor unit, a memory unit, and a communication interface, the processor unit connected to the memory unit and the communication interface, wherein the processor unit, memory unit and communication interface are adapted to implement the computer-implemented method according to the first aspect, one or more features thereof, one or more features herein, combinations thereof, modifications thereto and/or as described herein.

In a sixth aspect, the present disclosure provides an apparatus comprising a processor unit, a memory unit, and a communication interface, the processor unit connected to the memory unit and the communication interface, wherein the processor unit, memory unit and communication interface are adapted to implement the computer-implemented method according to the second aspect, one or more features thereof, one or more features herein, combinations thereof, modifications thereto and/or as described herein.

In a seventh aspect, the present disclosure provides an apparatus comprising a processor unit, a memory unit, and a communication interface, the processor unit connected to the memory unit and the communication interface, wherein the processor unit, memory unit and communication interface are adapted to implement the computer-implemented method according to the third aspect, one or more features thereof, one or more features herein, combinations thereof, modifications thereto and/or as described herein.

In an eighth aspect, the present disclosure provides a system comprising: an intermediary device comprising an apparatus according to the fifth aspect; an first device comprising an apparatus according the sixth aspect; and a second device comprising an apparatus according to the seventh aspect; wherein the intermediary device, first device and second device are configured to communicate with each other for establishing a shared a cryptographic key between the first and second devices.

In an ninth aspect, the present disclosure provides a system comprising an intermediary device, a first device and a second device, wherein the intermediary device, first device and second device are configured to implement the corresponding steps of the computer-implemented method according to the first, second, third and/or fourth aspects, one or more features thereof, one or more features herein, combinations thereof, modifications thereto and/or as described herein.

Preferably, the system of the eighth or ninth aspects wherein the system is a satellite quantum key distribution system comprising a plurality of satellites, each satellite including the functionality of an intermediary device, each satellite in communication with one or more ground receiving stations, and each ground receiving station including the functionality of the first and/or second devices.

In an tenth aspect, the present disclosure provides a computer-readable medium comprising computer code or instructions stored thereon, which when executed on a processor, causes the processor to perform the computer implemented method according to the first and/or fourth aspects, one or more features thereof, one or more features herein, combinations thereof, modifications thereto and/or as described herein.

In an eleventh aspect, the present disclosure provides a computer-readable medium comprising computer code or instructions stored thereon, which when executed on a processor, causes the processor to perform the computer implemented method according to the second and/or fourth aspects, one or more features thereof, one or more features herein, combinations thereof, modifications thereto and/or as described herein.

In an twelfth aspect, the present disclosure provides a computer-readable medium comprising computer code or instructions stored thereon, which when executed on a processor, causes the processor to perform the computer implemented method according to the third and/or fourth aspects, one or more features thereof, one or more features herein, combinations thereof, modifications thereto and/or as described herein.

In an thirteenth aspect, the present disclosure provides a computer-readable medium comprising computer code or instructions stored thereon, which when executed on a processor, causes the processor to perform the computer implemented method according to the fourth aspect, one or more features thereof, one or more features herein, combinations thereof, modifications thereto and/or as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 1d is a schematic diagram illustrating another example terrestrial QKD system based on the QKD system(s) of FIG. 1a, 1b or 1c for implementing another example QKD protocol according to the invention;

DETAILED DESCRIPTION

Figure 1A:
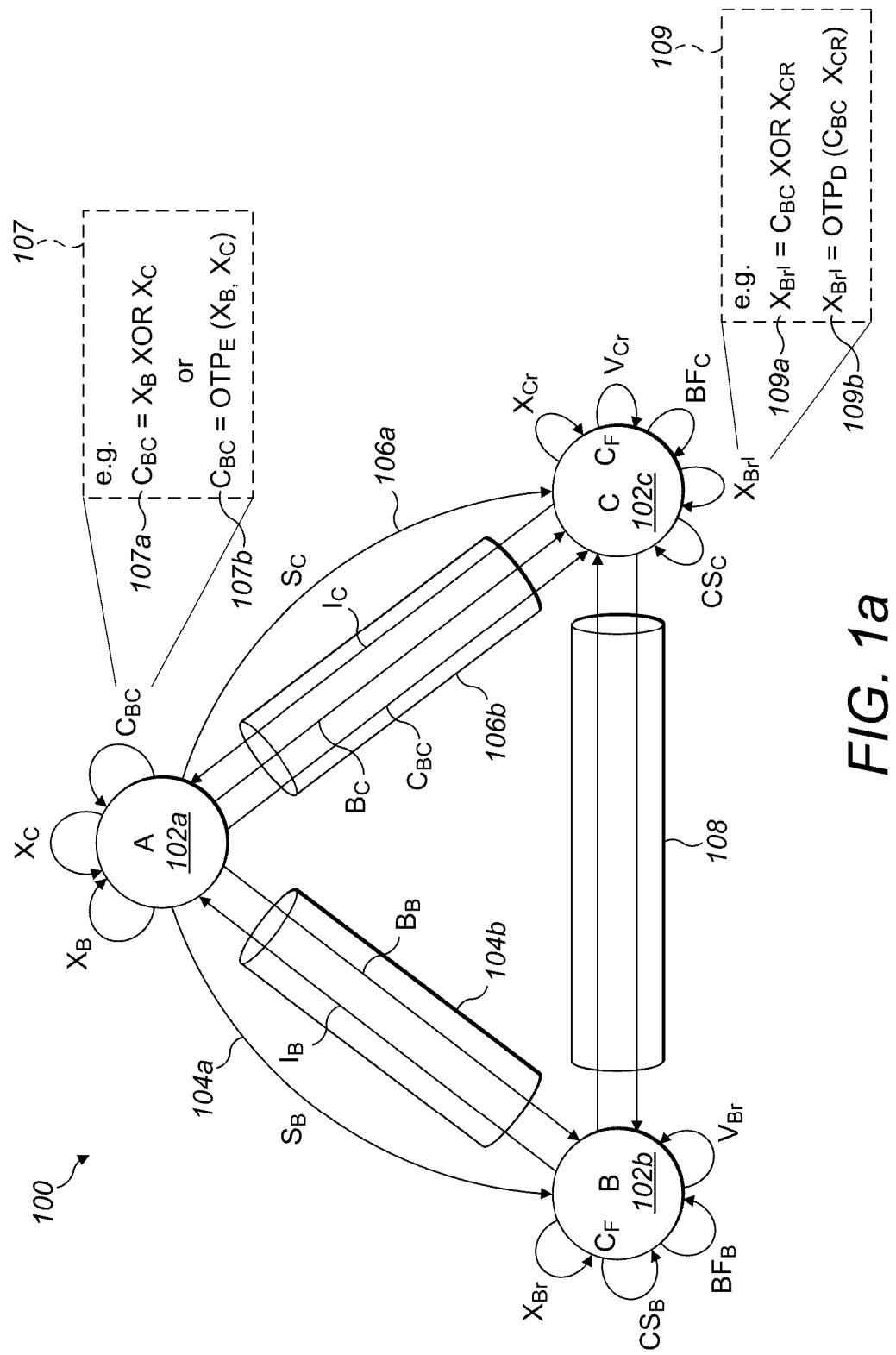
FIG. 1a is a schematic diagram illustrating an example QKD system for implementing an example QKD protocol according to the invention.

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides method(s), apparatus and system(s) of quantum key distribution between a first device and a second device via an intermediary device using a quantum key distribution protocol. The quantum key distribution protocol enables the intermediary device to send randomly generated first and second secret symbol strings (e.g. n bit(s) per symbol are represented by $M=2^n$ different symbols, where $n \geq 1$) to the first device and second device, respectively, over respective quantum channels, and further processing of the first and second secret symbol strings is performed by the intermediary device via respective classical communication channels with the first and second devices, where the intermediary device generates a third symbol string for sending via a classical communication channel to the second device. The third symbol string is based on combining a set of symbols of the first secret symbol string with a set of symbols of the second secret symbol string in such a way that enables the second device to retrieve a fourth set of symbols based on using its received second symbol string. The combining of the set of symbols of the first secret symbol string and the set of symbols of the second secret symbol string may be based on, without limitation, for example one-time-pad encryption/decryption, masking, exclusive OR (XOR) operations on bits when symbols converted to bits, or extended XOR operations on symbols or obfuscated set of the first secret symbols.

The second device is configured to perform a reverse set of operations to extract a fourth set of symbols using symbols from the successfully received second secret symbol string. The symbols of the fourth set of symbols correspond to symbols of the first set of symbols. Neither the first device nor the second device send any information to the intermediary device that enables the intermediary device to know or determine exactly what the first and second devices successfully received. Thus, only the first and second devices fully know which symbols (or bits) of the first symbol string were successfully received by both the first and second devices. This information is not shared with the intermediary device. From this, the first and second devices may perform symbol (or bit) sifting using the received first set of symbols at the first device and the fourth set of symbols generated at the second device form determining a common set of sifted symbols from which a cryptographic key may be derived by the first and second devices. The cryptographic key is only known to the first and second devices, thus, they can perform cryptographic operations with each other. The first and second devices then determine a cryptographic key in a quantum-safe manner even when the intermediary device is not a trusted device.

Combining the set of symbols of the first secret symbol string with the set of symbols of the second symbol string may be performed using, without limitation, for example: exclusive or (XOR) operations on the sets of symbols of the first and second symbol strings (e.g. converting the symbol strings into bit strings and performing bitwise XOR); extended XOR operations on the sets of symbols of the first and second symbol strings (e.g. using a mathematically defined extended set of "symbol XOR" operations on symbols that preserve the mathematical properties of bitwise XOR operations); one-time-pad encryption of the set of symbols of the first secret symbols using the set of symbols of the second secret symbols; any other encryption operation on the set of symbols of the first symbol string such that the second device is able to decrypt and retrieve set of symbols of the first symbol string using the set of symbols of the second symbol string successfully received by the second device.

A quantum communication channel(s) may comprise or represent a communication channel capable of transmitting and/or receiving at least quantum information. Examples of a quantum communication channel or quantum channel that may be used according to the invention may include or be based on, without limitation, for example on one or more types of quantum communication channels associated with the group of: optical quantum communications; free-space optical quantum communications; optical fibre quantum communications; optical laser quantum communications; communications using electromagnetic waves such as, without limitation, for example radio, microwave, infra-red, gigahertz, terahertz and/or any other type of electromagnetic wave communications; communications based on electron spin and the like; any other type of quantum communications for transmitting and receiving data over a quantum communication channel between devices. It is noted that one or more types of quantum communication channel(s) may be capable of transmitting and/or receiving non-quantum or classical information.

A standard, classical or non-quantum communication channel(s) may comprise or represent any communication channel between two devices that at least is capable of transmitting and/or receiving non-quantum information. Examples of standard, classical and/or non-quantum communication channels according to the invention may include or be based on, without limitation, for example on one or more types of communication channels from the group of: any one or more physical communication channel(s); optical communication channel; free-space optical communication channel; wireless communication channel; wired communication channel; radio communication channel; microwave communication channel; satellite communication channel; terrestrial communication channel; optical fibre communication channel; optical laser communication channel; telecommunications channels; 2G to 6G and beyond telecommunications channels; logical channels such as, without limitation, for example Internet Protocol (IP) channels; any other type of logical channel being provided over any standard, classical or non-quantum physical communication channel; one or more other physical communications or carriers of data such as, without limitation, for example avian carriers, paper, sealed briefcases, courier or other delivery service and the like; any other type of one or more optical, wireless and/or wired communication channel(s) for transmitting data between devices; and/or two or more optical, wireless and/or wired communication channel(s) that form a composite communication channel for transmitting data between devices; and/or any combination of two or more standard, classical or non-quantum communication channel(s) that form a composite communication channel for transmitting and/or carrying data between devices; combinations thereof, modifications thereto, and/or as described herein and the like and/or as the application demands. It is noted that one or more types of standard, classical or non-quantum communication channel(s) may be capable of transmitting and/or receiving quantum information.

The intermediary device may comprise or represent any device or apparatus, component or system that is adapted to, configured to, includes the capability of: establishing a quantum communication channel with one or more other communication devices and/or transmitting data over the quantum communication channel with the one or more other communication devices and, also, establish one of more non-quantum, standard or classical communication channels with said one or more other communication devices for transmitting/receiving data to/from said one or more other communication devices for implementing the QKD protocol according to the invention. Examples of an intermediary device as described herein and/or according to the invention may include, without limitation, for example a satellite or apparatus/components thereof, a ground station or apparatus/components thereof, a relay station, repeater, telecommunication apparatus, network apparatus, network nodes, routers, and/or any apparatus, communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s).

The first or second communication device (also referred to herein as first or second device) may comprise or represent any device or apparatus with communication components/systems or communication capabilities configured to at least receive data over a quantum communication channel and/or establish one or more non-quantum, standard or classical communication channels with an intermediary device and/or other devices for implementing the QKD protocol according to the invention. Examples of a first or second communication devices according to the invention may include, without limitation, for example a satellite and/or apparatus/components thereof, a satellite ground receiving station and/or apparatus/components thereof, optical ground receiving station, user device, telecommunication apparatus, network apparatus, network nodes, routers, and/or any communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s).

FIG. 1a is a schematic diagram illustrating an example quantum key distribution system 100 that performs a QKD protocol according to the invention. The QKD system 100 includes an intermediary device 102a, a first device 102b and a second device 102c in communication with each other. The first and second devices 102b and 102c may require a shared key that is facilitated by at least the intermediary device 102a. The intermediary device 102a is configured to generate random symbol strings/streams and transmit these to the first and second devices 102a and 102c according to the QKD protocol over first and second quantum communication channels 104a and 106a, respectively. The intermediary device 102a also communicates with the first and second devices 102b and 102c over first and second non-quantum or standard/classical communications channels 104b and 106b, respectively, for exchanging further key and protocol data. Once all the required key and/or protocol data has been exchanged between the intermediary device 102a and the first and second devices 102b and 102c, the first and second devices 102b and 102c communicate with each other over a third non-quantum or standard/classical communications channel 108 to establish a common secret set of symbols from which a common cryptographic key or final cryptographic key (e.g. $C_F$) may be agreed upon and/or derived and the like for use by the first and second devices 102b and 102c in, without limitation, for example cryptographic operations/communications between the first and second device 102b and 102c. The QKD protocol ensures that the final cryptographic key $C_F$ can be agreed upon that the intermediary device 102a cannot derive even though it generated the first and second secret symbol strings for each device 102b and 102c.

For simplicity, the intermediary device 102a is referred to as Alice 102a, the first device 102b is referred to as Bob 102b and the second device 102c is referred to as Carol 102c. The implementation of the QKD protocol with respect to Alice 102a, Bob 102b and Carol 102c is described, without limitation, for example in five main protocol parts or portions based on the following: a first protocol part describing a first set of key exchange interactions between Alice 102a and Bob 102b; a second protocol part describes a second set of key exchange interactions between Alice 102a and Carol 102c; a third protocol part describes third set of key exchange interactions between Alice 102a and Carol 102c; a fourth protocol part describes fourth set of key exchange interactions by Carol 102c; and a fifth protocol part describes a fifth set of key exchange interactions between Bob 102b and Carol 102c for forming the common/shared key of the QKD protocol between Bob 102b and Carol 102c. The following QKD protocol parts are described, without limitation, for example in relation to Alice 102a, Bob 102b and/or Carol 102c based on the following:

In the first part of the QKD protocol, Alice 102a and Bob 102b perform a first set of key exchange interactions in which Alice 102a and Bob 102b exchange a first secret symbol stream or string (e.g. $S_B$). Each symbol in the first secret symbol stream (e.g. $S_B$) may represent n bit(s), so each symbol may be one of $M=2^n$ different symbols where Alice 102a randomly generates the symbols for the first secret symbol stream (e.g. $S_B$), or randomly generates a bit string/stream that is converted into the first secret symbol stream (e.g. $S_B$). Alice 102a sends the first secret symbol string, $S_B$, (e.g. 1,000,000 bits, when n=1) to Bob 102*b* over a first quantum channel 104*a*. For each symbol in $S_B$ that is sent to Bob 102*b*, Alice 102*a* randomly selects a basis from a set of bases (e.g. B) for modulating said each symbol for transmission over the first quantum channel 104*a*.

For example, the first quantum channel 104*a* may be, without limitation, a free-space optical quantum channel or a fibre optical quantum channel between Alice 102*a* and Bob 102*b*, where Alice 102*a* has a quantum optical transmitter and Bob 102*b* has a quantum optical receiver. The set of bases B includes at least two different bases. Each of the bases includes a set of basis states for representing each of the different $M=2^n$ symbols of the first secret symbol string. Each set of basis states for each basis includes $M=2^n$ different basis states. The basis states for each basis may be orthogonal. The basis states for a first basis may not be orthogonal to one or more basis states of a second basis of the set of bases.

The set of bases B may include two or more bases, without limitation, for example, a rectilinear optical polarisation basis, a diagonal optical polarisation basis, angular optical polarisation basis, and/or any other suitable optical basis for converting the symbols into modulated symbols for transmission over a quantum channel. Although optical quantum channels and corresponding bases for transmitting symbols over said optical quantum channel are described, by way of example only the invention is not so limited, it is to be appreciated by the skilled person that the QKD protocol according to the invention may be used over any type of quantum communication channel between Alice 102*a* and Bob 102*b* and/or as the application demands.

Bob 102*b* demodulates each symbol of the first secret symbol string, $S_B$, received via the first quantum channel 104*a* by randomly selecting a basis from the set of bases B (e.g. Bob 102*b* has the same set of bases B as Alice 102*a*) that is used to demodulate the received symbols from the first quantum channel 104*a*. Typically, a symbol is successfully received when the output or measurement of the demodulator of Bob 102*b* clearly indicates data representative of one of the basis states of the selected basis that Bob 102*b* randomly selected. Thus, a symbol is successfully received when the measurement output of the demodulator indicates a symbol has actually been received in relation to the basis states of the selected basis used. This means that a successfully received symbol output by the demodulator will be either: 1) a symbol that is the same symbol as the transmitted symbol because the selected basis (or basis state) used by the demodulator matches the selected basis (or basis state) used to originally modulate the transmitted symbol; and 2) a symbol that is a different symbol as the transmitted symbol because the selected basis (or basis state) used by the demodulator did not match the selected basis (or basis state) used to originally modulate the transmitted symbol. That is, a successfully received symbol is a symbol output or measurement from the demodulator in which a matching basis or an unmatched basis is used compared with the basis used for modulating and transmitting the symbol. An unsuccessfully received symbol is when the measurement output of the demodulator is below predetermined basis state thresholds indicating no symbol is received in relation to the selected basis used. This means a symbol has not been received at all in relation to the selected basis used. For example, when the measurement of the received symbol is greater than or equal to a basis state threshold corresponding to a basis state of the selected basis, then a symbol has been successfully received. For example, the measurement of the received symbol reaches a basis state threshold corresponding to a basis state of the selected basis, then the symbol has been successfully received. A symbol is not successfully received when the output or measurement of the demodulator of Bob 102*b* is below or does not reach a basis state threshold corresponding to a basis state of the selected basis. A symbol is valid, when the symbol is successfully received and when the basis (or basis state) used to modulate and transmit the symbol is the same as the basis (or basis state) used to demodulate the transmitted symbol. A symbol is invalid, when the symbol is successfully received and when the basis (or basis state) used to modulate and transmit the symbol is the different to the basis (or basis state) used to demodulate the transmitted symbol.

In particular, if Alice 102*a* and Bob 102*b* chose the same basis for modulating a symbol for transmission and demodulating the transmitted symbol, respectively, then quantum physics states that there is a high probability that the basis state of the symbol received by Bob 102*b* will be the same as the transmitted basis state used for transmitting the symbol by Alice 102*a*, i.e. is validly and successfully received. The symbol is valid because the basis used by Alice 102*a* for transmission is the same basis used by Bob 102*b* when receiving the transmitted symbol. If Alice 102*a* and Bob 102*b* chose a different basis for modulating a symbol for transmission and demodulating the transmitted symbol, respectively, then quantum physics states that there is a low probability that the basis state of the symbol received by Bob 102*b* will be correlated with the transmitted basis state used for transmitting the symbol by Alice 102*a*, but instead will be a random selection from the possible basis states in that basis, i.e. is successfully received, but invalid because the received/demodulated symbol is different to the original symbol that is transmitted.

Given that there may be losses in the quantum channel, including the quantum transmitter and receiver, it is to be expected that some of the symbols transmitted by Alice 102*a* over the first quantum channel 104*a* are not successfully received by Bob 102*b*. Thus, Bob 102*b* determines the symbol numbers or locations within the first secret symbol string (e.g. $S_B$) that Bob 102*b* successfully receives. Bob 102*b* then sends to Alice 102*a* over a first classical communication channel 104*b* an indication of successfully received symbols (e.g. $I_B$) that includes, without limitation, for example data representative of the symbol numbers (e.g. bit numbers) of the successfully received symbols (e.g. #2, #718, #2818, . . . ) Note, the symbol numbers do not indicate which basis Bob 102*b* used or which basis states Bob 102*b* actually assigned to each received symbol or even which symbols were received. Rather, the data representative of symbol numbers or locations are simply an indication that Bob 102*b* managed to demodulate those corresponding symbols and map them to a basis state.

For example, when n=1 bit per symbol i.e. a symbol is a bit (e.g. two symbols are used to represent the bits '0' and '1'), if Alice 102*a* sends a first secret bit string or stream of 1,000,000 bits over the first quantum channel 104*a*, then, when Bob 102*b* randomly selects the basis from the set of bases B for demodulating the bits of the first secret bit string, Bob 102*b* may only, without limitation, for example successfully receive around 1000 bits due to atmospheric losses and/or other losses of the first quantum channel 104*a*. So, Bob 102*b* will send a set of indicative values (e.g. $I_B$) of approximately 1000 values representing the bit numbers or bit positions of the bits in the first secret bit string that Bob 102*b* successfully received.

Both Alice 102*a* and Bob 102*b* may discard all the other symbols (e.g. bits) from the first secret symbol string (e.g.

$S_B$) that Bob 102b did not successfully receive. This means that Alice 102a may generate or form a first set of secret symbols (e.g. $X_B$) from the first secret symbol stream (e.g. $S_B$) that were successfully received by Bob 102b using the received symbol numbers representing the symbols Bob 102b successfully received. Similarly, Bob 102b may discard all the unsuccessfully received symbols resulting in a first received set of secret symbols (e.g. $X_{Br}$).

Alice 102a then sends to Bob 102b over the first classical communication channel 104b a first set of bases (e.g. $B_B$) corresponding to each basis state that Alice 102a used to transmit the corresponding symbol of the first set of secret symbols (e.g. $X_B$) in its original transmission (e.g. $S_B$) over the first quantum channel 104a to Bob 102b. Bob 102b then compares the basis that Bob 102b used to demodulate each symbol with the corresponding basis in the received set of bases (e.g. $B_B$) sent by Alice 102a. Thus, Bob 102b may form a first set of basis flags (e.g. $BF_B$) including a plurality of indications/flags corresponding to each symbol of the first received set of secret symbols (e.g. $X_{Br}$), where each indication/flag for a symbol includes data representative of whether that symbol in the first received set of secret symbols (e.g. $X_{Br}$) was validly received or not based on the comparison of bases (e.g. an indication/flag of '1' indicates a validly received symbol, an indication/flag of '0' indicates a symbol not validly received). Thus, Bob 102b may also form a valid received set of secret symbols (e.g. $V_{Br}$) comprising only those symbols in which Bob 102b used a matching basis during demodulation of the original first secret symbol string (e.g. $S_B$). For example, when n=1, Bob 102b may find that around 500 bits of the 1000 "successfully" received bits from the received first secret bit string have the same basis are valid.

In a second part of the QKD protocol, Alice 102a and Carol 102c perform a second set of key exchange data interactions. For example, Alice 102a sends a second secret symbol string (e.g. $S_C$) (e.g. also 1,000,000 bits, when n=1) to Carol 102c over a second quantum channel 106a. For each symbol in the second secret symbol string (e.g. $S_C$) that is sent to Carol 102c, Alice 102a randomly selects a basis from the set of bases B for modulating said each symbol for transmission over the second quantum channel 106a. For example, the second quantum channel 106a may be, without limitation, for example a free-space optical quantum channel between Alice 102a and Carol 102c, where Alice 102a has a quantum optical transmitter and Carol 102c has a quantum optical receiver. Carol 102c demodulates each symbol received via the second quantum channel 106a by randomly selecting a basis from the set of bases B that is used to demodulate the received symbols from the second quantum channel 106a.

Typically, as for Bob 102b, a symbol is successfully received when the output or measurement of the demodulator clearly indicates data representative of one of the basis states of the selected basis that Carol 102c randomly selected. Given that there may be losses in the quantum channel, including the quantum transmitter and receiver, it is to be expected that some of the symbols transmitted by Alice 102a over the second quantum channel 106a are not successfully received by Carol 102c. Thus, Carol 102c determines the symbol numbers or locations within the second secret symbol string (e.g. $S_C$) that are successfully received. These symbol numbers will be different to those sent by Bob 102b. Carol 102c then sends to Alice 102a over a second classical communication channel, set up between Alice 102a and Carol 102c, an indication of successfully received symbols (e.g. $I_C$) that includes, without limitation, for example data representative data representative of the symbol numbers (e.g. bit numbers) of the successfully received symbols (e.g. #3, #141, #5926, . . . ) Note, the symbol numbers do not indicate which basis Carol 102c used or which basis states Carol 102c actually assigned to each received symbol or even which actual symbols were received. Rather, the symbol numbers or locations are simply an indication that Carol 102c managed to demodulate those corresponding symbols and map them to a basis state.

For example, when n=1 bit per symbol (e.g. two symbols are used to represent the bits '0' and '1'), if Alice 102a sends a second secret bit string or stream of 1,000,000 bits over the second quantum channel 106a, then in practice, when Carol 102c randomly selects the basis from the set of bases B for demodulating the bits of the second secret bit string, Carol 102c may only, without limitation, for example successfully receive around 1000 bits due to atmospheric losses and/or other losses of the second quantum channel 106a. So, Carol 102c will send approximately 1000 values in via set $I_C$ representing the bit numbers or bit positions of the bits in the second secret bit string that Carol 102c successfully received.

Both Alice 102a and Carol 102c may discard all the other symbols (e.g. bits) from the first secret symbol string (e.g. $S_C$) that Carol 102c did not successfully receive. This means that Alice 102a may generate or form a second set of secret symbols (e.g. $X_C$) from the second secret symbol stream (e.g. $S_C$) that were successfully received by Carol 102c using the received symbol numbers in $I_C$ representing the symbols Carol 102c successfully received. Similarly, Carol 102c may discard all the unsuccessfully received symbols resulting in a second received set of secret symbols (e.g. $X_{Cr}$).

Alice 102a then sends to Carol 102c over the second classical communication channel 106b a second set of bases (e.g. $B_C$) corresponding to each basis state that Alice 102a used to transmit the corresponding symbol of the second set of secret symbols (e.g. $X_C$) in its original transmission (e.g. $S_C$) over the second quantum channel 106a to Carol 102c. Carol 102c then compares the basis that Carol 102a used to demodulate each symbol with the corresponding basis in the received second set of bases (e.g. $B_C$) sent by Alice 102a. Thus, Carol 102c may form a second set of basis flags (e.g. $BF_C$) including a plurality of indications/flags corresponding to each symbol of the second received set of secret symbols (e.g. $X_{Cr}$), where each indication/flag for a symbol includes data representative of whether that symbol in the second received set of secret symbols (e.g. $X_{Cr}$) was validly received or not based on the comparison of bases (e.g. an indication/flag of '1' indicates a validly received symbol, an indication/flag of '0' indicates a symbol not validly received). The second set of bases $B_C$ can be used by Carol 102c to check which symbols of the second received set of secret symbols (e.g. $X_{Cr}$) were validly received. Thus, Carol 102c may also form a valid received set of secret symbols (e.g. $V_{Cr}$) comprising only those symbols in which Carol 102c used a matching basis during demodulation of the original second secret symbol string (e.g. $S_C$) that Alice 102a used for modulation of those symbols. For example, when n=1, Carol 102c may find that around 500 bits of the 1000 "successfully" received bits from the second secret bit string have the same basis and so were validly received.

In a third part of the QKD protocol, a third set of key exchange interactions is performed in which Alice 102a sends Carol 102c data representative of the first set of secret symbols (e.g. $X_B$) that Bob 102b indicated to Alice 102a have been successfully received by Bob 102b. Alice 102a does not know which symbols of the first set of secret symbols (e.g. $X_B$) that Bob 102b validly received. Rather, Alice 102a sends Carol 102c the first set of secret symbols (e.g. $X_B$) using a masking or encryption approach to protect the first set of secret symbols (e.g. $X_B$). In particular, Alice 102a generates a third secret symbol string (e.g. $C_{BC}$) based on Alice 102a performing a set of processing operations 107 for combining the first set of secret symbols (e.g. $X_B$) with the second set of secret symbols (e.g. $X_C$) using one or more combining operations. The first set of secret symbols (e.g. $X_B$) correspond to those symbols from the first secret symbol string (e.g. $S_B$) that Bob 102b indicated to Alice 102a were received successfully by Bob 102b (e.g. in the above example, when n=1, roughly 1000 bits were received successfully by Bob 102b). The second set of secret symbols (e.g. $X_C$) correspond to those symbols from the second secret symbol string (e.g. $X_C$) that Carol 102c indicated to Alice 102a were received successfully by Carol 102c (e.g. in the above example, when n=1, roughly 1000 bits were received successfully by Carol 102c).

For example, the one or more processing operations 107 performed for combining the first and second sets of secret symbols (e.g. $X_B$ and $X_C$) may include, without limitation, for example, one or more processing operations of: when n=1, then symbol strings are bit strings, and the one or more symbol operations include a bitwise XOR operation 107a performed between the first set of secret bits (e.g. $X_B$) and the second set of secret bits (e.g. $X_C$) producing a third secret bit string $C_{BC}$ (e.g. $C_{BC}=X_B$ XOR $X_C$); when n>1, the first and second sets of secret symbols (e.g. $X_B$ and $X_C$) may be converted to bit strings and the one or more symbol operations may include a bitwise XOR operation performed between the first set of secret bits (e.g. $X_{Bb}$) and the second set of secret bits (e.g. $X_{Cb}$), resulting in a third secret bit string (e.g. $C_{Bcb}=X_{Bb}$ XOR $X_{Cb}$), which may be re-converted into the third secret symbol string (e.g. $C_{BC}$); an extended XOR operation, with equivalent properties as a bitwise XOR, may be performed directly on the corresponding symbols of the first and second sets of secret symbols (e.g. $C_{BC}=X_B$ extXOR $X_C$); one-time-pad (OTP) encryption operations 107b on the first set of secret symbols (e.g. $X_B$) using the second set of secret symbols (e.g. $X_C$) as the OTP, or using an OTP or key that was previously exchanged with Carol 102c (e.g. $C_{BC}=OTP_E(X_B, X_C)$); and/or any other masking or obfuscation operation using the first and second sets of secret symbols (e.g. $X_B$ and $X_C$) for producing a third secret symbol string (e.g. $C_{BC}$), from which Carol 102c may derive a received first set of secret symbols (e.g. $X_{Br}$) using Carol's 102c received set of secret symbols (e.g. $X_{Cr}$). Alice 102a sends the third secret symbol string (e.g. $C_{BC}$) to Carol 102c over the second classical communication channel 106b.

For the above example, when n=1 and the first set of bits and the second set of bits each equals 1000 bits, Alice 102a performs a bitwise XOR between the first set of bits (e.g. bits successfully received by Bob 102b) and the second set of bits (e.g. bits successfully received by Carol 102c) producing a third secret bit string (e.g. $C_{BC}$). Alice 102a sends the third secret bit string (e.g. $C_{BC}$) to Carol 102c via the second classical communication channel 106b.

In a fourth part of the QKD protocol, a fourth set of key exchange interactions is performed by Carol 102c. Once Alice 102a sends Carol 102c the third secret symbol string (e.g. $C_{BC}$), Carol 102c performs a set of corresponding processing operations 109 for generating a fourth set of secret symbols (e.g. $X_{Br}'$) using the received second set of secret symbols (e.g. $X_{Cr}$), which Carol 102c successfully received, and the received third secret symbol string (e.g. $C_{BC}$). The fourth set of secret symbols (e.g. $X_{Br}'$) includes symbols from the first secret set of symbols (e.g. $X_{Br}$). For example, if Alice 102a performed an XOR operation 107a using the first and second sets of secret symbols (e.g. $X_B$ and $X_C$) to produce the third set of secret symbols (e.g. $C_{BC}$), then Carol 102c can perform an XOR operation(s) 109a for generating a fourth set of secret symbols (e.g. $X_{Br}'$), where the XOR operation(s) 109a operates using the received third secret symbol string (e.g. $C_{BC}$) and the received second set of symbols (e.g. $X_{Cr}$), i.e. the fourth set of secret symbols $X_{Br}'=C_{BC}$ XOR $X_{Cr}$. For example, when n=1, the symbol strings are bit strings and Alice 102a uses the bitwise XOR operation 107a to generate a third secret bit string (e.g. $C_{BC}=X_B$ XOR $X_C$) using the first set of bits (e.g. $X_B$) and second set of bits (e.g. $X_C$). Carol 102c, on receiving the third secret bit string (e.g. $C_{BC}$), performs a bitwise XOR operation 109a using the received third secret bit string (e.g. $C_{BC}$) and the received set of secret symbols (e.g. $X_{Cr}$) to generate a fourth secret bit string (e.g. $X_{Br}'=C_{BC}$ XOR $X_{Cr}$), which includes data representative of bits from the first secret bit string (e.g. $X_B$). For example, $X_{Br}'=(X_B$ XOR $X_C)$ XOR $X_{Cr}=(X_B$ XOR $(X_C$ XOR $X_{Cr})=X_B$, when no errors occur in the successful symbols that Carol 102c receives. If there are errors in the successful symbols that Carol 102c receives, then only those symbol positions of the symbols that Carol 102c validly receives (e.g. $V_{Cr}$) in $X_{Br}'$ will correspond to the same symbol positions in $X_B$.

In another example, when n>1, Alice 102a may have converted the first and second sets of secret symbol strings into bit strings in which a bitwise XOR operation is performed between the first set of secret bit strings and the second set of secret bit string, resulting in a third secret bit string, which may be re-converted into the third secret symbol string. Thus, Carol 102c may perform a similar set of operations, by converting the received third secret symbol string into a received third secret bit string and perform a bitwise XOR operation using the received third secret bit string and the received second set of secret bits (converted from the received second set of secret symbols) to generate a fourth secret bit string, which is converted to a fourth secret symbol string. Alternatively, Alice 102a may use one or more extended XOR operations performed on the corresponding symbols of the first and second sets of secret symbols to generate the third secret symbol string. Carol 102c, may then perform similar one or more extended XOR operations using the received third secret symbol string and the received second set of secret symbols to generate the fourth symbol string. Alternatively or additionally, Alice 102a may have used OTP encryption operations 107b on the first set of symbols (e.g. $X_B$) using the second set of symbols (e.g. $X_C$) (or an OTP exchanged with Carol 102c) to generate the third secret symbol string (e.g. $C_{BC}=OTP_E(X_B, X_C)$), in which Carol 102c performs OTP decryption operations 109b on the received third secret symbol string (e.g. $C_{BC}$) using the received second set of symbols (e.g. $X_{Cr}$) (or an OTP exchanged with Alice 102a) to generate the fourth secret symbol string (e.g. $X_{Br}'=OTP_D(C_{BC}, X_{Cr})$). Simply put, Carol 102c performs the required symbol operations required to generate a fourth secret symbol string (e.g. $X_{Br}'$) from the received third secret symbol string (e.g. $C_{BC}$) using, without limitation, for example the received second set of secret symbols (e.g. $X_{Cr}$), where the fourth secret symbol string (e.g. $X_{Br}'$) includes data representative of one or more symbols of the first secret symbol string (e.g. $S_B$) or first set of secret symbols (e.g. $X_B$).

It is noted that the received second set of secret symbols (e.g. $X_{Cr}$) includes only those symbols that Carol 102c considered were received successfully, but which have not been checked as valid. Thus, using an XOR or some of the above operations, some of the symbols in the received second set of secret symbols (e.g. $X_{Cr}$) may be invalid because Carol 102c may have used a different basis compared with the basis that Alice 102a used to transmit these symbols. This means that the corresponding symbols of the fourth secret symbol string (e.g. $X_{Br}'$) may be invalid. However, there will be a portion of symbols in the fourth secret symbol string (e.g. $X_{Br}'$) that are valid, which have positions in $X_{Br}'$ that correspond to the positions of the valid symbols in the received second set of secret symbols (e.g. $X_{Cr}$) i.e. the valid received second set of symbols (e.g. $V_{Cr}$). The valid symbols of $X_{Br}$ will be the same as the corresponding symbols of the first set of secret symbols $X_B$. The valid symbols of the fourth secret symbol string (e.g. $X_{Br}'$) correspond to the valid second received set of secret symbols that Carol 102c checked with the received set of bases $B_C$ from Alice 102a.

In a fifth part of the QKD protocol, a fifth set of key exchange interactions between Carol 102c and Bob 102b are performed. In particular, Carol 102c and Bob 102b perform symbol sifting (or bit sifting) or key exchange operations with each other using a third communication channel 108 in which Alice 102a is not a party to. For example, during the first part of the QKD protocol, Bob 102b used the received first set of bases $B_B$ from Alice 102a and the set of bases Bob 102b used when receiving the symbols in the received first set of secret symbols (e.g. $X_{Br}$) to determine a first set of basis flags (e.g. $BF_B$) (or list of matching bases). That is, Bob 102b formed a first set of basis flags (e.g. $BF_B$) including a plurality of indications/flags corresponding to each symbol of the first received set of secret symbols (e.g. $X_{Br}$), where each indication/flag for a symbol includes data representative of whether that symbol in the first received set of secret symbols (e.g. $X_{Br}$) was validly received or not based on the comparison of bases (e.g. an indication/flag of '1' indicates a validly received symbol, an indication/flag of '0' indicates a symbol not validly received).

Similarly, Carol 102c also used the received second set of bases $B_C$ from Alice 102a and the set of bases Carol 102c used when receiving the second symbol string to determine a second set of basis flags (e.g. $BF_C$) (or list of matching bases) including data representative of a whether each symbol in the received second set of secret symbols (e.g. $X_{Cr}$) was validly or not validly received. That is, Carol 102c formed a second set of basis flags (e.g. $BF_C$) including a plurality of indications/flags corresponding to each symbol of the second received set of secret symbols (e.g. $X_{Cr}$), where each indication/flag for a symbol includes data representative of whether that symbol in the second received set of secret symbols (e.g. $X_{Cr}$) was validly received or not based on the comparison of bases (e.g. an indication/flag of '1' indicates a validly received symbol, an indication/flag of '0' indicates a symbol not validly received).

Bob 102b sends the first set of basis flags (e.g. $BF_B$) (e.g. first set of matching bases) to Carol 102c and Carol 102c sends the second set of basis flags (e.g. $BF_C$) to Bob 102b over the third communication channel 108. For example, in the above example, when n=1, and if Bob 102b successfully received 1000 bits (some of which are valid or invalid), then the first set of basis flags (e.g. $BF_B$) includes 1000 indications/flags corresponding to the 1000 bits, each indication/flag representing whether the corresponding bit was validly received or not. Similarly, if Carol 102c successfully received 1000 bits, then the first set of basis flags (e.g. $BF_C$) includes 1000 indications/flags corresponding to the 1000 bits, each indication/flag representing whether the corresponding bit was validly received or not.

On receiving the second set of basis flags (e.g. $BF_C$) from Carol 102c, Bob 102b forms a first common set of secret symbols (e.g. $CS_B$) by comparing each basis flag in the first set of basis flags (e.g. $BF_B$) with each basis flag in the received second set of basis flags from Carol 102c (e.g. $BF_C$) and discards those symbols from the valid first received set of secret symbols (e.g. $V_{Br}$) where the corresponding basis flags from the first and received second sets of basis flags (e.g. $BF_B$ and $BF_B$) do not match. The undiscarded or remaining symbols of the valid first received set of secret symbols (e.g. $V_{Br}$) forms the first common set of secret symbols (e.g. $CS_B$) for Bob 102b. Similarly, receiving the first set of basis flags (e.g. $BF_B$) from Bob 102b, Carol 102c forms a second common set of secret symbols (e.g. $CS_C$) by comparing each basis flag in the received first set of basis flags (e.g. $BF_B$) with each basis flag in the second set of basis flags (e.g. $BF_C$) and discards those symbols from the fourth secret symbol string (e.g. $X_{Br}'$) where the corresponding basis flags from the received first set of basis flags (e.g. $BF_B$) and second set of basis flags (e.g. $BF_C$) do not match. The remaining symbols in the fourth secret symbol string (e.g. $X_{Br}'$) forms the second common set of secret symbols (e.g. $CS_C$) for Carol 102c. For example, when n=1, in the above example the valid first received set of bits for Bob 102b may be, without limitation, for example around 500 bits. Thus, on average approximately half these bits may have matching basis flags between Bob 102b and Carol 102c, such that the first common secret bit string is approximately 250 bits.

Bob 102b and Carol 102c now have a common set of secret symbols (e.g. $CS_B$ and $CS_C$), Bob has a first common set of secret symbols (e.g. $CS_B$) and Carol has a second common set of secret symbols (e.g. $CS_C$). Although the first common set of secret symbols (e.g. $CS_B$) may be the same as the second common set of secret symbols (e.g. $CS_C$), they may not necessarily be the same due to errors from transmission or measurement during demodulation and the like. Thus, Bob 102b and Carol 102c may perform error detection and/or correction in relation to the first and second common sets of secret symbols (e.g. $CS_B$ and $CS_C$) over the third communication channel 108. For example, the error detection and correction of the first and second common sets of secret symbols (e.g. $CS_B$ and $CS_C$) that takes place between Bob 102b and Carol 102c may be based on, without limitation, for example how error detection and correction of the first and second common sets of secret symbols is implemented or performed using the standard Decoy State Protocol or the Standard BB84 Protocol and the like. However, in those cases Alice 102a knows the cryptographic key and the error detection and correction are made between Alice and Bob and Alice and Carol rather than by Bob and Carol as in the QKD protocol according to the present invention. Nevertheless, these types of error detection and correction can be adapted for use by Bob 102b and Carol 102c for performing error detection and correction of the first and second common sets of secret symbols (e.g. $CS_B$ and $CS_C$) and result in a common set of secret symbols from which a cryptographic key, e.g. a final cryptographic key $C_F$, may be produced for Bob 102a and Carol 102c. From this, a final cryptographic key $C_F$ may be derived by the Bob 102b and Carol 102c that is only known to the Bob 102b and Carol 102c, thus, they can perform cryptographic operations with each other using a quantum-safe cryptographic key (e.g. $C_F$). The QKD protocol according to the invention enables Bob 102b and Carol 102c to determine a cryptographic key in a quantum-safe manner even when Alice 102a is not a trusted device.

For example, assuming that Alice 102a randomly generated the first and second secret symbol strings (e.g. $S_B$ and $S_C$) appropriately (e.g. not all the same symbol), then even though Alice 102a knows all the symbols (e.g. bits when n=1) that were sent to both Bob 102b and Carol 102c, there is approximately a $\frac{1}{2}n$ probability that any of those symbols sent will have a validly matched basis by Bob 102b and Carol 102c. This means that Alice 102a can deduce almost no information on what Bob 102b and Carol 102c have shared in the fifth part of the QKD protocol according to the invention and so will not be able to derive the agreed final cryptographic key $C_F$ determined by Bob 102b or Carol 102c.

A modification to the QKD system 100 implementing the QKD protocol according to the invention for improving or enhancing the security strength of the cryptographic key determined by the QKD protocol may include Bob 102b and Carol 102c already having a pre-shared key or secret that is unknown to Alice 102a. Once the cryptographic key is determined according to the QKD protocol as described herein based on the common set of secret symbols or sifted symbols (e.g. $CS_B$ and $CS_C$). Then, both Bob 102b and Carol 102c can further encrypt this cryptographic key to generate a final shared cryptographic key by encrypting or processing the cryptographic key using the pre-shared key or secret and one or more cryptographic algorithms or methods. For example, cryptographic algorithms or methods may include, without limitation, any encryption algorithm or operation such as, by way of example only but not limited to, OTP encryption, AES encryption, any other encryption algorithm and the like and/or as the application demands. For example, the pre-shared key or secret may be a OTP shared between Bob 102b and Carol 102c in a quantum-safe manner and the encryption method may use OTP encryption to generate the final shared cryptographic key. Other cryptographic methods or algorithms may include, without limitation, for example AES encryption or a one-way hash function.

In another modification to the QKD system 100 implementing the QKD protocol according to the invention for improving the security strength of the cryptographic key determined by the QKD protocol may include both Bob 102b and Carol 102c being configured to use, without limitation, for example a Cryptographically Secure Pseudo Random Number Generator (CSPRNG) with a pre-shared initial state to generate a final shared cryptographic key based on performing OTP encryption (e.g. XOR) on the cryptographic key determined from the common sets of sifted symbols (e.g. $CS_B$ and $CS_C$) and the CSPRNG output. Alternatively or additionally, Bob 102b and Carol 102c may be configured to use their respective CSPRNG outputs to selectively throw away bits from the cryptographic key to generate the final shared cryptographic key. In this example, the security strength depends on that of the CSPRNG rather than a pre-shared key or secret.

Figure 1B:
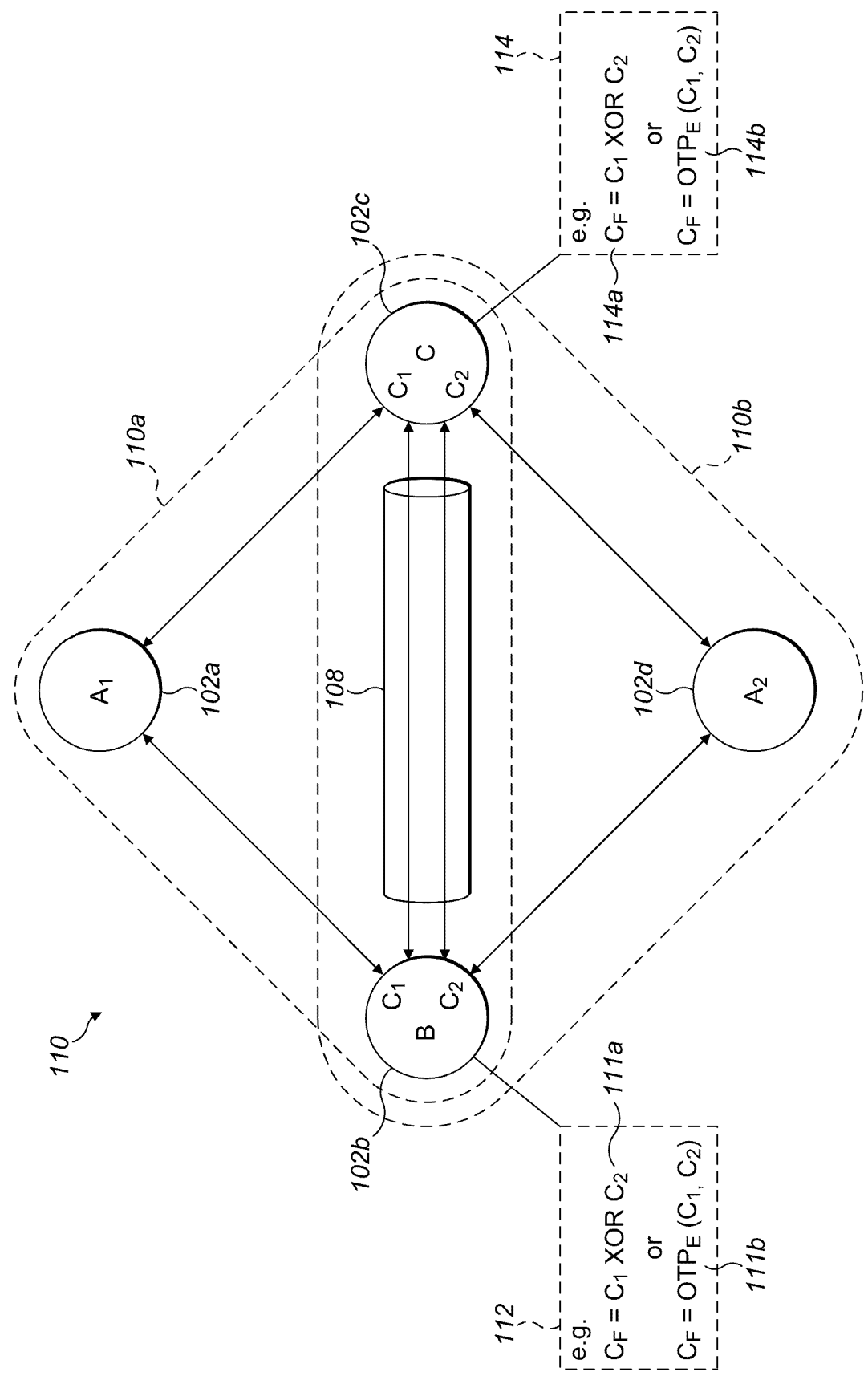
FIG. 1b is a schematic diagram illustrating another example QKD system based on the QKD system of FIG. 1a for implementing another example QKD protocol according to the invention.

FIG. 1b is a schematic diagram of a further example QKD system 110 that uses the QKD protocol as described in FIG. 1a according to the invention. For simplicity, reference numerals from FIG. 1a will be used for similar or the same components. In this case, Bob 102b (first device 102b) and Carol 102c (second device 102c) may use two different providers of QKD services or at least two different intermediary devices 102a and 102d (e.g. A1 and A2), for obtaining cryptographic keys (e.g. $C_1$ and $C_2$) from each. The at least two different intermediary devices 102a and 102d (e.g. A1 and A2) are configured to perform a first QKD protocol instantiation 110a and a second QKD protocol instantiation 110b, respectively, with Bob 102a and Carol 102c based on the QKD protocol as described with reference to FIG. 1a. That is, each of intermediary devices 102a and 102b may provide Bob 102b and Carol 102c with two different sets of first and second secret symbol strings that Bob 102a and Carol 102c use and process when performing the two QKD protocol instantiations 110a and 110b to generate two common sets of sifted symbols and hence agree on first and second cryptographic keys (e.g. $C_1$ and $C_2$).

In this example, Bob 102b and Carol 102c perform the first QKD protocol instantiation 110a of the QKD protocol as described with reference to FIG. 1a with intermediary device 102a (e.g. A1), where Bob 102b and Carol 102c, at the end of the QKD protocol agree on a first cryptographic key (e.g. $C_1$). Bob 102b and Carol 102c also perform the second QKD protocol instantiation 110b of the QKD protocol as described with reference to FIG. 1a with intermediary device 102b (e.g. A2) in which Bob 102b and Carol 102c agree on a second cryptographic key (e.g. $C_2$). It can be seen that Bob 102b and Carol 102c have the same sets of cryptographic keys $C_1$ and $C_2$ after performing the QKD protocol of FIG. 1a with the two different intermediary devices 102a and 102d. The intermediary devices 102a and 102d do not know the information that resulted in the second cryptographic key $C_2$ and first cryptographic key $C_1$, respectively.

Thus, Bob 102b generates a final cryptographic key $C_F$ based on performing final key processing operations 112 including, without limitation, for example an XOR operation(s) 112a similar modulo arithmetic operation(s) using the first and second cryptographic keys (e.g. $C_1$ and $C_2$) to generate the final cryptographic key $C_F$ (e.g. $C_F = C_1$ XOR $C_2$); and/or encryption operations 112b such as, without limitation, for example a One-Time Pad encryption 112b using the first and second cryptographic keys (e.g. $C_F = OTP_E(C_1, C_2)$); and/or any other suitable cryptographic operation (e.g. hash functions and the like) and the lie and/or as the application demands. This generates a final cryptographic key $C_F$ for Bob 102b that is unknown to the first and second intermediary devices 102a and 102d. Similarly, Carol 102c can also generate a final cryptographic key $C_F$ based on final key performing operations 114 including, without limitation, for example an XOR operation(s) 114a similar modulo arithmetic operation(s) using the first and second cryptographic keys (e.g. $C_1$ and $C_2$) to generate the final cryptographic key $C_F$ (e.g. $C_F = C_1$ XOR $C_2$); and/or encryption operations 114b such as, without limitation, for example a One-Time Pad encryption 114b using the first and second cryptographic keys (e.g. $C_F = OTP_E(C_1, C_2)$); and/or any other suitable cryptographic operation (e.g. hash functions and the like) and the lie and/or as the application demands. This generates a final cryptographic key $C_F$ for Carol 102c that is unknown to the first and second intermediary devices 102a and 102d. Thus, Bob 102b and Carol 102c compute the same final cryptographic key $C_F$ based on using agreed cryptographic keys $C_1$ and $C_2$ computed using two different instantiations 110a and 110b of the QKD protocol according to the invention and computed based on secret symbol strings from two different sources or intermediary devices 102a and 102d. The final cryptographic key $C_F$ or new shared key between Bob 102b and Carol 102c is unknown to either the first intermediary device 102a or the second intermediary device 102d. The resulting final cryptographic key $C_F$ is provably secure as long as the two intermediary devices 102a and 102d do not collude with each other directly or indirectly through other devices.

Figure 1C:
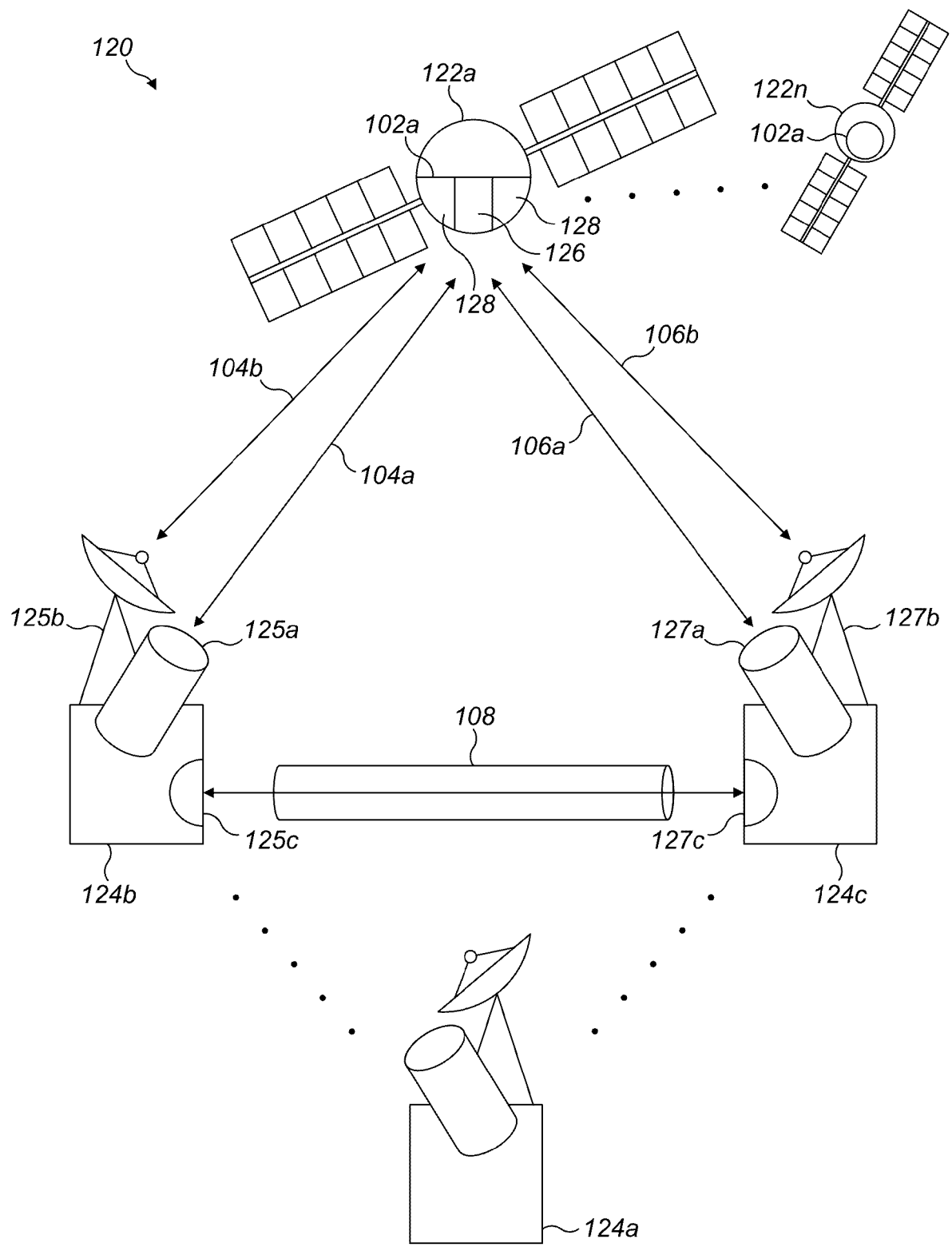
FIG. 1c is a schematic diagram illustrating another example satellite QKD system based on the QKD system(s) of FIG. 1a or 1b for implementing a further example QKD protocol according to the invention.

FIG. 1c is a schematic diagram of an example satellite QKD system 120 for implementing the QKD protocol as described with reference to FIGS. 1a and/or 1b according to the invention. For simplicity, reference numerals of FIGS. 1a and 1 b may be used for the same and/or similar components. In this example, the satellite QKD system 120 includes a plurality of satellites 122a to 122n and a plurality of ground receiving stations 124a-124c. Each of the satellites 122a-122n may include componentry, apparatus and/or functionality for implementing an intermediary device 102a configured to implement the QKD protocol as described with reference to FIGS. 1a-1b and/or FIGS. 1d to 4b, combinations thereof, modifications thereto, and/or as described herein. Furthermore, each of the ground receiving stations 124a-124c may include componentry, apparatus, and/or functionality for implementing the functionality associated with the first device 102b (e.g. Bob 102b) and/or the functionality associated with the second device 102c (e.g. Carol 102c) for performing the QKD protocol as described with reference to FIGS. 1a to 1b and/or FIGS. 1d to 4b combinations thereof, modifications thereto, and/or as described herein.

First and second ground receiving stations 124b and 124c may require a shared secret key that is delivered by one of the satellites 122a of the plurality of satellites 122a-122n. The satellite 122a may include at least a quantum communication interface 126 (e.g. quantum transceiver or other communication device) for transmitting and/or receiving data/control signals over first and second quantum channels 104a and 106b to and/or from ground receiving stations 124b and 124c. The satellite 122a may further include at least a non-quantum communication interface 128 (e.g. standard or classical communication interface) for transmitting and/or receiving data/control signals over first and second non-quantum (e.g. standard or classical) communication channels to and/or from ground receiving stations 124b and 124c. The ground receiving stations 124b and 124c may include, without limitation, for example at least a quantum communication interface 125a and 127a (e.g. a quantum transceiver and/or communication device), respectively, for transmitting data/control signals to satellite and/or receiving data/control signals transmitted by the satellite 122a over quantum channels 104a and 106a, respectively. The ground receiving stations 124b and 124c may further include, without limitation, for example a non-quantum communication interface/transceiver 125b and 127b, respectively, for receiving and/or transmitting data/control signals with satellite 122a over first and second non-quantum communication channels 104b and 106b. In addition, the ground receiving stations 124b and 124c may further include, without limitation, for example further non-quantum communication interface(s) 125c and 127c for establishing a third non-quantum communication channel 108 and transmitting/receiving data/control signals over the third non-quantum communication channel 108 with each other.

The first and second quantum channel(s) 104a and 106a are required for the QKD protocol as described with reference to FIGS. 1a-1b and 1 d to 4b, and/or as described herein. In the satellite QKD system 120, the first and second quantum channel(s) 104a and 106a may be, without limitation, for example free-space optical quantum channels between the satellite 122a and the first and second receiving ground stations 124b and 124c, respectively. The quantum communication interface 126 of the satellite 122a may be, without limitation, for example a satellite optical transceiver, satellite optical telescope transmitter/receiver, optical quantum transceiver 126, and/or any other quantum transceiver as the application demands. The satellite optical transceiver may include the functionality of, by way of example only but not limited to, satellite optical telescope transmitter, lasers, beacon lasers, downlink lasers, downlink beacon lasers, weak coherent pulse sources, and/or corresponding optical laser transmitting components and the like. The first and second non-quantum communications channels 104b and 106b may be, without limitation, for example satellite optical and/or satellite wireless communications channels between the satellite 122a and the first and second ground receiving stations 124b and 124c. The quantum communication interfaces 125a and 127a of the first ground receiving station 124b and second ground receiving station 124c, respectively, may include, without limitation, for example at least an optical satellite transceiver, or optical satellite receiver telescope/transmitter telescope and the like, optical receiver telescope, laser receivers, beacon laser receivers, downlink laser receiver, downlink beacon laser receiver, weak coherent pulse receiver, and/or any suitable quantum transceiver configured for receiving photons emitted by the quantum communications interface 126 of satellite 122a, combinations thereof, modifications thereto and/or as the application demands. The non-quantum communication interfaces 128 of the satellite may include, by way of example only but not limited to, wireless and/or radio satellite communications interfaces and/or optical satellite communication interfaces and the like.

The non-quantum communication interfaces 125b and 127b of the ground receiving stations 124b and 124c may include, by way of example only but not limited to, corresponding wireless and/or radio satellite communications interfaces and/or optical satellite communication interfaces in relation to the non-quantum communication interfaces 128 of the satellite 122a. The non-quantum communication interfaces 125c and 127c of the ground receiving stations 124b and 124c may include, by way of example only but not limited to, wireless and/or wired communications interface(s) configured for establishing a wireless and/or a wired communication channel 108 therebetween; fibre optic communications interfaces configured for establishing optical fibre communication channel 108 therebetween (e.g. optical fibre, dark fibre and the like); corresponding wireless and/or radio communications interfaces; optical communication interfaces and the like; and/or any other suitable non-quantum communication interface for communicating with each other as the application demands.

Thus, the satellite QKD system 120 may be configured to and/or operate to implement the QKD protocol according to the invention as described in FIGS. 1a-1b, 1d and/or FIGS. 1d-4b and/or combinations thereof, modifications thereto, and/or as herein described. For example, the QKD protocol may be implemented by satellite QKD system 120 in which a shared key is required between ground receiving stations 124b and 124c, in which the satellite 122a may operate as Alice 102a, the first ground receiving station 124b may operate as Bob 102b, and the second ground receiving station 124c may operate as Carol 102c when performing the QKD protocol according to the invention as described herein.

Although the example satellite QKD system 120 and QKD protocol according to the invention of FIG. 1c describes using satellite 122a as the intermediary device (e.g. Alice) and the ground stations 124b (e.g. Bob) and 124c (e.g. Carol) as the first and second device, respectively, this is described in FIG. 1c, by way of example only and the invention is not so limited, it is to be appreciated by the skilled person that there are many variations and/or systems that may implement the QKD protocol according to invention, for example, the QKD protocol according to the invention may operate in the opposite direction from ground station(s) to satellite(s) in which case the quantum communication interface of a satellite may be, without limitation, for example a satellite optical transceiver, satellite optical receiver telescope, optical quantum transceiver and/or any other quantum transceiver as the application demands. The satellite optical transceiver may include, by way of example only but not limited to, optical receiver telescope, laser receivers, beacon laser receivers, uplink laser receiver, uplink beacon laser receiver, weak coherent pulse receiver, and/or corresponding optical laser transmitting/receiving components and the like. The first and second non-quantum communications channels may be, without limitation, for example satellite optical and/or satellite wireless communications channels between the satellite and the ground receiving station(s). The quantum communication interface of the ground receiving station may include, without limitation, for example at least an optical satellite transceiver, or optical satellite receiver telescope/transmitter telescope and the like, ground station transmitter telescope, laser, beacon laser, uplink laser, uplink beacon laser, weak coherent pulse source and/or any suitable quantum transceiver configured for transmitting photons for reception by the quantum communications interface of the satellite, combinations thereof, modifications thereto and/or as the application demands. The non-quantum communication interfaces of the satellite may include, by way of example only but not limited to, wireless and/or radio satellite communications interfaces and/or optical satellite communication interfaces and the like.

Although the example satellite QKD system 120 and QKD protocol according to the invention of FIG. 1c describes using satellite 122a as the intermediary device (e.g. Alice) and the ground stations 124b (e.g. Bob) and 124c (e.g. Carol) as the first and second device, respectively, this is described in FIG. 1c, by way of example only and the invention is not so limited, in another example, the intermediary device may be a ground station or device, the first device and second device may be satellites that require cryptographic keys distributed from the ground station using the QKD protocol according to the invention. In this case, the first quantum communication channel maybe a freespace optical quantum communication channel, the second quantum communication channel may be a free-space optical quantum communication channel, and the first and second communication channels are non-quantum satellite communications channels. The third communication channel may be a satellite-to-satellite communication channel and the like.

FIG. 1d is a schematic diagram of an example terrestrial QKD system 130 for implementing the QKD protocol according to the invention as described with reference to FIGS. 1a-1c and/or FIGS. 2a to 4b, combinations thereof, modifications thereto, as described herein and/or as the application demands. For simplicity, reference numerals of FIGS. 1a and 1b may be used for the same and/or similar components. In this example, the terrestrial QKD system 130 includes an optical intermediary device 132a and first and second optical devices 132b and 132c. The optical intermediary device 132a is communicatively coupled with the first and second optical devices 132b and 132c via, without limitation, for example corresponding optical fibre and/or optical fibre network(s) 134a and 134b, respectively.

The optical intermediary device 132a is configured to establish and/or transmit/receive data over a first optical fibre quantum channel 104a with first optical device 132b. Similarly, the optical intermediary device 132a is configured to establish and/or transmit/receive data over a second optical fibre quantum channel 106a with second optical device 132b. In addition, the optical intermediary device 132a is configured to establish and/or transmit/receive data over a first optical fibre channel 104b with first optical device 132b. The optical intermediary device 132a is configured to establish and/or transmit/receive data over a second optical fibre channel 106b with second optical device 132b. Furthermore, the first and second optical devices 132b and 132c are configured to establish and/or transmit/receive data over a third communication channel 108 with each other. The third communication channel may include, without limitation, for example a wired and/or wireless communication channel, an optical communication channel, an optical fibre communication channel and/or any other suitable non-quantum communication channel.

The optical intermediary device 132a may include componentry, apparatus and/or functionality for implementing, without limitation, for example intermediary device 102a configured to implement the QKD protocol as described with reference to FIGS. 1a-1c and/or any other intermediary device for implementing the QKD protocol as described with reference to FIGS. 2a to 4b, combinations thereof, modifications thereto, and/or as described herein. Furthermore, each of the first and second optical devices 132b and 132c may include componentry, apparatus, and/or functionality for implementing the functionality associated with the first device 102b (e.g. Bob 102b) and/or the functionality associated with the second device 102c (e.g. Carol 102c) for performing the QKD protocol as described with reference to FIGS. 1a to 1b and/or FIGS. 1d to 4b combinations thereof, modifications thereto, and/or as described herein.

Thus, the terrestrial QKD system 130 may be configured to and/or operate to implement the QKD protocol according to the invention as described in FIGS. 1a-1c and/or FIGS. 2a-4b and/or combinations thereof, modifications thereto, and/or as herein described. For example, the QKD protocol may be implemented by terrestrial QKD system 130 in which a shared key is required between first and second optical devices 132b and 132c, in which the optical intermediary device 132a may operate as Alice 102a, the first optical device 132b may operate as Bob 102b, and the second optical device 132c may operate as Carol 102c when performing the QKD protocol according to the invention as described herein.

Alternatively or additionally, the QKD protocol may be used, without limitation, for example in any type of terrestrial QKD system with a plurality of terrestrial network devices and a plurality of user devices in communication with each other. Each terrestrial network device includes components and/or apparatus with the functionality of an intermediary device 102a and each user device includes the functionality of the first and/or second devices 102b and 102c. For example, a first user device may include the QKD protocol functionality of Bob 102b whilst a second user device includes the QKD protocol functionality of Carol 102c. Alternatively or additionally, the first user device may include the QKD protocol functionality of both Bob 102b and Carol 102c and the second user device may include the QKD protocol functionality of both Bob 102b and Carol 102c. This is because the first user device may take on the role of Bob 102b and the second user device may take on the role of Carol 102c and/or vice versa during implementation of the QKD protocol according to the invention. Furthermore, the first and second user devices are configured to receive data transmitted over a quantum channel from the terrestrial network device(s). In addition, the first and second user devices may be configured, without limitation, to receive and transmit data over one or more classical or non-quantum communication channels. For example, the first user device may be linked to the terrestrial network device by, without limitation, for example a fibre optic channel (e.g. over optical fibre and/or dark optical fibre), similarly the second user device may be linked to the terrestrial network device by, without limitation, for example another fibre optic channel (e.g. over optical fibre or dark optical fibre). Each of first user device and second user device may be configured receive data via, without limitation, for example a quantum optical fibre channel from terrestrial network devices over an optical fibre, whilst using the optical fibre to receive and transmit data via a standard optical fibre communication channel.

For example, the QKD protocol may be used, without limitation, for example in a terrestrial QKD system in which the intermediary device may be a terrestrial communication apparatus, the first device and second device may also be terrestrial devices, where the first quantum communication channel is a free-space optic quantum communication channel, the second quantum communication channel is a free-space optic quantum communication channel, and the first and second communication channels are classical or standard terrestrial communications channels. Alternatively, the first and second communication channels may be any standard communications channels. The third communication channel may also be a standard communications channel and the like.

In another example, the QKD protocol may be used, without limitation, for example in a terrestrial QKD system in which the intermediary device is a terrestrial communication apparatus, the first device and second device are terrestrial devices, where the first quantum communication channel is a free-space optic quantum communication channel, the second quantum communication channel is a fibre optic quantum communication channel, and the first and second communication channels are standard communications channels and/or terrestrial communications channels. The third communication channel may be a standard communications channel and the like.

Although the QKD protocol may be described as being performed using a satellite QKD system 120 or a terrestrial system 130 as described with reference to FIGS. 1c and 1d and/or as described herein, this is by way of example only and the invention is not so limited, it is to be appreciated by the skilled person in the art that the QKD protocol may be implemented on any type of apparatus or intermediary device in communication with at least a first communication device and a second communication device, as long as the intermediary device and the first and second communication devices are adapted to, capable of, or configured to communicate over one or more quantum communication channels and one or more non-quantum/classical communication channels and/or as the application demands for implementing the QKD protocol as described with reference to FIGS. 1a to 1d, 2a to 4b, and/or according to the invention, combinations thereof, modifications thereof, and/or as described herein and/or as the application demands.

Figure 2A:
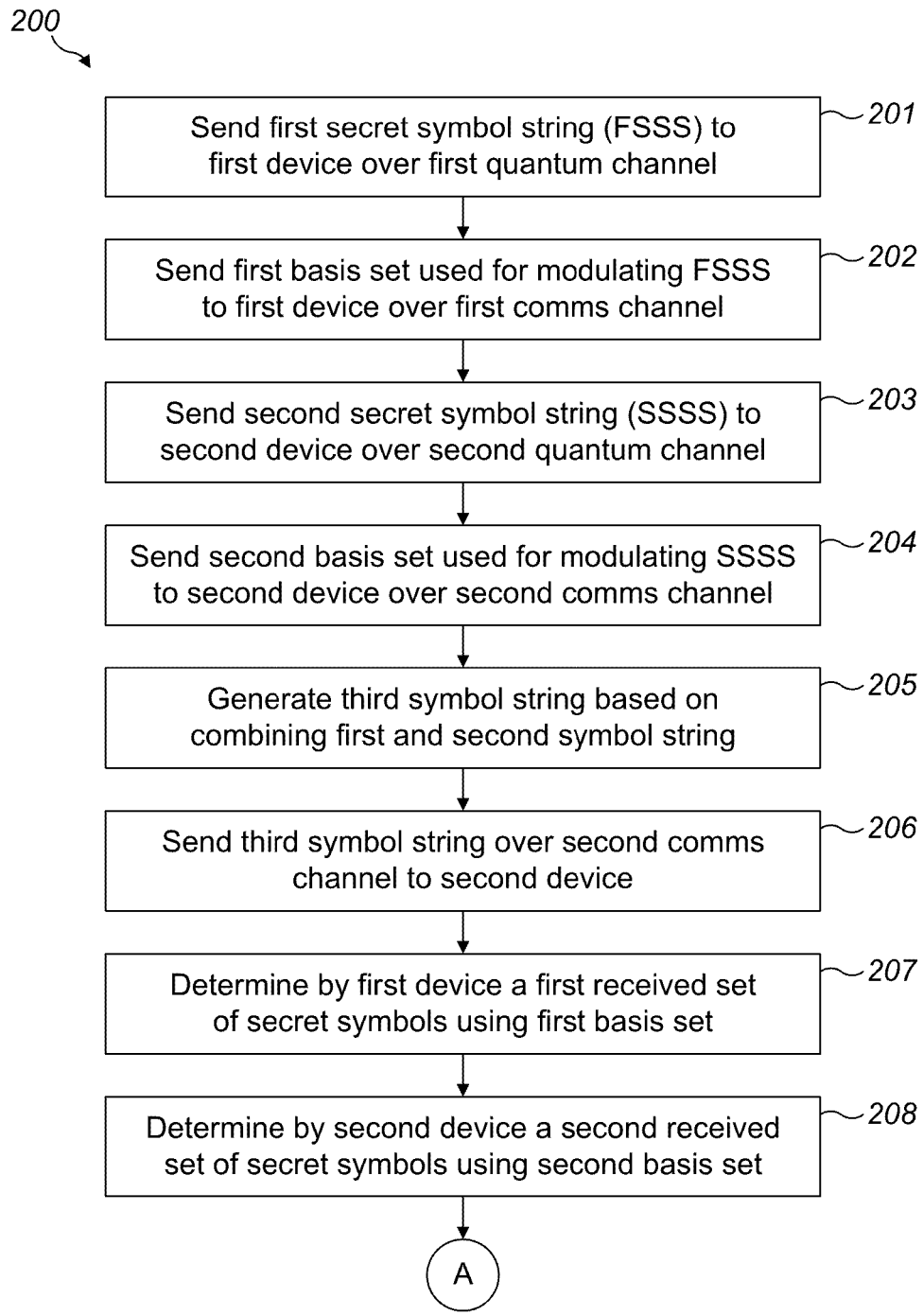
FIGS. 2a and 2b is a flow diagram illustrating an example QKD process for implementing an example QKD protocol according to the invention.
Figure 2B:
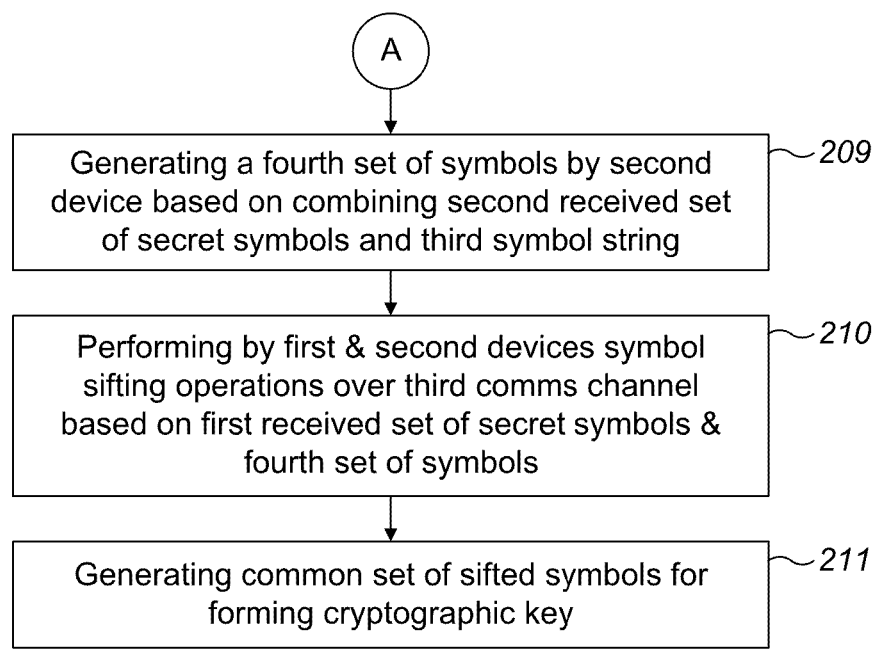

FIGS. 2a and 2b are a flow diagram illustrating an example QKD protocol process 200 according to the invention that is being performed by an intermediary device, a first device and a second device, in which the first device and second device require a shared key. The QKD protocol is configured to enable the intermediary device to provide secret symbols to each of the first and second device, but does not reveal information to the intermediary device about the common shared secret used to generate the shared key between the first and second device. This provides the advantage that the intermediary device does not need to be fully trusted. Nevertheless, intermediary device is trusted only in so far as being able to generate random symbols or bits for use in generating one or more secret symbols for the first and second devices and/or randomly selecting a basis from a set of bases for quantum modulation and the like using one or more random number generators. Furthermore, each of the first and second devices also require a random number generator capable of randomly selecting one or more bases from a set of bases for quantum demodulation and the like. In any event, it is assumed that the intermediary device, the first and second devices include the required componentry and/or apparatus and the like for implementing QKD protocol process 200.

The QKD protocol process 200 may be generalised and described, without limitation, for example using an M-ary symbol scheme in which each symbol represents n bit(s) and so there are $M=2^n$ different symbols for Binary symbols occur when n=1, where there are M=2 different symbols in which each symbol represents a binary bit represented by, without limitation, for example a '1' or '0'. A symbol string or stream comprises or represents a series of symbols. For example, when n=2, then there are 4 symbols (e.g. S1, S2, S3, S4), each representing 2 bits and a string of 10 random symbols may be represented as a series of symbols such as, without limitation, for example {S1, S2, S3, S2, S3, S1, S4, S3, S2, S3}. When n=1, a bit string or stream comprises or represents a series of bits, for example, a string of 14 bits may be represented as a series of bits, without limitation, for example {'1','0','1','0','1','0','1','0','1','1','0','0','1','1',}, which may also be represented as 10101010110011.

For simplicity, the general steps of the QKD protocol 200 will be described, without limitation, for example with reference to a simple example implementation of the QKD protocol using binary symbols, i.e. when n=1 and there are M=2 different symbols in which each symbol represents a binary bit represented by, without limitation, for example a '1' or '0'. For the simple example, the intermediary device is referred to as Alice (e.g. A), the first device is referred to as Bob (e.g. B), and the second device is referred to as Carol (e.g. C). Table 1 illustrates an example set of bases including, without limitation, for example a rectilinear basis and a diagonal basis that is used by Alice, Bob and Carol for modulating/demodulating the secret bits (e.g. signal bits) transmitted/received over first and second quantum communication channels.

TABLE 1

| Examples of using rectilinear basis and diagonal basis | | | | | | | | |
| --- | --- | --- | --- | --- | --- | --- | --- | --- |
| Signal bit value | 0 | 1 | 0 | 1 | 0 | 1 | 0 | 1 |
| Sending basis | + | + | × | × | + | + | × | × |
| Photon polarization sent | ↑ | → | ↗ | ↘ | ↑ | → | ↗ | ↘ |
| Measuring basis | + | + | + | + | × | × | × | × |
| Photon polarization measured | ↑ | → | ? | ? | ? | ? | ↗ | ↘ |
| Corresponding bit value | 0 | 1 | ? | ? | ? | ? | 0 | 1 |

Note the table symbols indicate the agreed modulation of a signal bit or bit and a basis (by convention) to generate a photon polarization of one of four possible states. When measured with the same basis, the same state should be received in which the corresponding bit value is the same as the signal bit value of the bit sent. When measured with a different basis an indeterminate result (e.g. '?') will be received of either possible polarization with approximately equal likelihood.

The QKD process 200 may include the following steps of:

In step 201, sending or transmitting, by an intermediary device, a first secret symbol string or stream over a first quantum channel to the first device. Each symbol of the first secret symbol string is modulated by a basis state randomly selected from a set of bases. The first secret symbol string is generated by the intermediary device using a random symbol generator and the like.

For example, Alice (e.g. intermediary device) generates a random secret bit string for Bob (e.g. first device) based on:

A 0 1 1 0 1 0 0 1

The randomly generated bit string 01101001 is used by Alice as the first secret bit string for sending to Bob. Alice sends the first secret bit string 01101001 based on randomly selecting a basis from the set of bases (e.g. rectilinear basis or diagonal basis) for each bit of the first secret bit string resulting in:

A + + x + x x x +

Thus, each bit of the first secret bit string is modulated by the corresponding basis state of this randomly selected set of bases, and Alice sends to Bob the following photon polarisations over the first quantum channel:

A→B ↑ →↘ ↘ ↗ ↗ →

Bob (e.g. the first device) receives the modulated first secret bit stream and demodulates the received first secret bit string, where each received first secret bit is demodulated using a basis state of a basis selected at random from the set of bases. In this example, it is assumed for simplicity that the quantum channel is nearly loss-fee, so in essence Bob "successfully" receives all bits, but may not necessarily use the correct basis for each bit as Bob randomly selects a basis from the set of bases. Bob's random measuring basis is:

B + x x x + x + +

Thus, Bob measures the following photon polarisations:

B ↑ ↗ ↘ ↗ → ↗ → →

In this example, all bits are successfully received, i.e. successfully measured as being one of the four possible photon polarisations (or basis states). This results in Bob "successfully" receiving the set of bits 00101011. In practice, there may be unsuccessfully received bits due to losses in the quantum channel (e.g. atmospheric losses etc.), these will be detected because the output or measurement of the demodulator would indicate neither of the expected photon polarisations or a measurement below the detectable threshold for determining a photon polarisation etc., however, the unsuccessfully received bits would be filtered out and the remainder of the QKD protocol would focus on the successfully received bits and their bit locations etc.

It is noted that the set of bases is the same set of bases used by the intermediary device, the first device and the second device. The set of bases includes at least two bases, each basis including at least two basis states, where the at least two basis states of each basis are orthogonal and the at least two basis states of said each basis are non-orthogonal to the at least two basis states of another basis of the set of bases.

As an example, the set of bases may include two bases and each basis of the set of bases may include two basis states. Alternatively or additionally, the set of bases for modulating bits for transmission over the quantum channel may include, without limitation, for example at least two bases from the group of: a rectilinear basis; a diagonal basis; a spherical basis; a circular basis; an angular basis; and any other type of basis comprising two basis states.

As a further example, the quantum channel may be, without limitation, for example an optical quantum channel and the set of bases may include, without limitation, for example, at least two bases from the group of: a rectilinear photon/optical polarisation basis; a diagonal photon/optical polarisation basis; a spherical photon/optical polarisation basis; and any other type of photon/optical basis including two basis states.

In step 202, sending or transmitting, by the intermediary device, a first basis set over a first communication channel to the first device. The first basis set includes data representative of the randomly selected bases used to modulate each symbol of the first secret symbol string.

In this example, Alice (e.g. intermediary device) sends the following basis set to Bob (e.g. the first device):

A→B + + x + x x x +

In step 203, sending or transmitting, by the intermediary device, a second secret symbol string over a second quantum channel to the second device. Each symbol of the second secret symbol string is modulated by a basis state randomly selected from the set of bases.

For example, Alice (e.g. intermediary device) generates a random secret bit string for Carol (e.g. second device) based on:

A 1 0 1 0 0 1 0 0

The randomly generated bit string 10100100 is used by Alice as the second secret bit string for sending to Carol. Alice sends the second secret bit string 10100100 based on randomly selecting a basis from the set of bases (e.g. rectilinear basis or diagonal basis) for each bit of the second secret bit string resulting in:

A + + x x x + x x

Thus, each bit of the second secret bit string is modulated by the corresponding basis state of this randomly selected set of bases, and Alice sends to Carol the following photon polarisations over the second quantum channel:

A→C ↑ → ↘ ↗ ↗ ↑ ↗ ↗

Carol (e.g. the second device) receives the modulated second secret bit stream and demodulates the received second secret bit string, where each received second secret bit is demodulated using a basis state of a basis selected at random from the set of bases. Carol's random measuring basis is:

C +x x x x x + x

Thus, Carol measures the following photon polarisations:

C ↑ ↗ ↘ ↗ ↗ ↗ → ↗

In this example, all bits are successfully received, i.e. successfully measured as being one of the four possible photon polarisations (or basis states). This results in Carol "successfully" receiving the set of bits 10100000.

In step 204, sending or transmitting, by the intermediary device, a second basis set over a second communication channel to the second device. The second basis set includes data representative of the randomly selected bases used to modulate each symbol of the second secret symbol string.

In this example, Alice (e.g. intermediary device) sends the following basis set to Carol (e.g. the second device):

A→C + + x x x + x x

In step 205, generating, by the intermediary device, a third symbol string based on combining the first and second secret symbol strings. For example, generating the third bit string based on combining the first and second secret strings may further include, without limitation, for example one or more processing operations from the group of: generating the third symbol string based on performing an XOR operation using data representative of, at least in part, the first secret symbol string and the second secret symbol string; generating the third symbol string based on performing OTP encryption operation(s) using data representative of, at least in part, the first secret symbol string and the second secret symbol string; and generating the third symbol string based on performing any other type of operation for obfuscating one or more symbols of the first secret symbol string using the second secret symbol string.

For example, Alice (e.g. the intermediary device) generates a third bit string based on an XOR of the first secret bit string with the second secret bit string (e.g. 01101001 XOR 10100100=11001101). The third bit string generated by Alice is 11001101.

In step 206, sending or transmitting, by the intermediary device, to the second device, via the second communication channel, data representative of the third symbol string.

For example, Alice (e.g. the intermediary device) sends the third bit string over the second communication channel to Carol (e.g. second device) based on:

A→C 1 1 0 0 1 0 1

In step 207, determining, by the first device, a first received set of secret symbols using the received first basis set. The first received set of secret symbols includes symbols of the first secret symbol string transmitted over the first quantum channel that were successfully received by the first device.

For example, Bob (e.g. the first device) determines a first received set of secret bits using the received first basis set received in step 202. The first received set of secret bits are those bits that Bob validly and successfully received compared with the received first basis set. In this case, Bob determines the successful bits that were received include:

B 0 . . . 1 . . . 0 . . . 1 where '.' indicates an invalid bit that Bob did not correctly measure or demodulate with the correct basis.

In step 208, determining, by the second device, a second received set of secret symbols using the received second basis set. The second received set of secret symbols including symbols of the second secret symbol string transmitted over the second quantum channel that were successfully received by the second device.

For example, Carol (e.g. the second device) determines a second received set of secret bits using the received second basis set received in step 204. The second received set of secret bits are those bits that Carol validly and/or successfully received compared with the received second basis set. In this case, Carol determines the successful bits that were received include:

C 1 . . . 1 0 0 . . . 0 where '.' indicates an unsuccessfully received bit or invalid bit that Carol did not correctly measure or demodulate with the correct basis.

In step 209, generating, by the second device, a fourth set of symbols based on combining the second received set of secret symbols with the received third symbol string. One or more symbols of the fourth set of symbols correspond to one or more symbols of the first symbol string.

For example, the second device generating the fourth symbol string may further include, without limitation, for example one or more processing operations from the group of: generating the fourth symbol string based on performing an XOR operation using data representative of, at least in part, the second secret symbol string and the third symbol string; generating the fourth symbol string based on performing one time pad decryption operation(s) using data representative, of at least in part, the second secret symbol string and the third secret symbol string; and generating the fourth symbol string based on performing any other type of operation for extracting one or more symbols of the first secret symbol string using data representative of, at least in part, the second secret symbol string and the third symbol string.

For example, Carol (e.g. the second device) generates a fourth bit string based on an XOR of the received third bit string with the second received set of secret bits (e.g. 11001101 XOR 1.100 . . . 0). The fourth bit string generated by Carol is 0.101 . . . 1.

In step 210, performing, by the first device and second device, symbol sifting operations over a third communication channel based on the first received set of secret symbols at the first device and the fourth set of symbols at the second device for generating a common set of sifted symbols for forming a cryptographic key or shared cryptographic key at the first and second devices.

For example, Bob (e.g. first device) and Carol (e.g. second device) communicate basis matching information including data representative of the fourth bit string generated by Carol and the first received set of bits successfully received by Bob. Note, this basis matching information does not include information about the basis state and/or received bit apart from an indication that a bit in a particular bit position in the first and second secret bit strings were received successfully and validly. For example, Bob and Carol exchange the following basis matching information based on:

B→C ok . . . ok . . . ok . . . ok

C→B ok . . . ok ok ok . . . ok

Based on this information, both Bob and Carol may determine those bits that were successfully and validly received without Alice knowing which bits Bob and Carol successfully and validly received. Thus Bob and Carol can compute the common set of bits by comparing the above received sets of bits and using only those that match, this results in the following common matching set of bit positions:

B, C ok . . . ok . . . ok

Carol computes a common set of bits based on using only those bits in the fourth bit string with a corresponding common matching bit position from the set of matching bit positions. Similarly, Bob compute a common set of bits based on using only those bits in the first received set of bits with a corresponding common matching bit position from the et of matching bit positions. This results in a common set of bits that are the same at Carol and Bob, which is:

B, C 0 . . . 1 . . . 1

The first communication channel may be, without limitation, for example based on a classical or non-quantum communication channel formed between the intermediary device and the first device. The second communication channel may be, without limitation, for example based on a classical or non-quantum communication channel formed between the intermediary device and the second device. The third communication channel may be based on, without limitation, for example a classical or non-quantum communication channel formed or established between the first device and the second device.

As an example, the above example QKD protocol process 200 is when each symbol represents $2^n$ binary bits, for n>=1. When each symbol represents a binary bit for n=1, the steps of the QKD protocol process 200 may be based on the following: transmitting a first secret bit string over a first quantum channel to the first device, each bit of the first secret bit string modulated by a basis state randomly selected from a set of base; transmitting a first basis set over a first communication channel to the first device, the first basis set comprising data representative of the randomly selected bases used to modulate each bit of the first secret bit string; transmitting a second secret bit string over a second quantum channel to the second device, each bit of the second secret bit string modulated by a basis state randomly selected from the set of bases; transmitting a second basis set over a second communication channel to the second device, the second basis set comprising data representative of the randomly selected bases used to modulate each bit of the second secret bit string; generating a third bit string based on combining the first and second secret bit strings; transmitting to the second device, via the second communication channel, data representative of the third bit string.

The first device and second device perform a quantum key exchange based on: the first device using the received first basis set to determine a first received set of secret bits comprising bits of the first secret bit string transmitted over the first quantum channel that were successfully received by the first device; the second device uses the received second basis set to determine a second received set of secret bits comprising bits of the second secret bit string transmitted over the second quantum channel that were successfully received by the second device; the second device generates a fourth set of bits based combining the second received set of secret bits with the received third bit string, wherein one or more bits of the fourth set of bits correspond to one or more bits of the first bit string; the first device and second device performing bit sifting operations over a third communication channel between the based on the first received set of secret bits at the first device and the fourth set of bits at the second device for generating a common set of sifted bits for forming a cryptographic key at the first and second devices.

It can be seen that the QKD protocol process 200 minimises interactions between the intermediary device and the first and second devices, which means the intermediary device receives nearly no information associated with what secret symbols the first and second devices validly received, which means this may result in a higher level of security than those QKD protocols that share information with the intermediary device. However, this tradeoff is typically at the expense of reliability and/or a reduction in the number of viable symbols that may be used for generating the common set of sifted symbols and subsequent formation of the cryptographic key using the common set of sifted symbols. The reliability and/or viable symbols successfully and validly received of the QKD protocol process 200 may be further improved whilst being provably secure and not impacting the security of the QKD protocol process 200 by having the first and second devices share a "small amount" of information associated with the successfully received symbols at the first and second devices (e.g. successfully received symbol positions) with the intermediary device.

Figure 2C:
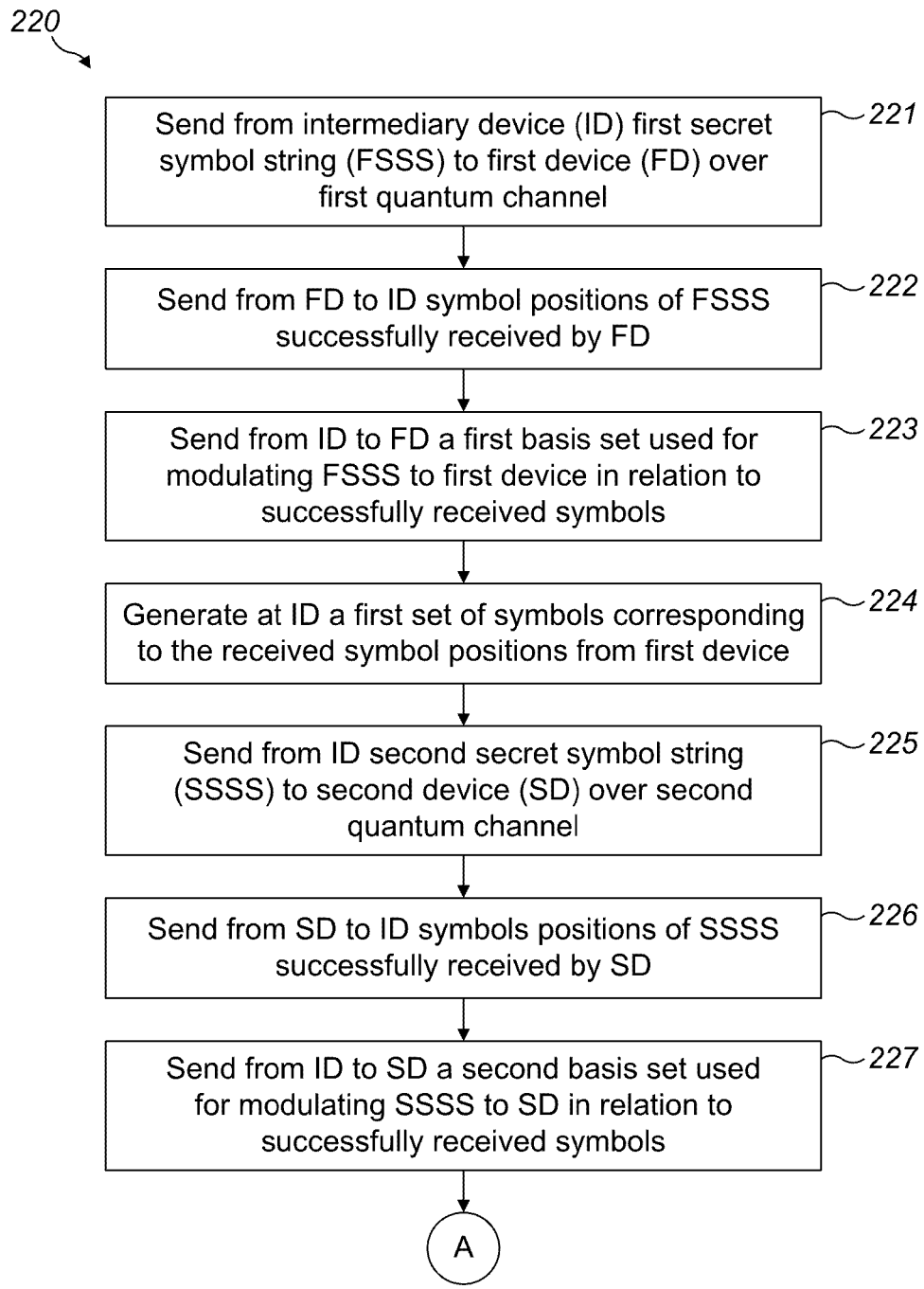
FIGS. 2c to 2e is another flow diagram illustrating a further example QKD process based on the QKD process of FIGS. 2a and 2b for implementing another example QKD protocol according to the invention.
Figure 2D:
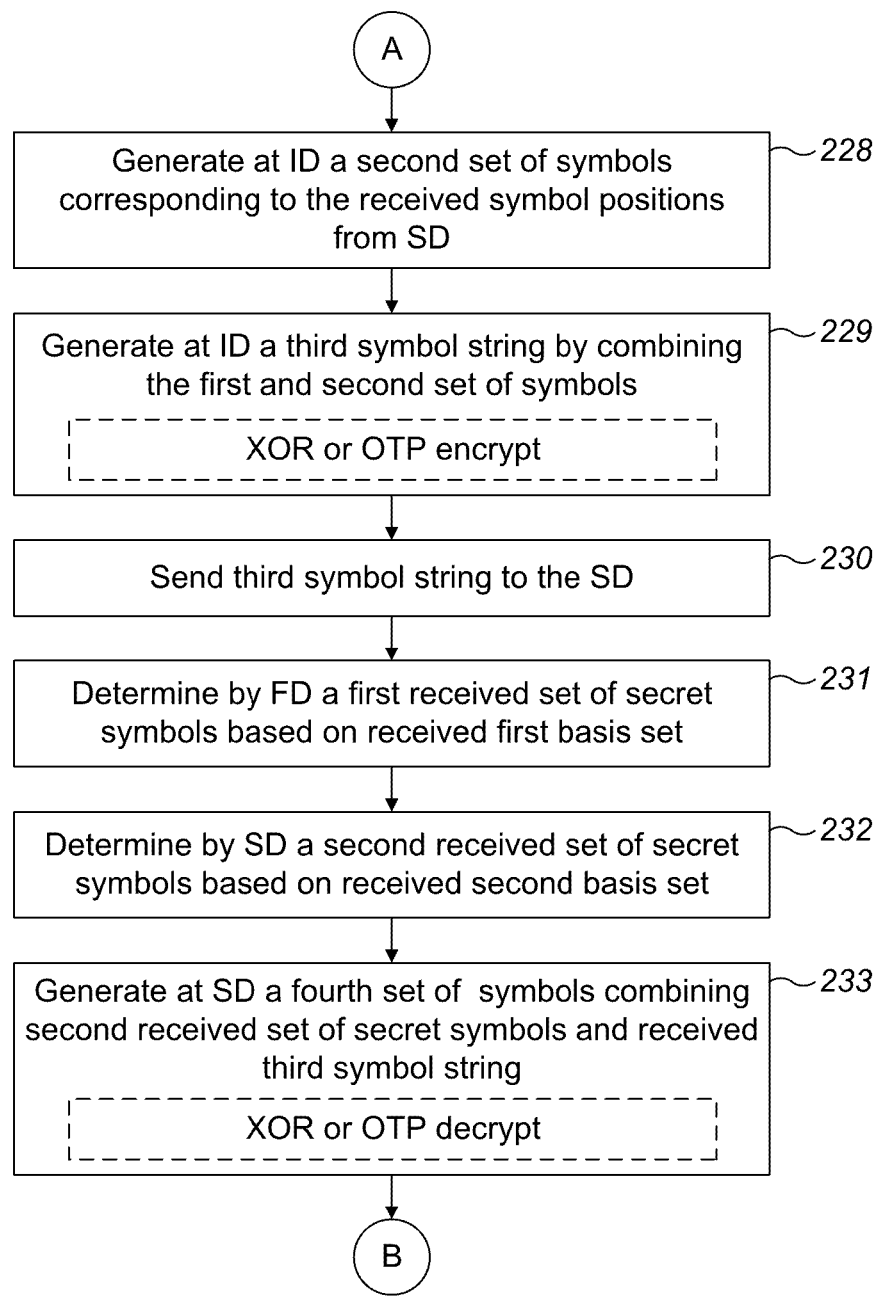
Figure 2E:
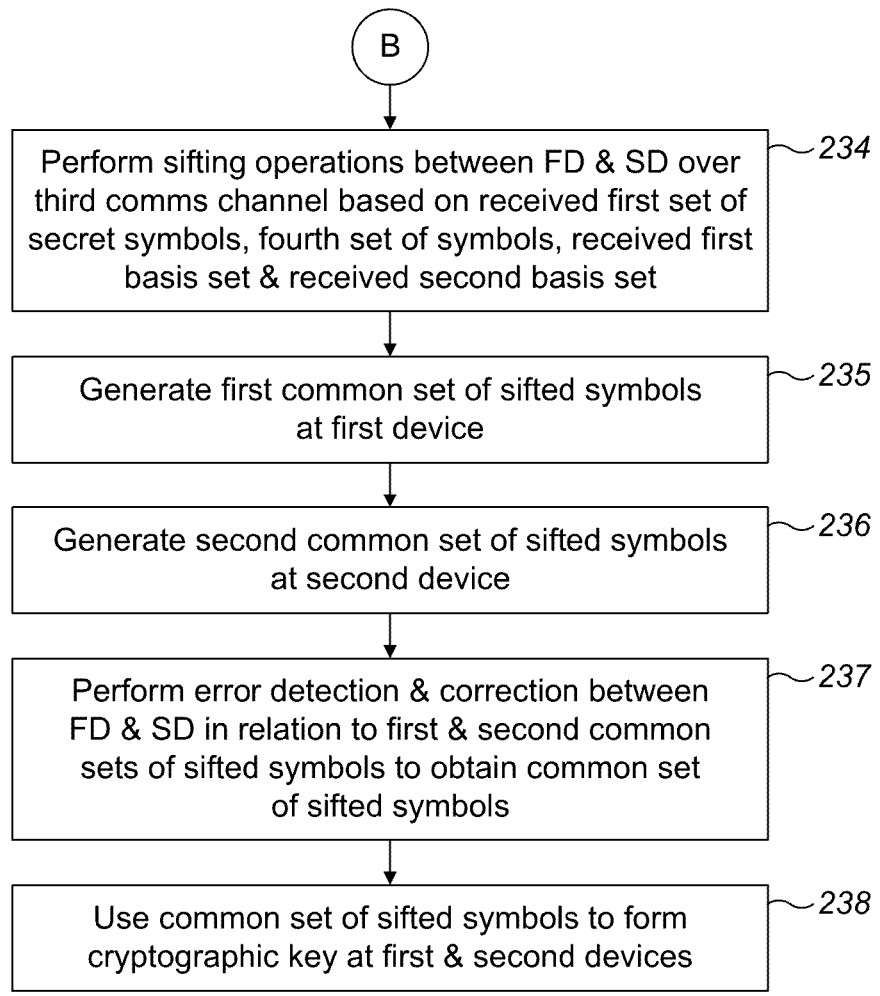

FIGS. 2c, 2d and 2e are a flow diagram illustrating another example QKD protocol process 220 according to the invention in which the reliability of the QKD protocol 200 as described with reference to FIGS. 2a and 2b is further improved. The QKD protocol 220 is based on the QKD protocol 200 of FIGS. 2a and 2b but with further modifications and/or additional steps. As described with reference to FIGS. 2a and 2b, the QKD protocol process 220 is also performed by an intermediary device, a first device and a second device. The QKD protocol 220 is configured to enable the intermediary device to provide secret symbols to each of the first and second device in a more reliable or robust manner in relation to QKD protocol process 200 as described with reference to FIGS. 2a and 2b. Referring to FIGS. 2c, 2d, and 2e, the QKD protocol 220 includes one or more of the following steps of:

In step 221, sending or transmitting, by the intermediary device, a first secret symbol string over a first quantum channel to the first device. Each symbol of the first secret symbol string modulated by a basis state randomly selected from a set of bases.

In step 222, sending or transmitting, by the first device, over the first communication channel to the intermediary device a first set of symbol positions associated with the successfully received symbols of the received first secret symbol string. The first set of symbol positions including data representative of the symbol positions of the symbols in the first secret symbol string transmitted by the intermediary device over the first quantum communication channel that were successfully received by the first device.

In step 223, sending or transmitting, by the intermediary device, a first basis set over a first communication channel to the first device. The first basis set is determined by the intermediary device and includes data representative of the randomly selected bases used to modulate those symbols of the first secret symbol string corresponding to the received first set of symbol positions.

Prior to transmitting the first basis set to the first device, the intermediary device receives from the first device, over the first communication channel, the first set of symbol positions including data representative of the symbol positions of the symbols in the first secret symbol string transmitted by the intermediary device over the first quantum communication channel that were successfully received by the first device.

In step 224, generating, at the intermediary device, a first set of symbols based on those symbols of the first secret symbol string that correspond to the received first set of symbol positions. The received first set of symbol positions including data representative of the symbol positions of symbols from the first secret symbol string that were successfully received by the first device.

In step 225, sending or transmitting, by the intermediary device, a second secret symbol string over a second quantum channel to the second device. Each symbol of the second secret symbol string modulated by a basis state randomly selected from the set of bases.

In step 226, sending or transmitting, by the second device, over the second communication channel to the intermediary device a second set of symbol positions. The second set of symbol positions including data representative of the symbol positions of the symbols in the second secret symbol string transmitted by the intermediary device over the second quantum communication channel that were successfully received by the second device.

In step 227, sending or transmitting, by the intermediary device, a second basis set over a second communication channel to the second device. The second basis set including data representative of the randomly selected bases used to modulate each of those symbols of the second secret symbol string corresponding to the received second set of symbol positions.

Prior to transmitting the second basis set to the second device, the intermediary device receives from the second device, over the second communication channel, second set of symbol positions including data representative of the symbol positions of the symbols in the second secret symbol string transmitted by the intermediary device over the second quantum communication channel that were successfully received by the second device.

In step 228, generating, at the intermediary device, a second set of symbols based on those symbols of the second secret symbol string that correspond to the received second set of symbol positions. The received second set of symbol position including data representative of the symbol positions of symbols from the second secret symbol string successfully received by the second device.

In step 229, generating, by the intermediary device, a third symbol string based on combining the first set of secret symbols and the second set of secret symbols. The first set of secret symbols is derived from the first secret symbol string in step 224. The second set of secret symbols is derived from the second secret symbol string in step 228. The intermediary device generating the third symbol string may further include, without limitation, for example one or more combining or processing operations from the group of: 1) generating the third symbol string based on performing an XOR operation using data representative of a first set of bits and a second set of bits, the first set of bits based on converting each of the symbols in the first set of symbols to a string of bits and the second set of bits based on converting each of the symbols in the second set of symbols to a string of bits; 2) generating the third symbol string based on performing an extended XOR operation using data representative of a first set of symbols and a second set of symbols, wherein the extended XOR operation is configured to preserve the properties of a bitwise XOR operation; 3) generating the third bit string based on performing one time pad (OTP) encryption operation(s) using data representative of, at least in part, the first set of symbols and the second set of symbols; and/or 4) generating the third symbol string based on performing any other type of operation for obfuscating, masking, encrypting one or more symbols of the first set of symbols using the second set of symbols, wherein the second device is capable of reversing these operations based on the successfully received symbols of the received second symbol string.

In step 230, sending or transmitting, by the intermediary device, to the second device, via the second communication channel, data representative of the third symbol string.

In step 231, determining, by the first device, a first received set of secret symbols using the received first basis set. The first received set of secret symbols including data representative of symbols of the first secret symbol string transmitted over the first quantum channel that were successfully received by the first device.

In step 232, determining, by the second device, a second received set of secret symbols using the received second basis set. The second received set of secret symbols including data representative of symbols of the second secret symbol string transmitted over the second quantum channel that were successfully received by the second device.

In step 233, generating, by the second device, a fourth set of symbols based on combining the second received set of secret symbols generated in step 232 with the received third symbol string. One or more symbols of the fourth set of symbols correspond to one or more symbols of the first secret symbol string.

The second device generating the fourth symbol string may further include, without limitation, for example one or more processing operations from the group of: 1) generating the fourth symbol string based on performing an XOR operation using the second received set of secret symbols and the received third symbol string; 2) generating the fourth symbol string based on performing an XOR operation using data representative of a second received set of secret bits and a received third bit string, the second received set of secret bits based on converting each of the symbols in the second received set of secret symbols to a string of bits and received third bit string based on converting each of the symbols in the received third symbol string to a string of bits; 3) generating the fourth symbol string based on performing an extended XOR operation using data representative of the received second set of secret symbols and the received third symbol string, where the extended XOR operation is configured to preserve the properties of a bitwise XOR operation; 4) generating the fourth symbol string based on performing OTP decryption operation(s) using the received second set of secret symbols and the third secret symbol string; 5) generating the fourth symbol string based on performing any other type of operation for determining/extracting one or more symbols of the first secret symbol string using the second received set of secret symbols and the third symbol string.

In step 234, performing, by the first device and second device, symbol sifting operations over a third communication channel based on the first received set of secret symbols at the first device and the fourth set of symbols at the second device for generating a common set of sifted symbols for forming a cryptographic key at the first and second devices. The symbol sifting operations may also be based on the received first and second basis sets.

For example, the first device forms a first matching basis set based on the first received set of secret symbols. The first matching basis set includes all the basis states the first device used to receive the symbols of the first received set of secret symbols that match the corresponding basis states of the received first basis set used to transmit said symbol of the first set of symbols. The first device sends over the third communication channel data representative of the first matching basis set to the second device. The second device forms a second matching basis set based on the second received set of secret symbols. The second matching basis set includes all the basis states the second device used to receive the symbols of the second received set of secret symbols that match the corresponding basis states of the received second basis set used to transmit said symbol of the second set of symbols. The second device sends over the third communication channel data representative of the second matching basis set to the first device.

In another example, generating, by the first device, a first basis flag set based on the first received set of secret symbols and the received first basis set. The first basis flag set includes data representative of an indication of each valid and invalid symbol of the first received set of secret symbols. The first basis flag set is determined based on comparing the received first basis set with the basis set used by the first device to demodulate the symbols associated with the first received set of secret symbols. Sending, from the first device over the third communication channel, data representative of the first basis flag set to the second device. Generating, by the second device, a second basis flag set based on the second received set of secret symbols and the received second basis set. The second basis flag set includes data representative of an indication of each valid and invalid symbol of the second received set of secret symbols. The second basis flag set is determined based on comparing the received second basis set with the basis set used by the second device to demodulate the symbols associated with the second received set of secret symbols. Sending, from the second device over the third communication channel, data representative of the second basis flag set to the first device.

In step 235, generating, by the first device, a first common set of sifted symbols.

For example, should a first and second matching basis sets be formed in step 234, the first device generates the first common set of sifted symbols based on discarding each symbol in the first received set of secret symbols in which the corresponding basis in the first matching basis set is different to the corresponding basis in the received second matching basis set.

For example, should a first and second basis flag set be formed in step 234, the first device generates the first common set of sifted symbols based on discarding each symbol in the first received set of secret symbols in which the corresponding indication in the first basis flag set is different to the corresponding indication in the received second basis flag set.

In step 236, generating, by the second device, a second common set of sifted symbols.

For example, should a first and second matching basis sets be formed in step 234, the second device generates a second common set of sifted symbols based on discarding each symbol in the fourth set of secret symbols in which the corresponding basis in the received first matching basis set is different to the corresponding basis in the second matching basis set.

For example, should a first and second basis flag set be formed in step 234, the second device generates a second common set of sifted symbols based on discarding each symbol in the fourth set of secret symbols in which the corresponding indication in the second basis flag set is different to the corresponding indication in the received first basis flag set.

In step 237, the first and second devices perform error detection, correction, and/or privacy amplification using the third communication channel between the first and second devices in relation to first and second common sets of sifted symbols to obtain a common set of sifted symbols at both the first and second devices.

In step 238, at each of the first and second device, forming a final cryptographic key using the common set of sifted symbols, where the final cryptographic key at the first device is the same as the final cryptographic key at the second device.

The communications over one or more of: the first quantum channel, the second quantum channel, the first communication channel, the second communication channel and/or the third communication channel; may be, without limitation, for example encrypted communications with pre-shared keys between the corresponding intermediary device, the first device, and/or the second device and/or as the application demands. Alternatively or additionally, the communications over one or more of: the first quantum channel, the second quantum channel, the first communication channel, the second communication channel and/or the third communication channel; may be, without limitation, for example authenticated and/or encrypted communications with pre-shared authentication and/or encryption keys between the corresponding intermediary device, the first device, and/or the second device and/or as the application demands.

Figure 3A:
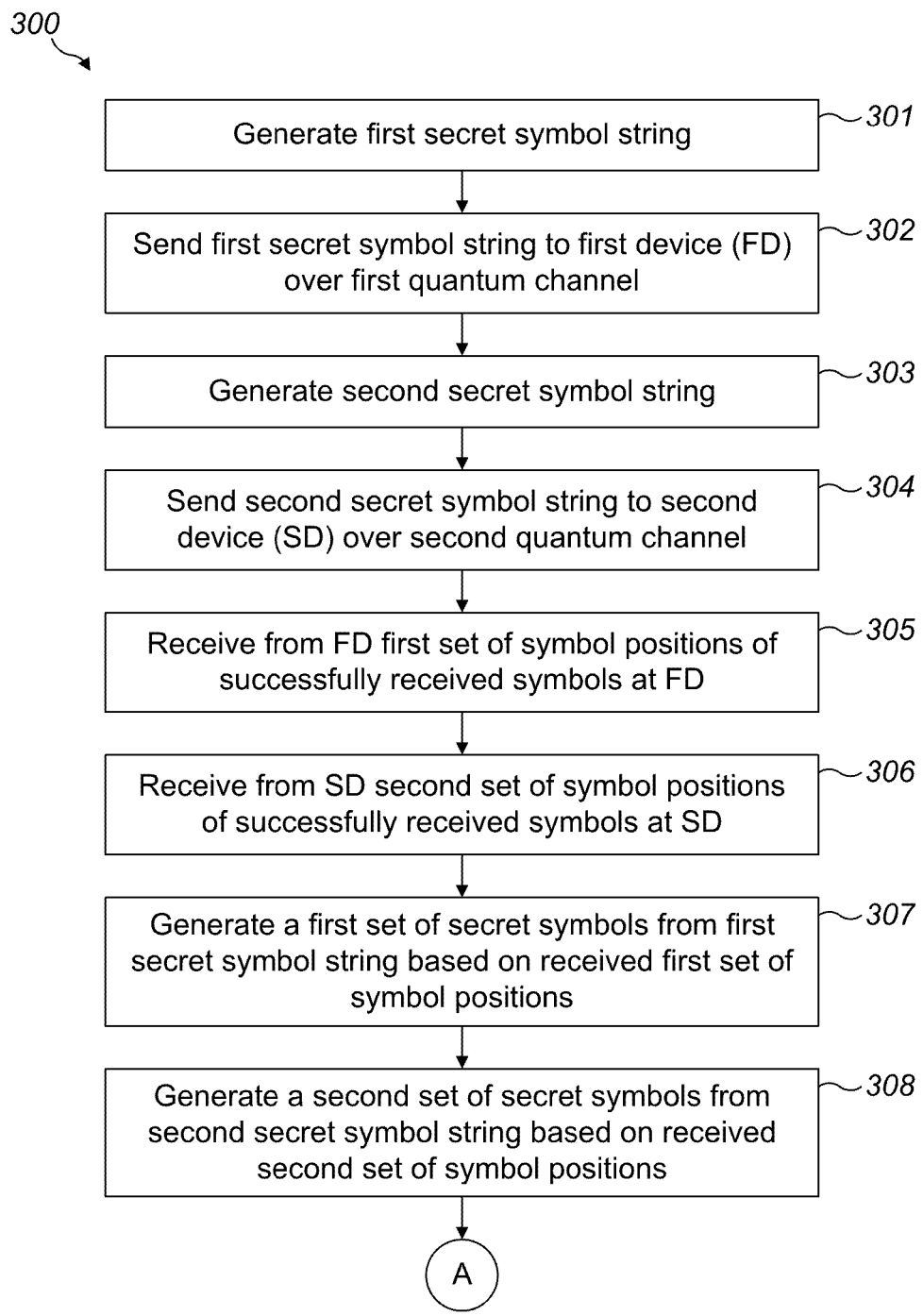
FIGS. 3a and 3b is a flow diagram illustrating an example intermediary device QKD process for implementing corresponding portions of an example QKD protocol with a first and second device according to the invention.
Figure 3B:
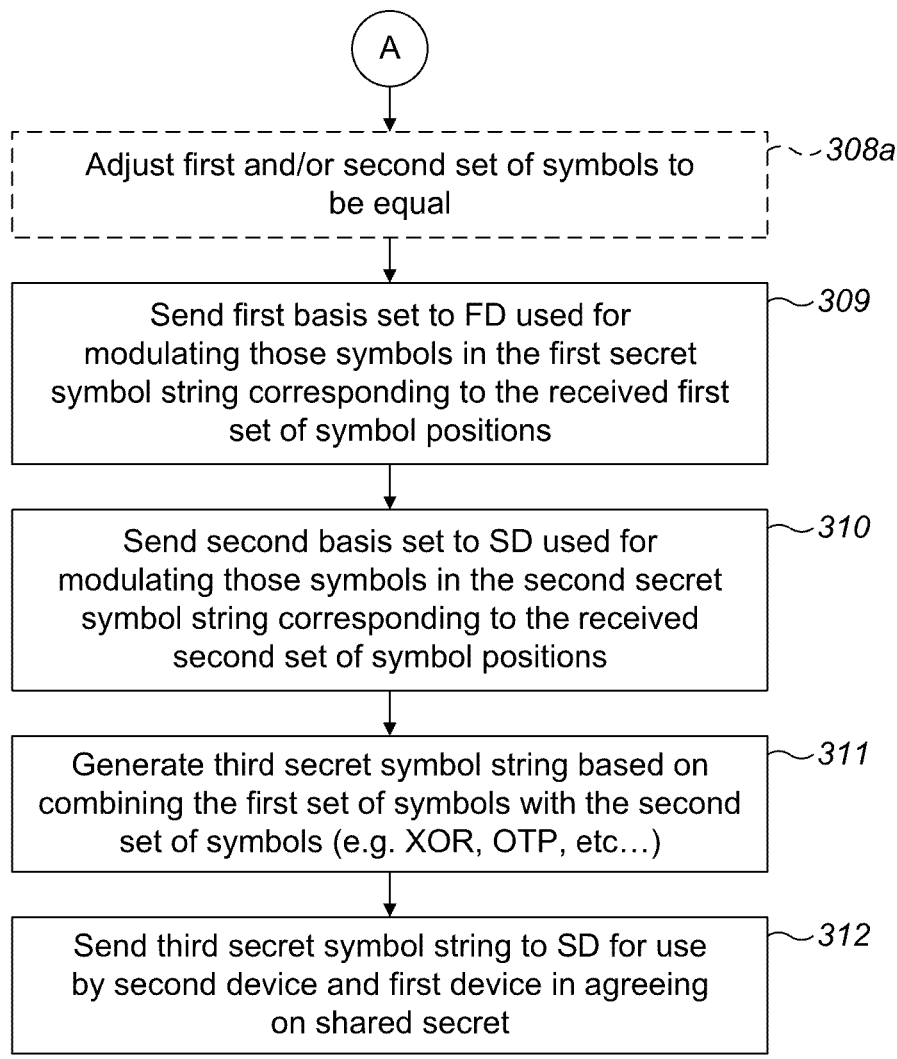

FIGS. 3a and 3b is a flow diagram illustrating an example intermediary QKD protocol process 300 for an intermediary device performing QKD protocol process(es) 200 and 220 as described with reference to FIGS. 2a to 2e. It is assumed that the intermediary device is performing the QKD protocol according to the invention with a first device and a second device. The intermediary device is in communication with the first device and the second device for distributing secret symbols therebetween. The first and second device require a shared key or shared cryptographic key based on the distributed secret symbols in which the shared key or shared cryptographic key is unknown to the intermediary device. The first device performs the reciprocal portions of the QKD protocol according to the invention with the intermediary device and the second device based on based on, without limitation, for example first device QKD process 320 as described with reference to FIGS. 3c and 3d. The second device performs the reciprocal portions of the QKD protocol according to the invention with the intermediary device and the first device based on, without limitation, for example first device QKD process 340 as described with reference to FIGS. 3e to 3g. The intermediary QKD protocol process 300 performed by intermediary device includes the following steps of:

In step 301, generating a first secret symbol string based on the output of a random symbol generator and the like.

In step 302, transmitting a first secret symbol string over a first quantum channel to the first device, each symbol of the first secret symbol string modulated by a basis state randomly selected from a set of bases.

In step 303, generating a second secret symbol string based on the output of a random symbol generator and the like. The second secret symbol string different to the first secret symbol string.

In step 304, transmitting a second secret symbol string over a second quantum channel to the second device. Each symbol of the second secret symbol string modulated by a basis state randomly selected from the set of bases.

In step 305, receiving from the first device, over a first communication channel, first set of symbol positions including data representative of the symbol positions of the symbols in the first secret symbol string transmitted over the first quantum communication channel that were successfully received by the first device.

In step 306, receiving from the second device, over the second communication channel, a second set of symbol positions including data representative of the symbol positions of the symbols in the second secret symbol string transmitted over the second quantum communication channel that were successfully received by the second device.

In step 307, generating a first set of symbols based on the first set of secret symbol positions and the first secret symbol string. The first set of symbols including those symbols of the first secret symbol string that correspond to the received first set of symbol positions. The first set of symbol positions including data representative of the symbol positions of symbols from the first secret symbol string successfully received by the first device.

In step 308, generating a second set of secret symbols based on the second set of secret symbol positions and the second secret symbol string. The second set of symbols including those symbols of the second secret symbol string that correspond to the received second set of symbol positions. The second set of symbol positions including data representative of the symbol positions of symbols from the second secret symbol string successfully received by the second device.

In step 308a, which may be optional, adjusting the first and/or second sets of secret symbols to be equal. Should the number or length of the first set of secret symbols be different to the second set of secret symbols, then generating the third symbol string may further include adjusting the number or lengths of the first set of secret symbols and/or the second set of secret symbols to be equal. This may be based on an adjustment protocol that is also known by both the first and/or second devices so that they can adjust or correlate the first and/or second sets of symbol positions that have been retained in the first and second sets of secret symbols.

For example, the adjustment of the first and/or second sets of secret symbols may include, without limitation, for example: in response to determining the length of the first set of symbols is less than the length of the second set of symbols, then truncating the second set of symbols to the length of the first set of symbols, generating the third symbol string based on combining the first set of symbols with the truncated second set of symbols. In response to determining the length of the second set of symbols is less than the length of the first set of symbols, then truncating the first set of symbols to the length of the second set of symbols.

Alternatively or additionally, the adjustment of the first and/or second sets of secret symbols may include, without limitation, for example: in response to determining the length of the first set of symbols is less than the length of the second set of symbols, then adjusting the second set of symbols by removing an agreed set of symbols from the second set of symbols until the adjusted length of the adjusted second set of symbols is the same as the first set of symbols. In response to determining the length of the second set of symbols is less than the length of the first set of symbols, then adjusting the first set of symbols by removing an agreed set of symbols from the first set of symbols until the adjusted length of the adjusted first set of symbols is the same as the second set of symbols.

In step 309, sending or transmitting a first basis set over the first communication channel to the first device. The first basis set including data representative of the randomly selected bases used to modulate those symbols of the first secret symbol string corresponding to the received first set of symbol positions.

In step 310 sending or transmitting a second basis set over the second communication channel to the second device. The second basis set comprising data representative of the randomly selected bases used to modulate those symbols of the second secret symbol string corresponding to the received second set of symbol positions.

In step 311, generating a third secret symbol string based on combining the first set of secret symbols and second set of secret symbols. For example, generating the third secret symbol string may be based, without limitation, for example on performing an XOR operation using data representative of a first set of bits and a second set of bits, the first set of bits based on converting each of the symbols in the first set of secret symbols to a string of bits and the second set of bits based on converting each of the symbols in the second set of secret symbols to a string of bits. In another example, generating the third bit string may be based on, without limitation, for example performing OTP encryption operation(s) using data representative of, at least in part, the first set of symbols and the second set of symbols. Although XOR operations and OTP encryption operations are described, this is by way of example only and the invention not so limited, it is to be appreciated by the skilled person that any other suitable operations may be used to generate the third symbol string based on the first and second sets of secret symbols such as, without limitation, for example performing any other type of operation for masking, encrypting, obfuscating one or more symbols of the first set of symbols using the second set of symbols such that the second device may derive the first set of symbols using a received second set of symbols determined by the second device.

If step 308*a* is not performed, as it is optional, generating the third secret symbol string may optionally include, prior to or after the combining operation, without limitation, for example checking whether the number or length of the first set of secret symbols is different to the second set of secret symbols, adjusting the number or lengths of the first set of secret symbols and/or the second set of secret symbols to be equal. This may be based on an adjustment protocol that is also known by both the first and/or second devices so that they can adjust or correlate the first and/or second sets of symbol positions that have been retained in the first and second sets of secret symbols.

For example, the adjustment of the first and/or second sets of secret symbols may include, without limitation, for example: in response to determining the length of the first set of symbols is less than the length of the second set of symbols, then truncating the second set of symbols to the length of the first set of symbols, generating the third symbol string based on combining the first set of symbols with the truncated second set of symbols. In response to determining the length of the second set of symbols is less than the length of the first set of symbols, then truncating the first set of symbols to the length of the second set of symbols, and generating the third symbol string based on combining the truncated first set of symbols with the second set of symbols.

Alternatively or additionally, the adjustment of the first and/or second sets of secret symbols may include, without limitation, for example: in response to determining the length of the first set of symbols is less than the length of the second set of symbols, then adjusting the second set of symbols by removing an agreed set of symbols from the second set of symbols until the adjusted length of the adjusted second set of symbols is the same as the first set of symbols, and generating the third symbol string based on combining the first set of symbols with the adjusted second set of symbols. In response to determining the length of the second set of symbols is less than the length of the first set of symbols, then adjusting the first set of symbols by removing an agreed set of symbols from the first set of symbols until the adjusted length of the adjusted first set of symbols is the same as the second set of symbols, and generating the third symbol string based on combining the adjusted first set of symbols with the second set of symbols.

In step 312, transmitting to the second device, via the second communication channel, data representative of the generated third secret symbol string.

The first device and second device, once they receive the corresponding sets of secret symbols and basis sets, perform a quantum key exchange based on, without limitation, for example, the following operations performed by the first and second device including: the first device using the received first basis set to determine a first received set of secret symbols comprising symbols of the first secret symbol string transmitted over the first quantum channel that were successfully received by the first device. The second device uses the received second basis set to determine a second received set of secret symbols comprising symbols of the second secret symbol string transmitted over the second quantum channel that were successfully received by the second device. The second device generates a fourth set of symbols based on combining the second received set of secret symbols with the received third symbol string, where one or more symbols of the fourth set of symbols correspond to one or more symbols of the first symbol string. The first device and second device performing symbol sifting operations over a third communication channel between the based on the first received set of secret symbols at the first device and the fourth set of symbols at the second device for generating a common set of sifted symbols for agreeing upon and/or forming a shared or final cryptographic key at the first and second devices.

Figure 3C:
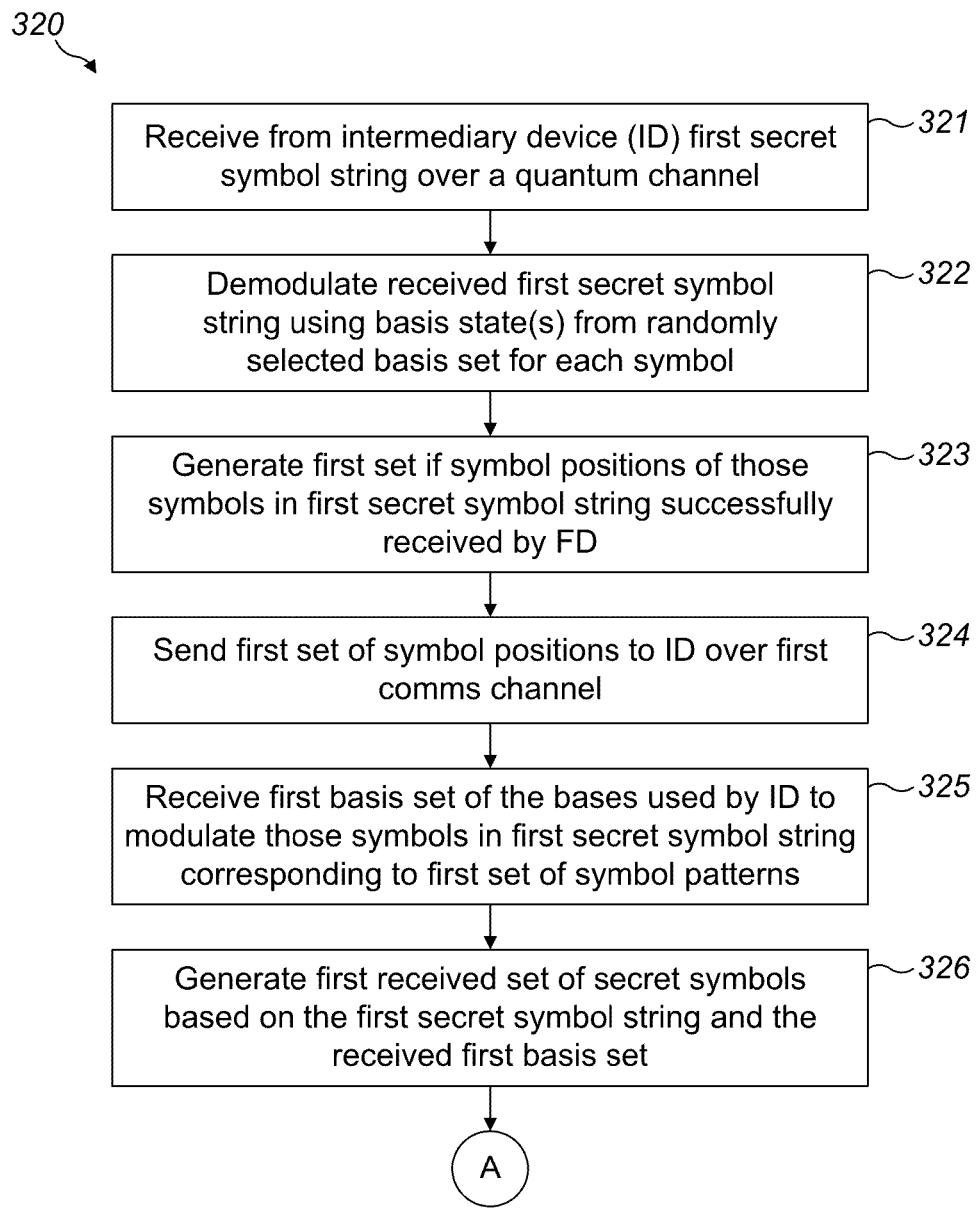
FIGS. 3c and 3d is a flow diagram illustrating an example first device QKD process for implementing corresponding portions of the example QKD protocol of FIGS. 3a and 3b with the intermediary device and second device according to the invention.
Figure 3D:
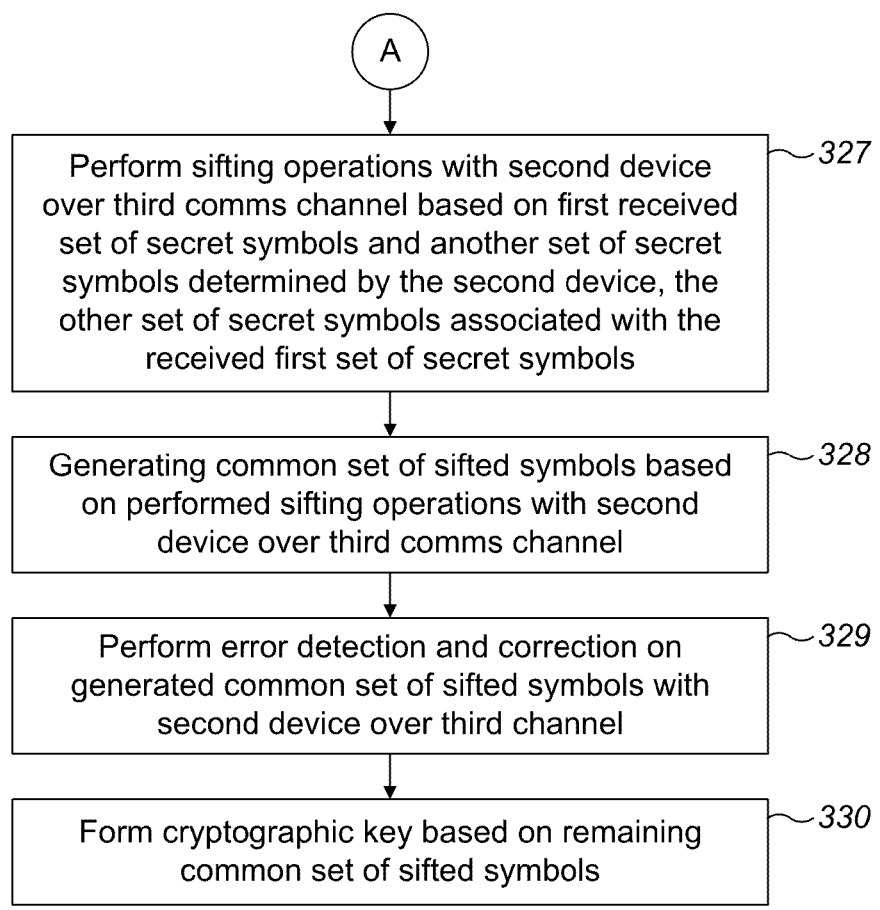

FIGS. 3c and 3d is a flow diagram illustrating an example first device QKD protocol process 320 for a first device performing a QKD protocol process based on QKD process (es) 200 and/or 220 as described with reference to FIGS. 2a and 2b and/or QKD protocol as described with reference to FIGS. 1a to 1 d, combinations thereof, modifications thereto and/or as described herein. It is assumed that the first device is performing a QKD protocol according to the invention with an intermediary device and a second device. The first device is in communication with the intermediary device and the second device in which the first and second device require a shared key or shared cryptographic key based on distributed secret symbols from the intermediary device. The resulting shared key or shared cryptographic key is unknown to the intermediary device. The intermediary device is performing the reciprocal steps of the QKD protocol according to the invention based on intermediary QKD process 300 as described with reference to FIGS. 3a and 3b, which is based on intermediary device operations of the QKD protocol process(es) 200 and 220 of FIGS. 2a and 2b and/or QKD protocol of FIGS. 1a to 1 d, combinations thereof, modifications thereto and/or as described herein. The second device is performing the reciprocal steps of the QKD protocol according to the invention based on second device QKD process 340 as described with reference to FIGS. 3e to 3g, which is based on the second device operations of QKD protocol process(es) 200 and 220 of FIGS. 2a and 2b and/or QKD protocol of FIGS. 1a to 1 d, combinations thereof, modifications thereto and/or as described herein. The first device QKD protocol process 320 performed by the first device includes the following steps of:

In step 321, receiving, from an intermediary device, over a quantum channel a first secret symbol string, wherein the intermediary device modulated each symbol of the first secret symbol string using a basis state of a basis selected at random from a set of bases for transmission over the quantum channel;

In step 322, demodulating the received first secret symbol string, where each received first secret symbol is demodulated using a basis state of a basis selected at random from the set of bases.

In step 323, generating a first set of symbol positions including data representative of the symbol positions of the symbols in the first secret symbol string received over the first quantum communication channel that were successfully received by the first device.

In step 324, transmitting, to the intermediary device, over a first communication channel, the first set of symbol positions. The first set of symbol positions including data representative of the symbol positions of the symbols in the first secret symbol string that were successfully received by the first device over the quantum communication channel.

In step 325, receiving, from the intermediary device, data representative of a first basis set over the first communication channel. The first basis set including data representative of the randomly selected bases used by the intermediary device to modulate those symbols of the first secret symbol string corresponding to the first set of symbol positions.

In step 326, generating or determining a first received set of secret symbols from the received first secret symbol string that are successfully received using the received first basis set. For example, this may include generating or determining the first received set of secret symbols from the received first secret symbol string that are validly received based on comparing the randomly selected bases used to demodulate the first secret symbol string and the received randomly selected bases used to modulate the first secret symbol string.

In step 327, performing sifting operation(s) with the second device over a third communication channel using the first received set of secret symbols of the first device and another set of secret symbols determined by the second device for generating a common sifted set of symbols with the second device. The other set of secret symbols are associated with the first received set of secret symbols.

For example, the second device determines the other set of secret symbols based on, at least in part, a second secret symbol string received by the second device over a second quantum channel from the intermediary device and, at least in part, on a third secret symbol string received by the second device over a second communication channel from the intermediary device. The third secret symbol string is based on a combination of, at least in part, the second secret symbol string and the first secret symbol string. The second device generates the other set of secret symbols based on a combination of the received third secret symbol string and, at least in part, the received second secret symbol string. Thus, the other set of secret symbols include one or more symbols associated with the first secret symbol string and hence the first received set of secret symbols.

In step 328, generating a first common set of sifted symbols based on the performed sifting operation(s) with the second device. The second device has also generated a second common set of sifted symbols.

In step 329, performing error correction and/or detection with the second device on the first common set of sifted symbols. The second device performs reciprocal or corresponding operations on the second common set of sifted symbols. The resulting error detected/corrected common set of sifted symbols (if there are not too many errors detected) forms a common set of sifted symbols that are the same at the first and second devices.

In step 330, agreeing or forming a cryptographic key with the second device based on the common set of sifted symbols derived in step 329.

The steps 327 to 330 may further include, without limitation for example, the first device and second device performing a quantum key exchange based on: the first device forms a first received set of secret symbols based on the received first basis set and the symbols that were successfully received from the first secret symbol string transmitted by the intermediary device over the quantum communication channel, wherein each symbol of the first received set of secret symbols is a symbol of the first secret symbol string that was successfully received by the first device in which the basis used for receiving said symbol matches the corresponding basis in the received first basis set used to transmit said symbol. The second device forms a second received set of secret symbols based on a received second basis set and the symbols that were successfully received from the second secret symbol string transmitted by the intermediary device over the second quantum channel, wherein each symbol of the second received set of secret symbols is a symbol of the second secret symbol string that was successfully received by the second device in which the basis used for receiving said symbol matches the corresponding basis in the received second basis set used to transmit said symbol. The second device generates the other set of symbols based on combining the second received set of secret symbols with the received third symbol string, where one or more symbols of the other set of symbols correspond to one or more symbols of the first set of symbols; and Steps 327 to 330 may further include, without limitation, for example, performing symbol sifting operations with the second device over the third communication channel based on the first received set of secret symbols at the first device and the other set of symbols at the second device for generating a common set of sifted symbols for forming a cryptographic key at the first and second devices.

Step 327 may further include, without limitation, for example the steps of: forming a first matching basis set based on the first received set of secret symbols, wherein the first matching basis set includes all the basis states the first device used to receive the symbols of the first received set of secret symbols that match the corresponding basis states of the received first basis set used by the intermediary device to transmit said symbol of the first secret symbol string; and transmitting to the second device over the third communication channel data representative of the first matching basis set.

The first device further receives from the second device over the third communication channel data representative of a second matching basis set, wherein the second device forms the second matching basis set based on the second received set of secret symbols, wherein the second matching basis set includes all the basis states the second device used to receive the symbols of the second received set of secret symbols that match the corresponding basis states of the received second basis set used by the intermediary device to transmit said symbol of the second secret symbol string.

Generating a first common set of sifted symbols based on discarding each symbol in the first received set of secret symbols in which the corresponding basis in the first matching basis set is different to the corresponding basis in the received second matching basis set, wherein the second device generates a second common set of sifted symbols based on discarding each symbol in the other set of secret symbols in which the corresponding basis in the received first matching basis set is different to the corresponding basis in the second matching basis set.

Forming a cryptographic key based on the first common set of sifted symbols, wherein the second device forms the cryptographic key based on the second common set of sifted symbols.

FIG. 3c is a flow diagram illustrating an example second device QKD protocol process 300 for a second device performing QKD protocol process 200 and/or 220 as described with reference to FIGS. 2a and 2b. It is assumed that the second device is performing a QKD protocol according to the invention with an intermediary device and a first device. The second device is in communication with the intermediary device and the first device in which the first and second device require a shared key or shared cryptographic key based on distributed secret symbols from the intermediary device. The resulting shared key or shared cryptographic key is unknown to the intermediary device. The intermediary device and the first device are configured to perform the reciprocal steps of the QKD protocol according to the invention. For example, the intermediary device may be configured to perform the portions of the QKD protocol based on intermediary QKD process 300 as described with reference to FIG. 3a, which is based on the QKD protocol process(es) 200 and 220 of FIGS. 2a and 2b and/or of FIGS. 1a to 1d, combinations thereof, modifications thereto and/or as described herein. The first device may be configured to perform the portions of the QKD protocol based on first device QKD process 3XX as described with reference to FIG. 3b, which is based on the QKD protocol process(es) 200 and 220 of FIGS. 2a and 2b and/or of FIGS. 1a to 1d, combinations thereof, modifications thereto and/or as described herein. The second device QKD protocol process 300 performed by the second device includes the following steps of:

In step 341, receiving, from an intermediary device, over a second quantum channel a second secret symbol string, where the intermediary device modulated each symbol of the second secret symbol string using a basis state of a basis selected at random from a set of bases.

In step 342, demodulating the received second secret symbol string, where each received second secret symbol is demodulated using a basis state of a basis selected at random from the set of bases.

In step 343, generating a second set of symbol positions including data representative of the symbol positions of the symbols in the second secret symbol string received over the second quantum communication channel that were successfully received by the second device.

In step 344, transmitting, to the intermediary device, over a second communication channel, the second set of symbol positions. The second set of symbol positions including data representative of the symbol positions of the symbols in the second secret symbol string that were successfully received by the second device over the second quantum communication channel.

In step 345, receiving, from the intermediary device, data representative of a second basis set over the second communication channel. The second basis set including data representative of the randomly selected bases used by the intermediary device to modulate those symbols of the second secret symbol string corresponding to the second set of symbol positions.

In step 346, generating or determining a second received set of secret symbols from the received second secret symbol string that are successfully received using the received second basis set. For example, this may include generating or determining the second received set of secret symbols from the received second secret symbol string that are validly received based on comparing the randomly selected bases used to demodulate the second secret symbol string and the received randomly selected bases used to modulate the second secret symbol string.

In step 347, receiving, from the intermediary device, data representative of a third symbol string. The third symbol string generated by the intermediary device based on a combination of, at least in part, the second secret symbol string and a first secret symbol string. The first secret symbol string sent from the intermediary device to the first device over a first quantum channel.

For example, in step 311 of process 300, the third symbol string was generated by the intermediary device based on, without limitation, for example one or more from the group of: generating the third symbol string based on performing an XOR operation using data representative of, at least in part, the first secret symbol string and the second secret symbol string; generating the third symbol string based on performing one time pad encryption operation(s) using data representative of, at least in part, the first secret symbol string and the second secret symbol string; and generating the third symbol string based on performing any other type of operation for, without limitation, for example masking, encrypting, obfuscating one or more symbols of the first secret symbol string using the second secret symbol string.

In another example, in step 311 of process 300, the third symbol string may be generated based on, without limitation, for example performing one or more of: an XOR operation using data representative of a first set of bits and a second set of bits, the first set of bits based on converting each of the symbols in the first set of secret symbols to a string of bits and the second set of bits based on converting each of the symbols in the second set of secret symbols to a string of bits; OTP encryption operation(s) using data representative of, at least in part, the first set of symbols and the second set of symbols; and/or generating the third symbol string based on performing any other type of operation for masking, encryption, obfuscating one or more symbols of the first set of symbols using the second set of symbols, where the second device may demask, decrypt and/or de-obfuscate the first set of symbols from a received third symbol string using corresponding received second set of symbols.

In step 348, generating or determining a fourth set of secret symbols based on combining, at least in part, the received third symbol string with the received second set of secret symbols.

For example, the second device determines the fourth set of secret symbols based on, at least in part, a second secret symbol string received by the second device over a second quantum channel from the intermediary device and, at least in part, on a third secret symbol string received by the second device over a second communication channel from the intermediary device. The third secret symbol string is based on a combination of, at least in part, the second secret symbol string and the first secret symbol string. The second device generates the fourth set of secret symbols based on a combination of the received third secret symbol string and, at least in part, the received second secret symbol string. Thus, the fourth set of secret symbols include one or more symbols associated with the first secret symbol string and hence the first received set of secret symbols.

In another example, the second device may generate the fourth symbol string based on, without limitation, for example one or more operations from the group of: generating the fourth symbol string based on performing an XOR operation using the second received set of secret symbols and the received third symbol string; generating the fourth symbol string based on performing one time pad decryption operation(s) using the received second set of secret symbols and the third secret symbol string; and generating the fourth symbol string based on performing any other type of operation for extracting one or more symbols of the first secret symbol string using the second received set of secret symbols and the third symbol string.

Additionally or alternatively, for example, generating the fourth symbol string further includes, without limitation, for example, one or more from the group of: generating the fourth symbol string based on performing an XOR operation using data representative of, at least in part, the received second secret symbol string and the received third symbol string; generating the fourth symbol string based on performing one time pad decryption operation(s) using data representative, of at least in part, the received second secret symbol string and the received third secret symbol string; and generating the fourth symbol string based on performing any other type of operation for extracting one or more symbols of the first secret symbol string using data representative of, at least in part, the received second secret symbol string and the received third symbol string.

In step 349, performing sifting with the first device using the fourth set of secret symbols and another set of secret symbols determined by the first device for generating a common sifted set of symbols. The fourth set of secret symbols are associated with the first secret symbol string that is determined to be validly received by the first device. The fourth set of secret symbols are associated with the first received set of secret symbols.

In step 350 generating a second common set of sifted symbols based on the performed sifting operation(s) with the first device. The first device has also generated a first common set of sifted symbols.

In step 351, performing error correction and/or detection with the first device on the second common set of sifted symbols. The first device performs reciprocal or corresponding operations on the first common set of sifted symbols. The resulting error detected/corrected common set of sifted symbols (if there are not too many errors detected) forms a common set of sifted symbols that are the same at the first and second devices.

In step 352, forming or agreeing on cryptographic key with the first device based on the resulting common set of sifted symbols (i.e. the error detected/corrected common set of sifted symbols.)

The steps 349 to 352 may further include, without limitation for example, the second device forming a second received set of secret symbols based on the received second basis set and the symbols that were successfully received from the second secret symbol string transmitted by the intermediary device over the second quantum channel. Each symbol of the second received set of secret symbols is a symbol of the second secret symbol string that was successfully received by the second device in which the basis used for receiving said symbol matches the corresponding basis in the received second basis set used to transmit said symbol. The second device generates the fourth set of symbols based on combining the second received set of secret symbols with the received third symbol string, where one or more symbols of the fourth set of symbols correspond to one or more symbols of the first set of symbols.

The first device forms the first received set of secret symbols based on a received first basis set and the symbols that were successfully received from the first secret symbol string transmitted by the intermediary device over the first quantum communication channel to the first device, wherein each symbol of the first received set of secret symbols is a symbol of the first secret symbol string that was successfully received by the first device in which the basis used for receiving said symbol matches the corresponding basis in the received first basis set used to transmit said symbol.

Thus, step 349, may further include, without limitation, for example performing symbol sifting operations with the first device over the third communication channel based on the first received set of secret symbols at the first device and the fourth set of symbols at the second device for generating a common set of sifted symbols for forming a cryptographic key at the first and second devices.

Step 349 may further include, without limitation, for example performing at the second device, receiving at the second device over the third communication channel data representative of a first matching basis set, where the first device forms the first matching basis set based on a first received set of secret symbols, wherein the first matching basis set includes all the basis states the first device used to receive the symbols of the first received set of secret symbols that match the corresponding basis states of the received first basis set used by the intermediary device to transmit said symbol of the first secret symbol string.

The second device forms a second matching basis set based on the second received set of secret symbols. The second matching basis set includes all the basis states the second device used to receive the symbols of the second received set of secret symbols that match the corresponding basis states of the received second basis set used by the intermediary device to transmit said symbol of the second secret symbol string. The second device transmits to the first device over the third communication channel data representative of a second matching basis set.

Step 349 may further include, without limitation, for example generating at the second device a second common set of sifted symbols based on discarding each symbol in the fourth set of secret symbols in which the corresponding basis in the received first matching basis set is different to the corresponding basis in the second matching basis set. The first device performs similar operations based on, without limitation, for example generating a first common set of sifted symbols based on discarding each symbol in the first received set of secret symbols in which the corresponding basis in the first matching basis set is different to the corresponding basis in the received second matching basis set.

Figure 3E:
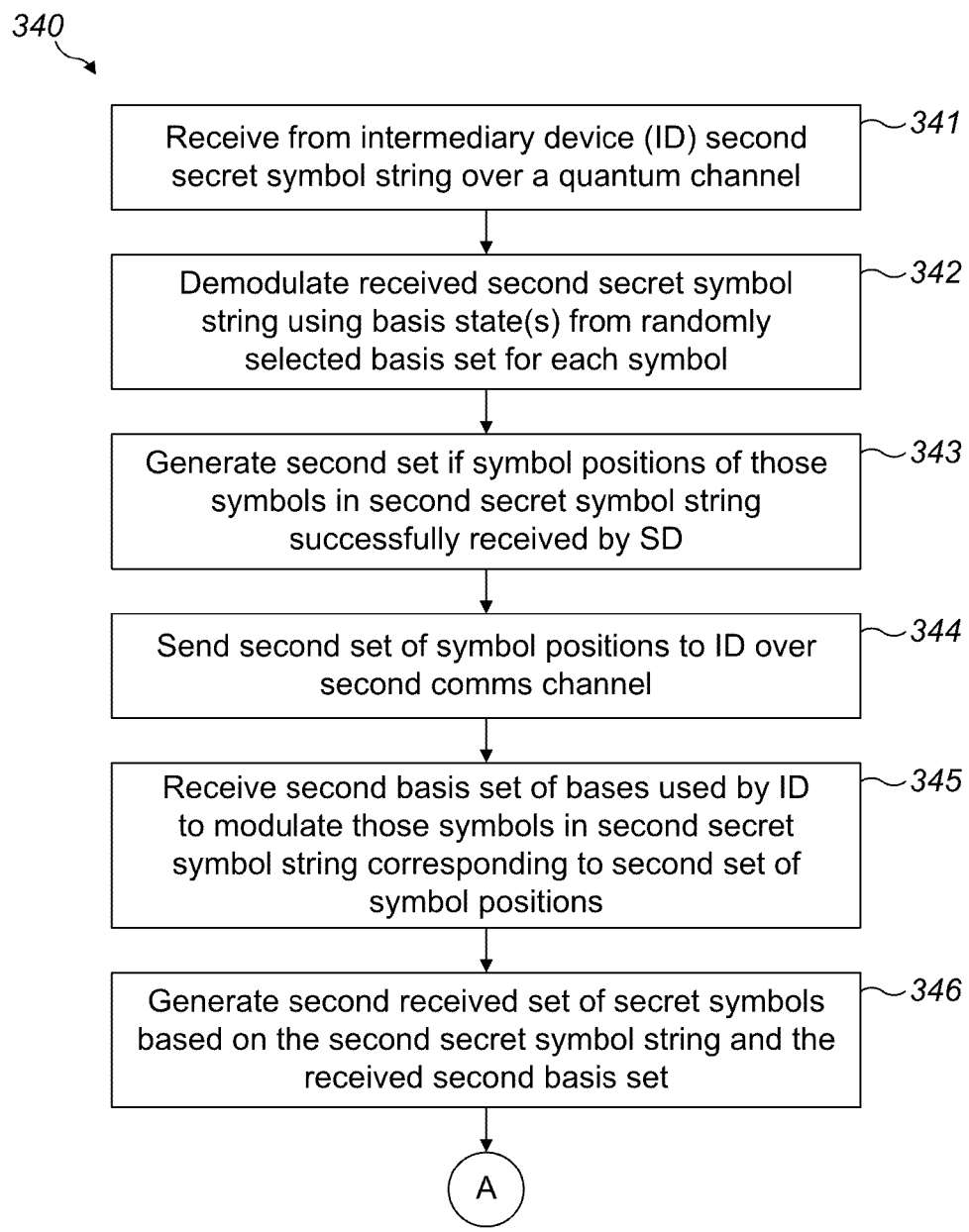
FIGS. 3e to 3g is a flow diagram illustrating an example second device QKD process for implementing corresponding portions of the example QKD protocol of FIGS. 3a to 3d with the intermediary device and first device according to the invention.
Figure 3F:
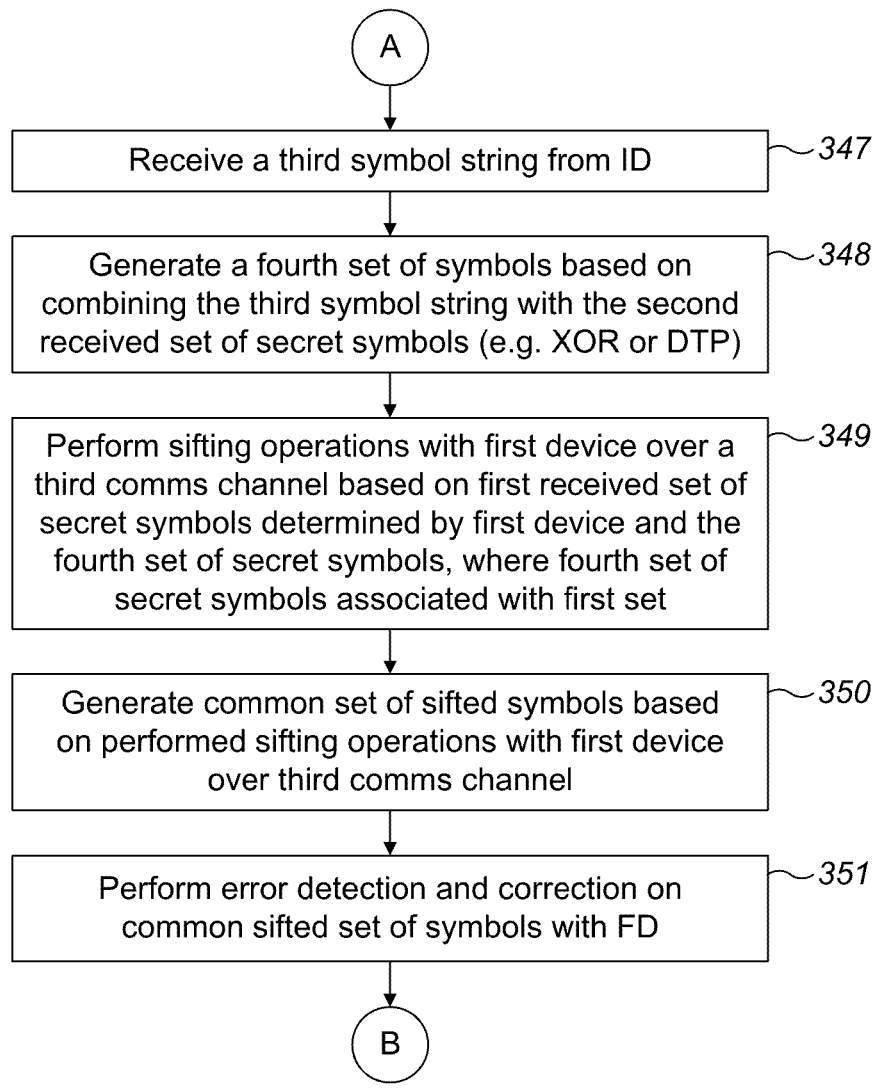
Figure 3G:
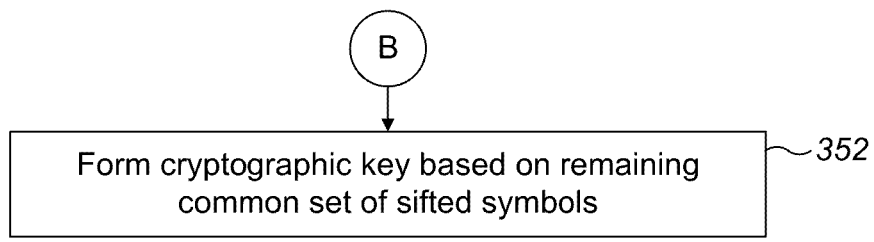

In step 327 to 330 of process 320 of FIGS. 3c and 3d or step 349 to 352 of process 340 of FIGS. 3e-3g, rather than generating first and second matching basis sets, the first device and second device may performing symbol sifting operations over the third communication channel based on, without limitation, for example: generating, by the first device, a first basis flag set based on the first received set of secret symbols and the received first basis set. The first basis flag set includes an indication of each valid and invalid symbol of the first received set of secret symbols based on comparing the received first basis set with the basis set used by the first device to demodulate the symbols associated with the first received set of secret symbols. Sending, from the first device over the third communication channel, data representative of the first basis flag set to the second device. Generating, by the second device, a second basis flag set based on the second received set of secret symbols and the received second basis set. The second basis flag set includes an indication of each valid and invalid symbol of the second received set of secret symbols based on comparing the received second basis set with the basis set used by the second device to demodulate the symbols associated with the second received set of secret symbols. Sending, from the second device over the third communication channel, data representative of the second basis flag set to the first device. Generating, by the first device, a first common set of sifted symbols based on discarding each symbol in the first received set of secret symbols in which the corresponding indication in the first basis flag set is different to the corresponding indication in the received second basis flag set. Generating, by the second device, a second common set of sifted symbols based on discarding each symbol in the fourth set of secret symbols in which the corresponding indication in the second basis flag set is different to the corresponding indication in the received first basis flag set. Performing error detection and correction between the first and second common sets of sifted symbols to generate a common set of sifted symbols. Generating a cryptographic key at the first and second devices based on the common set of sifted symbols.

Figure 4A:
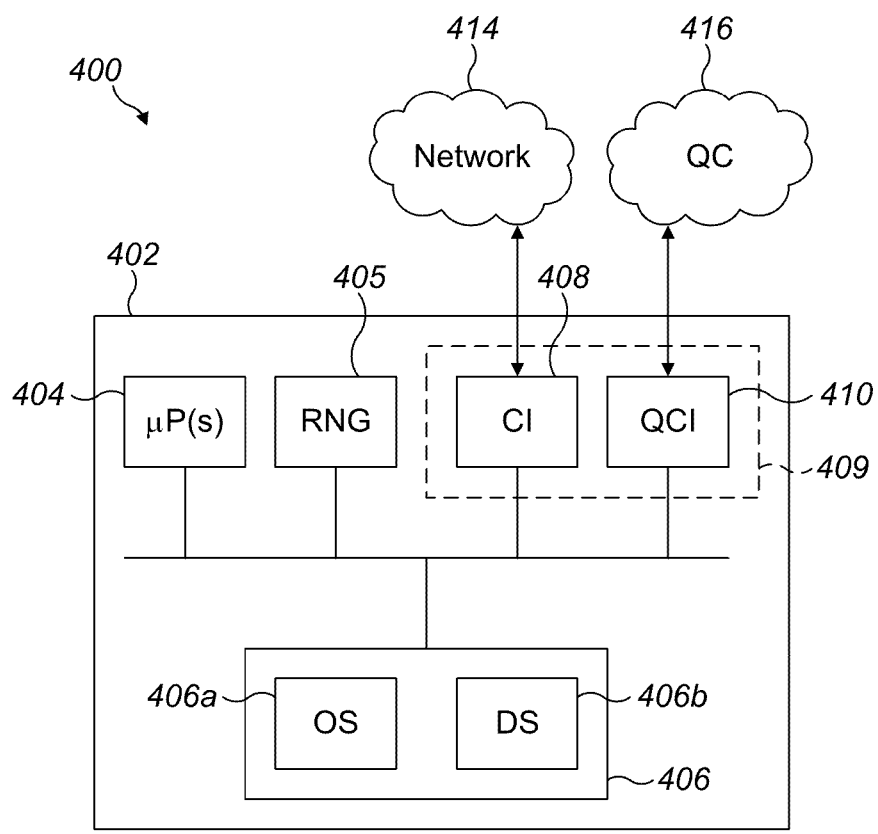
FIG. 4a is a schematic diagram illustrating an example computing system, device or apparatus for use in implementing one or more portions of an example QKD protocol according to the invention.

FIG. 4a is a schematic diagram of an example computing system 400 for use in implementing and/or performing a QKD protocol according to aspects of the invention. Computing system 400 may be used to implement one or more aspects of the systems, apparatus, methods, QKD protocol(s), QKD protocol process(es), intermediary device(s), first and second device(s), and/or use cases as described with reference to FIGS. 1a-3e, combinations thereof, modifications thereto, as herein describe and/or as the application demands. Computing system 400 includes a computing device or apparatus 402 (e.g. intermediary device, first and/or second device(s)). The computing device or apparatus includes one or more processor unit(s) 404, memory unit 406 and a communication interface 409 including, without limitation, for example, a first communication interface 408 and/or a second quantum communication interface 410, a random symbol/number generator 405 in which the one or more processor unit(s) 404 are connected to the memory unit 406, the communication interface 409 (e.g. the first communication interface 408 and the second quantum communication interface 410), and the random symbol/number generator. The communications interface 408 may connect the computing device or apparatus 402 with one or more other computing devices and/or apparatus (e.g. intermediary device, first and/or second device(s)) (not shown) to establish, form and/or communicate over a first and/or second communication channels via the first communication interface 408 and/or establish, form and/or communicate over a first and/or second quantum channels via quantum communication interface 410. The first communication interface 408 may connect to one or more communication networks, without limitation, for example one or more satellite networks, one or more telecommunication networks, one or more fibre optic networks and the like for implementing one or more aspects, features of the QKD system and/or QKD protocol, QKD protocol process(es) as described with reference to FIGS. 1a to 3g according to the invention as described herein, combinations thereof, modifications thereto as the application demands. The quantum communication interface 410 may connect over one or more quantum communication channel(s), without limitation, for example with one or more other devices, quantum communication network 416 and/or the like for implementing one or more aspects, features of the QKD system and/or QKD protocol, QKD protocol process(es) as described with reference to FIGS. 1a to 3g according to the invention as described herein, combinations thereof, modifications thereto as the application demands. The memory unit 406 may store one or more program instructions, code or components such as, by way of example only but not limited to, an operating system 406a for operating computing device 402, and a data store 406b for storing computer program instructions, executable code, code and/or components associated with implementing the functionality and/or one or more function(s) or functionality associated with one or more QKD systems, one or more QKD protocol(s); one or more QKD process(es), one or more intermediary devices, one or more first and/or second devices, one or more method(s) and/or process(es) of performing a QKD protocol according to the invention, system(s)/platforms, combinations thereof, modifications there to, and/or as described herein with reference to at least any one of figure(s) 1a to 3g.

Figure 4B:
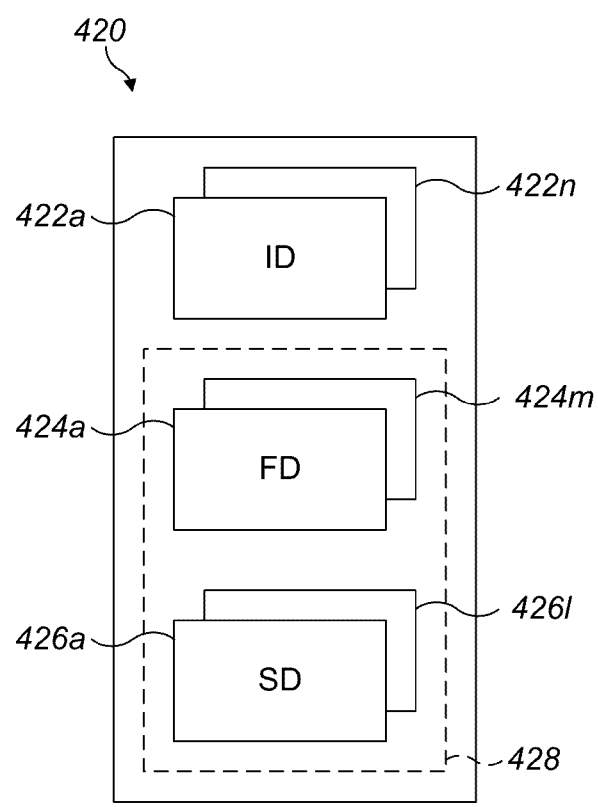
FIG. 4b is a schematic diagram illustrating an example QKD system for use in implementing an example QKD protocol according to the invention Common reference numerals are used throughout the figures to indicate similar features.

FIG. 4b is a schematic diagram of another example QKD system 420 for facilitating and/or implementing the QKD protocol and/or process(es) thereto according to the invention. The system 420 may include a plurality of computing devices or apparatus 402 that includes one or more of a plurality of intermediary devices 422a to 422n, one or more of a plurality of first devices 424a-424m, one or more of a plurality of second devices 426a-426l, and/or one or more of a plurality of devices 428 including the functionality of a first and a second device that are configured to operate and/or implement the corresponding steps and/or functions of the QKD protocol according to the invention for distributing secret symbols and/or generating a shared secret between at least one first device and at least one second device of the one or more of a plurality of first devices 424a-424m, one or more of a plurality of second devices 426a-426l, and/or one or more of a plurality of devices 428. The device(s) 422a-422n, 424a-424m, 426a-426l and/or 428 of system 420 may be configured to implement the QKD protocol, QKD protocol process(es), aspects thereof and/or further include functionality associated with the QKD systems, intermediary device(s), first device(s) and/or second device(s), QKD protocol(s), QKD process(es), systems, apparatus, one or more method(s) and/or process(es), combinations thereof, modifications thereto and/or as herein described with reference to any one of FIGS. 1a to 4b.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Application-Program-specific Integrated Circuits (ASICs), Application-Program-specific Standard Products (ASSPs), System-on-a-chip systems (SOCs), Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A computer-implemented method of quantum key distribution between a first device and a second device, the method, performed by an intermediary device, comprising:

transmitting a first secret symbol string over a first quantum channel to the first device, each symbol of the first secret symbol string modulated by a basis state randomly selected from a set of bases;

transmitting a first basis set over a first communication channel to the first device, the first basis set comprising data representative of the randomly selected bases used to modulate each symbol of the first secret symbol string;

transmitting a second secret symbol string over a second quantum channel to the second device, each symbol of the second secret symbol string modulated by a basis state randomly selected from the set of bases;

transmitting a second basis set over a second communication channel to the second device, the second basis set comprising data representative of the randomly selected bases used to modulate each symbol of the second secret symbol string;

generating a third symbol string based on combining the first and second secret symbol strings;

transmitting to the second device, via the second communication channel, data representative of the third symbol string;

wherein the first device and second device perform a quantum key exchange based on:

the first device using the received first basis set to determine a first received set of secret symbols comprising symbols of the first secret symbol string transmitted over the first quantum channel that were successfully received by the first device;

the second device uses the received second basis set to determine a second received set of secret symbols comprising symbols of the second secret symbol string transmitted over the second quantum channel that were successfully received by the second device;

the second device generates a fourth set of symbols based on combining the second received set of secret symbols with the received third symbol string, wherein one or more symbols of the fourth set of symbols correspond to one or more symbols of the first symbol string;

the first device and second device performing symbol sifting operations over a third communication channel between the based on the first received set of secret symbols at the first device and the fourth set of symbols at the second device for generating a common set of sifted symbols for forming a cryptographic key at the first and second devices.

2. The computer-implemented method according to claim 1, further comprising:

receiving from the first device, over the first communication channel, data representative of the symbol positions of the symbols in the first secret symbol string transmitted over the first quantum communication channel that were successfully received by the first device;

generating a first set of symbols based on those symbols of the first secret symbol string that correspond to the received data representative of the symbol positions of symbols from the first secret symbol string successfully received by the first device;

receiving from the second device, over the second communication channel, data representative of the symbol positions of the symbols in the second secret symbol string transmitted over the second quantum communication channel that were successfully received by the second device;

generating a second set of symbols based on those symbols of the second secret symbol string that correspond to the received data representative of the symbol positions of symbols from the second secret symbol string successfully received by the second device; and said generating the third symbol string further comprising generating the third symbol string based on combining the first set of symbols and second set of symbols.

3. The computer-implemented method according to claim 2, wherein said generating the third symbol string further comprising:
   in response to determining the length of the first set of symbols is less than the length of the second set of symbols:
   truncating the second set of symbols to the length of the first set of symbols; and
   generating the third symbol string based on combining the first set of symbols with the truncated second set of symbols;
   in response to determining the length of the second set of symbols is less than the length of the first set of symbols:
   truncating the first set of symbols to the length of the second set of symbols; and
   generating the third symbol string based on combining the truncated first set of symbols with the second set of symbols.

4. The computer-implemented method according to claim 2, wherein said generating the third symbol string further comprising:
   in response to determining the length of the first set of symbols is less than the length of the second set of symbols:
   adjusting the second set of symbols by removing an agreed set of symbols from the second set of symbols until the adjusted length of the adjusted second set of symbols is the same as the first set of symbols; and
   generating the third symbol string based on combining the first set of symbols with the adjusted second set of symbols;
   in response to determining the length of the second set of symbols is less than the length of the first set of symbols:
   adjusting the first set of symbols by removing an agreed set of symbols from the first set of symbols until the adjusted length of the adjusted first set of symbols is the same as the second set of symbols; and
   generating the third symbol string based on combining the adjusted first set of symbols with the second set of symbols.

5. The computer-implemented method according to claim 2, wherein generating the third symbol string further comprises one or more from the group of:
   generating the third symbol string based on performing an XOR operation using data representative of a first set of bits and a second set of bits, the first set of bits based on converting each of the symbols in the first set of symbols to a string of bits and the second set of bits based on converting each of the symbols in the second set of symbols to a string of bits;
   generating the third bit string based on performing one time pad encryption operation(s) using data representative of, at least in part, the first set of symbols and the second set of symbols; and
   generating the third symbol string based on performing any other type of operation for obfuscating one or more symbols of the first set of symbols using the second set of symbols.

6. The computer-implemented method according to claim 2, wherein the second device generating the fourth symbol string further comprises one or more from the group of:
   generating the fourth symbol string based on performing an XOR operation using the second received set of secret symbols and the received third symbol string;
   generating the fourth symbol string based on performing one time pad decryption operation(s) using the received second set of secret symbols and the third secret symbol string; and
   generating the fourth symbol string based on performing any other type of operation for extracting one or more symbols of the first secret symbol string using the second received set of secret symbols and the third symbol string.

7. The computer-implemented method according to claim 1, the method further comprising, prior to transmitting the randomly selected bases to the first device, performing said receiving from the first device, over the first communication channel, data representative of the symbol positions of the symbols in the first secret symbol string transmitted over the first quantum communication channel that were successfully received by the first device.

8. The computer-implemented method according to claim 1, the method further comprising, prior to transmitting the randomly selected bases to the second device, performing said receiving from the second device, over the second communication channel, data representative of the symbol positions of the symbols in the second secret symbol string transmitted over the second quantum communication channel that were successfully received by the second device.

9. The computer-implemented method according to claim 1, the method further comprising the first device and second device performing a quantum key exchange based on:
   the first device forms the first received set of secret symbols based on the received first basis set and the symbols that were successfully received from the first secret symbol string transmitted over the first quantum communication channel, wherein each symbol of the first received set of secret symbols is a symbol of the first secret symbol string that was successfully received by the first device in which the basis used for receiving said symbol matches the corresponding basis in the received first basis set used to transmit said symbol;
   the second device forms the second received set of secret symbols based on the received second basis set and the symbols that were successfully received from the second secret symbol string transmitted over the second quantum communication channel, wherein each symbol of the second received set of secret symbols is a symbol of the second secret symbol string that was successfully received by the second device in which the basis used for receiving said symbol matches the corresponding basis in the received second basis set used to transmit said symbol;
   the second device generates the fourth set of symbols based combining the second received set of secret symbols with the received third symbol string, wherein one or more symbols of the fourth set of symbols correspond to one or more symbols of the first set of symbols;
   the first device and second device performing symbol sifting operations over the third communication channel therebetween based on the first received set of secret symbols at the first device and the fourth set of symbols at the second device for generating a common set of sifted symbols for forming a cryptographic key at the first and second devices.

10. The computer-implemented method according to claim 1, wherein generating the third symbol string further comprises one or more from the group of:
- generating the third symbol string based on performing an XOR operation using data representative of, at least in part, the first secret symbol string and the second secret symbol string;
- generating the third symbol string based on performing one time pad encryption operation(s) using data representative of, at least in part, the first secret symbol string and the second secret symbol string; and
- generating the third symbol string based on performing any other type of operation for obfuscating one or more symbols of the first secret symbol string using the second secret symbol string.

11. The computer-implemented method according to claim 1, wherein the second device generating the fourth symbol string further comprises one or more from the group of:
- generating the fourth symbol string based on performing an XOR operation using data representative of, at least in part, the second secret symbol string and the third symbol string;
- generating the fourth symbol string based on performing one time pad decryption operation(s) using data representative, of at least in part, the second secret symbol string and the third secret symbol string; and
- generating the fourth symbol string based on performing any other type of operation for extracting one or more symbols of the first secret symbol string using data representative of, at least in part, the second secret symbol string and the third symbol string.

12. The computer-implemented method according to claim 1, wherein the first device and second device performing symbol sifting operations over the third communication channel therebetween based on:
- the first device forms a first matching basis set based on the first received set of secret symbols, wherein the first matching basis set includes all the basis states the first device used to receive the symbols of the first received set of secret symbols that match the corresponding basis states of the received first basis set used to transmit said symbol of the first set of symbols; and
- the first device sends over the third communication channel data representative of the first matching basis set to the second device;
- the second device forms a second matching basis set based on the second received set of secret symbols, wherein the second matching basis set includes all the basis states the second device used to receive the symbols of the second received set of secret symbols that match the corresponding basis states of the received second basis set used to transmit said symbol of the second set of symbols;
- the second device sends over the third communication channel data representative of the second matching basis set to the first device;
- the first device generates a first common set of sifted symbols based on discarding each symbol in the first received set of secret symbols in which the corresponding basis in the first matching basis set is different to the corresponding basis in the received second matching basis set;
- the second device generates a second common set of sifted symbols based on discarding each symbol in the fourth set of symbols in which the corresponding basis in the received first matching basis set is different to the corresponding basis in the second matching basis set; and
- the first and second devices forming a cryptographic key based on the first and second common set of sifted symbols, respectively.

13. The computer-implemented method according to claim 12, wherein the first and second device perform error detection and/or correction on the first and second common sets of sifted bits.

14. The computer-implemented method according to claim 1, further comprising generating a first secret symbol string and/or a second secret symbol string by randomly selecting a symbols using a random number generator.

15. The computer-implemented method according to claim 1, wherein the set of bases comprises at least two bases, each basis comprising at least two basis states, wherein the at least two basis states of each basis are orthogonal and the at least two basis states of said each basis are non-orthogonal to the at least two basis states of another basis of the set of bases.

16. The computer-implemented method according to claim 1, wherein the first and/or second communication channel is based on a classical communication channel formed between the intermediary device and the first device.

17. The computer-implemented method according to claim 1, wherein the first and second communications channels are encrypted communication channels.

18. A computer-implemented method of quantum key distribution between a first device and a second device, the method, performed by the first device, comprising:
- receiving, from an intermediary device, over a quantum channel a first secret symbol string, wherein the intermediary device modulated each symbol of the first secret symbol string using a basis state of a basis selected at random from a set of bases for transmission over the quantum channel;
- demodulating the received first secret symbol string, where each received first secret symbol is demodulated using a basis state of a basis selected at random from the set of bases;
- receiving, from the intermediary device, data representative of a first basis set over a first communication channel, the first basis set comprising data representative of the randomly selected bases used by the intermediary device to modulate each symbol of the first secret symbol string;
- determining a first received set of secret symbols from the received first secret symbol string that are successfully received using the received first basis set;
- performing sifting operation(s) with the second device using the first received set of secret symbols of the first device and another set of secret symbols determined by the second device for generating a common sifted set of symbols for forming a cryptographic key with the second device, wherein the other set of secret symbols are associated with the first received set of secret symbols; and
- the second device determines the other set of secret symbols based on, at least in part, a second secret symbol string received by the second device over a second quantum channel from the intermediary device and, at least in part, a third secret symbol string received by the second device over a second communication channel from the intermediary device, wherein the third secret symbol string is based on a combination of, at least in part, the second secret symbol string and the first secret symbol string, and the second device generates the other set of secret symbols based on a combination of the received third secret symbol string and, at least in part, the second secret symbol string.

19. The computer-implemented method according to claim 18, wherein performing the symbol sifting operations with the second device over the third communication channel further comprising:

forming a first matching basis set based on the first received set of secret symbols, wherein the first matching basis set includes all the basis states the first device used to receive the symbols of the first received set of secret symbols that match the corresponding basis states of the received first basis set used by the intermediary device to transmit said symbol of the first secret symbol string; and transmitting to the second device over the third communication channel data representative of the first matching basis set, wherein:

receiving from the second device over the third communication channel data representative of a second matching basis set, wherein the second device forms the second matching basis set based on the second received set of secret symbols, wherein the second matching basis set includes all the basis states the second device used to receive the symbols of the second received set of secret symbols that match the corresponding basis states of the received second basis set used by the intermediary device to transmit said symbol of the second secret symbol string;

generating a first common set of sifted symbols based on discarding each symbol in the first received set of secret symbols in which the corresponding basis in the first matching basis set is different to the corresponding basis in the received second matching basis set, wherein the second device generates a second common set of sifted symbols based on discarding each symbol in the other set of secret symbols in which the corresponding basis in the received first matching basis set is different to the corresponding basis in the second matching basis set; and forming a cryptographic key based on the first common set of sifted symbols, wherein the second device forms the cryptographic key based on the second common set of sifted symbols.

20. A computer-implemented method of quantum key distribution between a first device and a second device, the method, performed by the second device, comprising:

receiving, from an intermediary device, over a quantum channel a second secret symbol string, wherein the intermediary device modulated each symbol of the second secret symbol string using a basis state of a basis selected at random from a set of bases;

demodulating the received second secret symbol string, where each received second secret symbol is demodulated using a basis state of a basis selected at random from the set of bases;

receiving data representative of the randomly selected bases used to modulate each symbol of the second secret symbol string by the intermediary device;

determining a second set of secret symbols from the received second secret symbol string that are validly received based on comparing the randomly selected bases used to demodulate the second secret symbol string and the received randomly selected bases used to modulate the second secret symbol string;

receiving, from the intermediary device, data representative of a third symbol string, the third symbol string generated by the intermediary device based on a combination of, at least in part, the second secret symbol string and a first secret symbol string, the first secret symbol string sent from the intermediary device to the first device over another quantum channel;

determining a fourth set of secret symbols based on combining, at least in part, the received third symbol string with the received second set of secret symbols; and performing sifting with the first device using the fourth set of secret symbols and another set of secret symbols determined by the first device for generating a common sifted set of symbols for forming a cryptographic key, wherein the other set of secret symbols are associated with the first secret symbol string that is determined to be validly received by the first device.

* * * * *